United States Patent
Kim et al.

(10) Patent No.: US 11,418,694 B2
(45) Date of Patent: Aug. 16, 2022

(54) ELECTRONIC APPARATUS AND CONTROL METHOD THEREOF

(71) Applicant: SAMSUNG ELECTRONICS CO., LTD., Suwon-si (KR)

(72) Inventors: Yangwook Kim, Suwon-si (KR); Woohyun Nam, Suwon-si (KR); Seungho Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 65 days.

(21) Appl. No.: 17/019,948

(22) Filed: Sep. 14, 2020

(65) Prior Publication Data

US 2021/0218878 A1   Jul. 15, 2021

(30) Foreign Application Priority Data

Jan. 13, 2020   (KR) ................ 10-2020-0004485

(51) Int. Cl.
*H04N 5/232*    (2006.01)
*H04R 1/02*     (2006.01)
*H04R 3/00*     (2006.01)

(52) U.S. Cl.
CPC ......... *H04N 5/23203* (2013.01); *H04R 1/025* (2013.01); *H04R 3/005* (2013.01)

(58) Field of Classification Search
CPC ......... H04N 5/23203; H04N 5/232933; H04N 5/23219; H04R 1/025; H04R 3/005; H04R 2499/11; H04S 1/00; H04S 7/30; H04S 2400/11; H04S 2400/13; H04S 2400/15; G06F 3/165; G06F 3/005; G06F 3/011; G06F 3/0484; G06V 10/10
See application file for complete search history.

(56) References Cited

U.S. PATENT DOCUMENTS

| | | | |
|---|---|---|---|
| 6,757,397 | B1 | 6/2004 | Buecher et al. |
| 9,100,633 | B2 | 8/2015 | Jung et al. |
| 9,668,077 | B2 | 5/2017 | Tico et al. |

(Continued)

FOREIGN PATENT DOCUMENTS

| | | |
|---|---|---|
| CN | 103458210 | 2/2017 |
| JP | H05-300419 | 11/1993 |

(Continued)

OTHER PUBLICATIONS

International Search Report and Written Opinion dated Mar. 15, 2021 in corresponding International Application No. PCT/KR2020/016182.

*Primary Examiner* — Yogeshkumar Patel
(74) *Attorney, Agent, or Firm* — Nixon & Vanderhye P.C.

(57) ABSTRACT

Disclosed is an electronic apparatus. The electronic apparatus includes: a camera; a first microphone; a second microphone; and a processor configured to: control the electronic apparatus to obtain first sound data through the first microphone, control the electronic apparatus to obtain second sound data through the second microphone, identify an object corresponding to the first sound data and the second sound data in image data obtained through the camera, obtain position information of the identified object from the image data, and change volume information of at least one of the first sound data or the second sound data based on the obtained position information.

20 Claims, 30 Drawing Sheets

(56) References Cited

U.S. PATENT DOCUMENTS

| | | | |
|---|---|---|---|
| 2009/0066798 A1 | 3/2009 | Oku et al. | |
| 2009/0154896 A1 | 6/2009 | Matono | |
| 2011/0050944 A1* | 3/2011 | Nakamura | H04N 9/8211 348/222.1 |
| 2011/0300806 A1* | 12/2011 | Lindahl | G10L 21/0208 455/63.1 |
| 2013/0342731 A1 | 12/2013 | Lee et al. | |
| 2015/0117833 A1 | 4/2015 | Chen | |
| 2019/0037329 A1 | 1/2019 | Lee et al. | |

FOREIGN PATENT DOCUMENTS

| | | | | |
|---|---|---|---|---|
| JP | 2009-147768 | | 7/2009 | |
| JP | 2010-130403 | | 6/2010 | |
| JP | 2010130403 A | * | 6/2010 | ......... H04N 21/4223 |
| JP | 2010-200084 A | | 9/2010 | |
| JP | 2010-283706 A | | 12/2010 | |
| JP | 2012-209681 | | 10/2012 | |
| JP | 5391999 | | 1/2014 | |
| JP | 5939444 | | 6/2016 | |
| JP | 2018-155897 | | 10/2018 | |
| KR | 10-2016-0107430 | | 9/2016 | |
| KR | 10-1740569 B1 | | 5/2017 | |
| KR | 10-1969802 B1 | | 4/2019 | |

* cited by examiner

FIG. 6
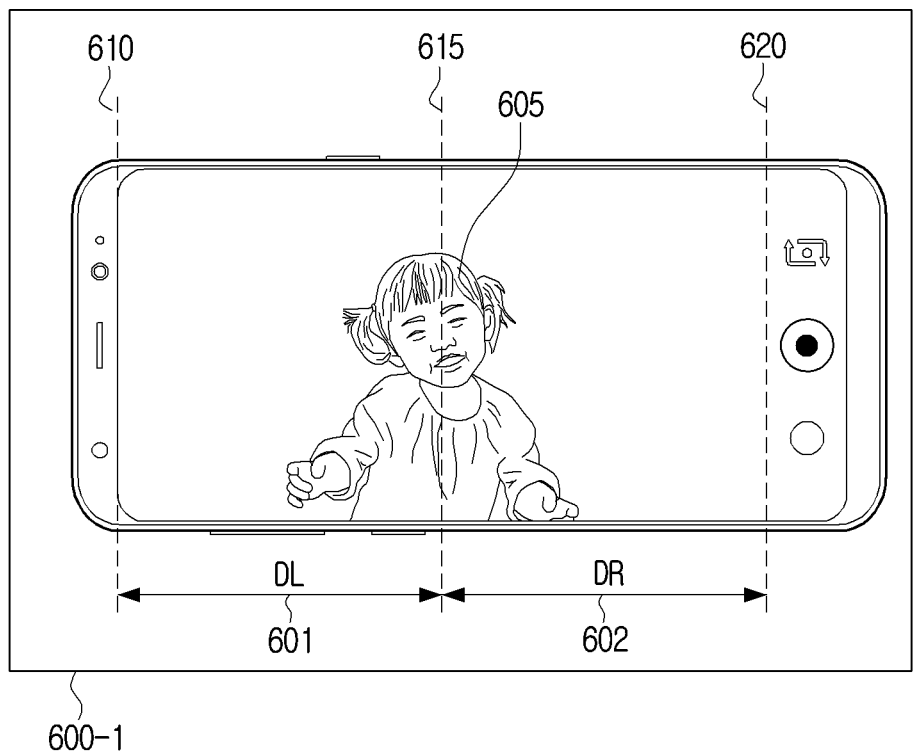
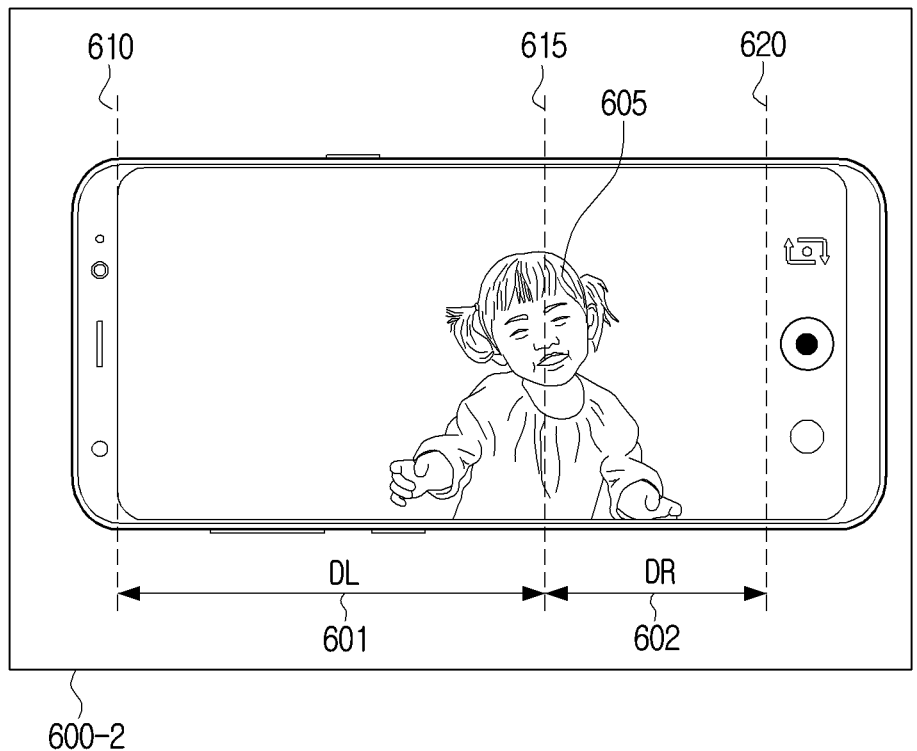

FIG. 7
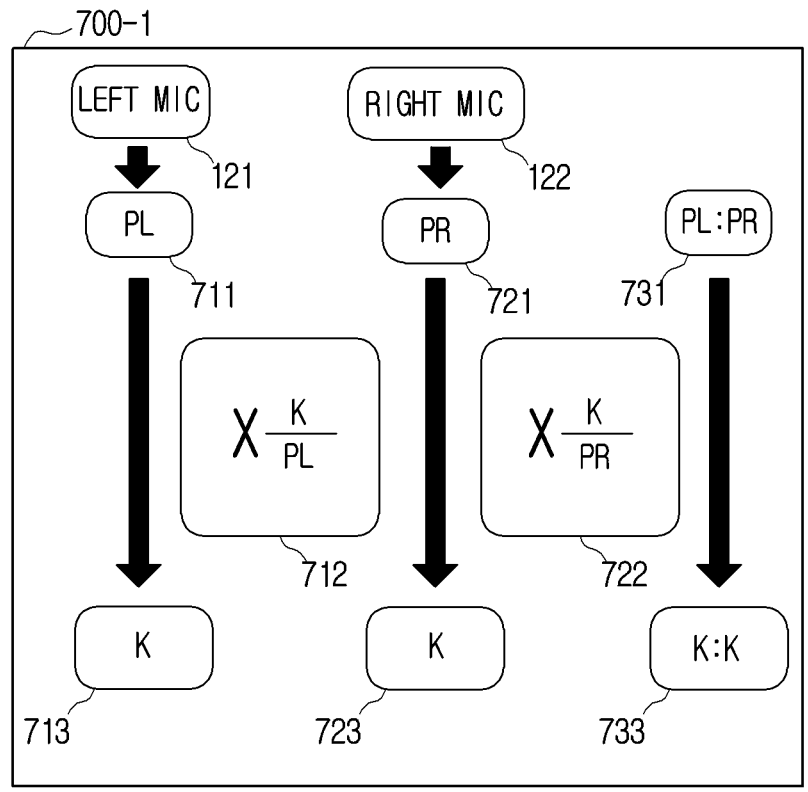
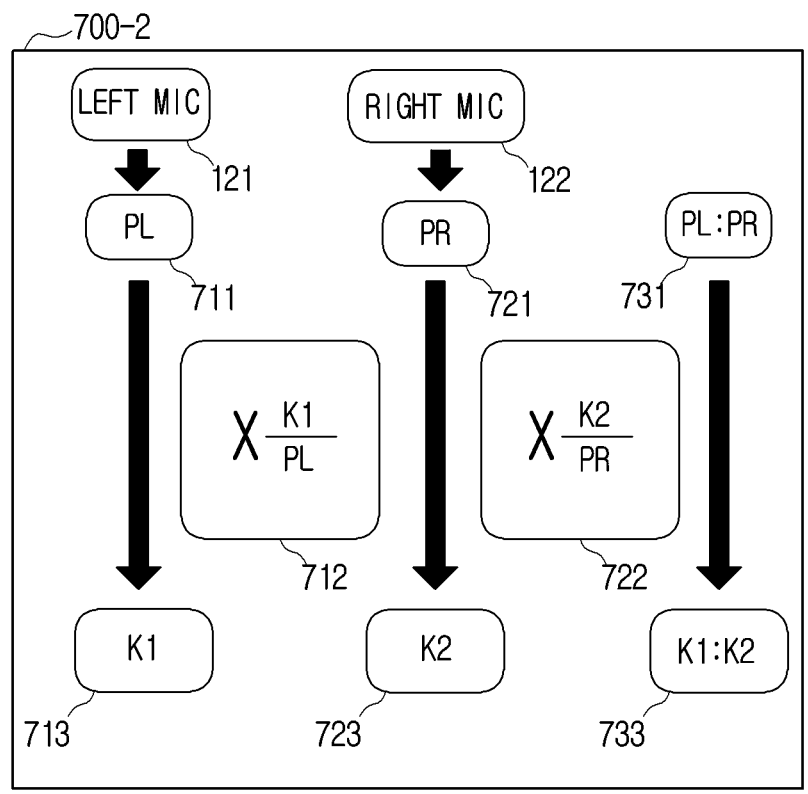

FIG. 9
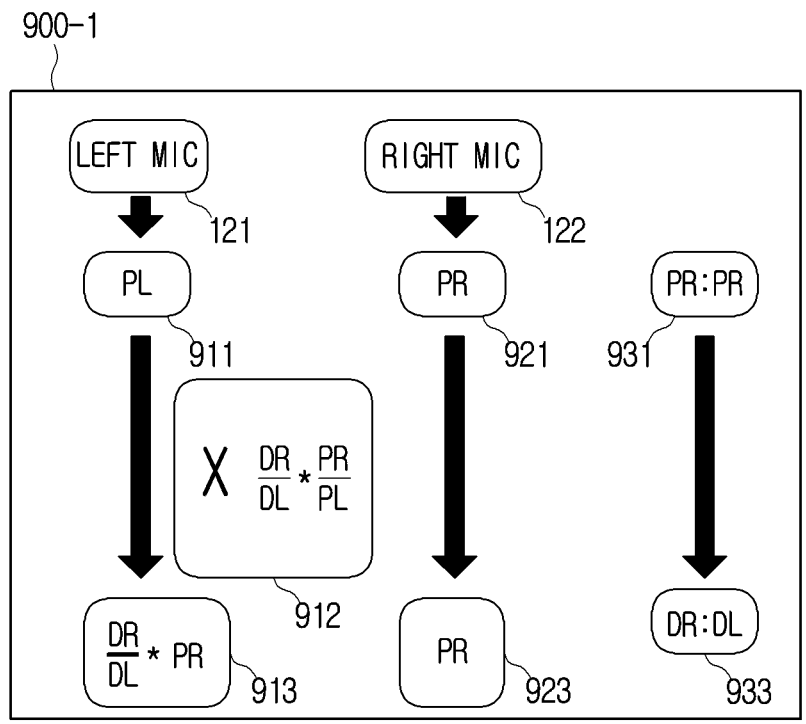
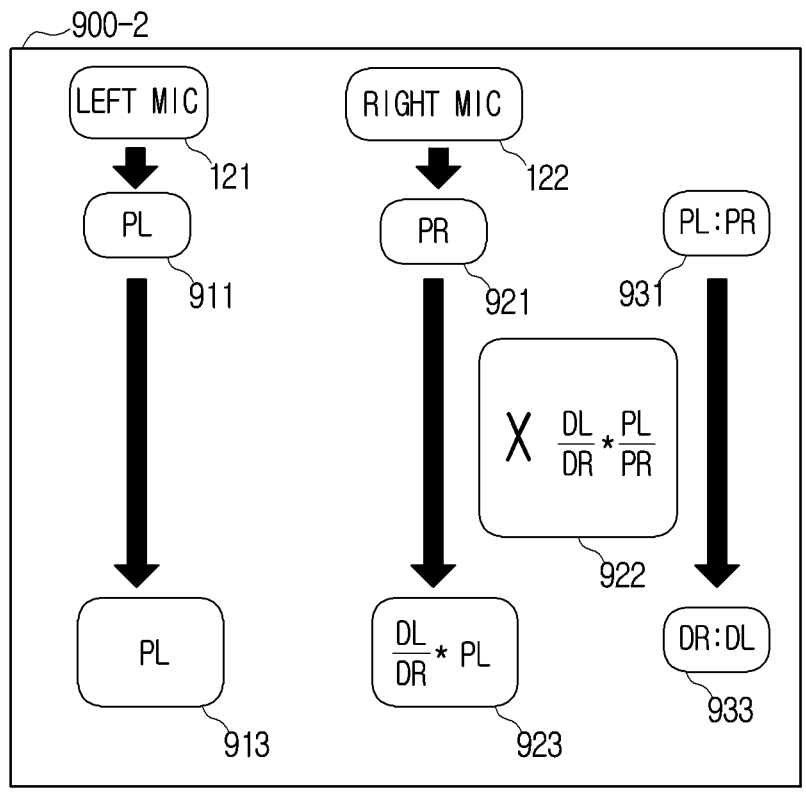

FIG. 17
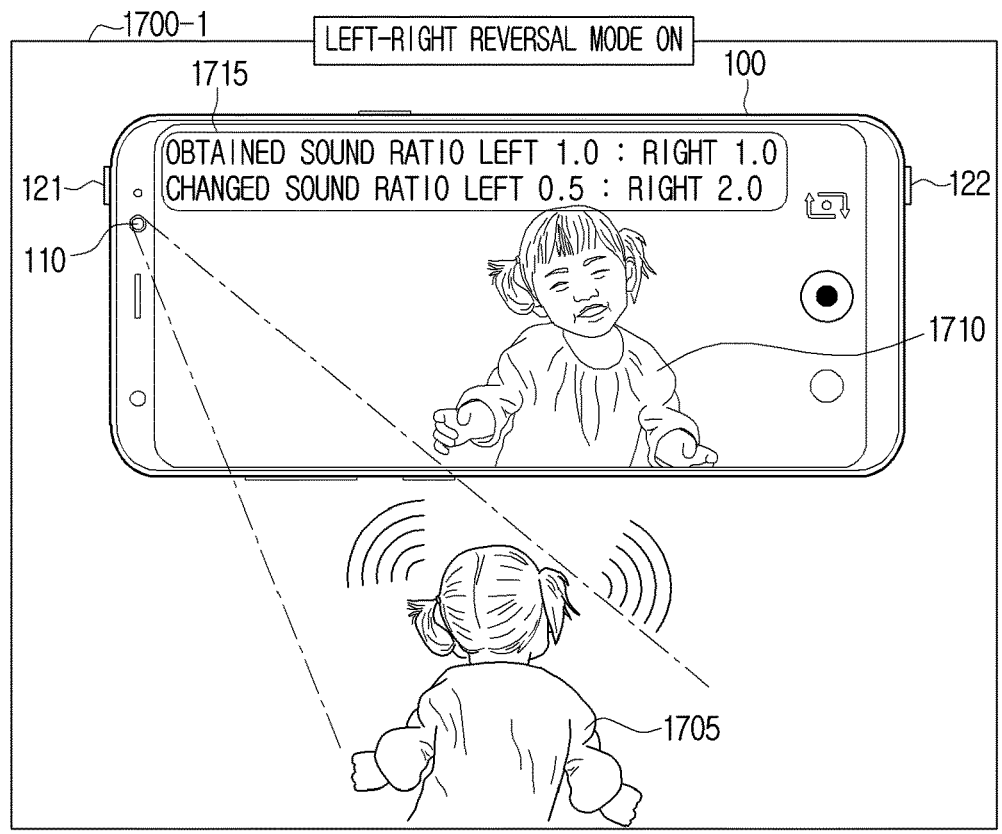
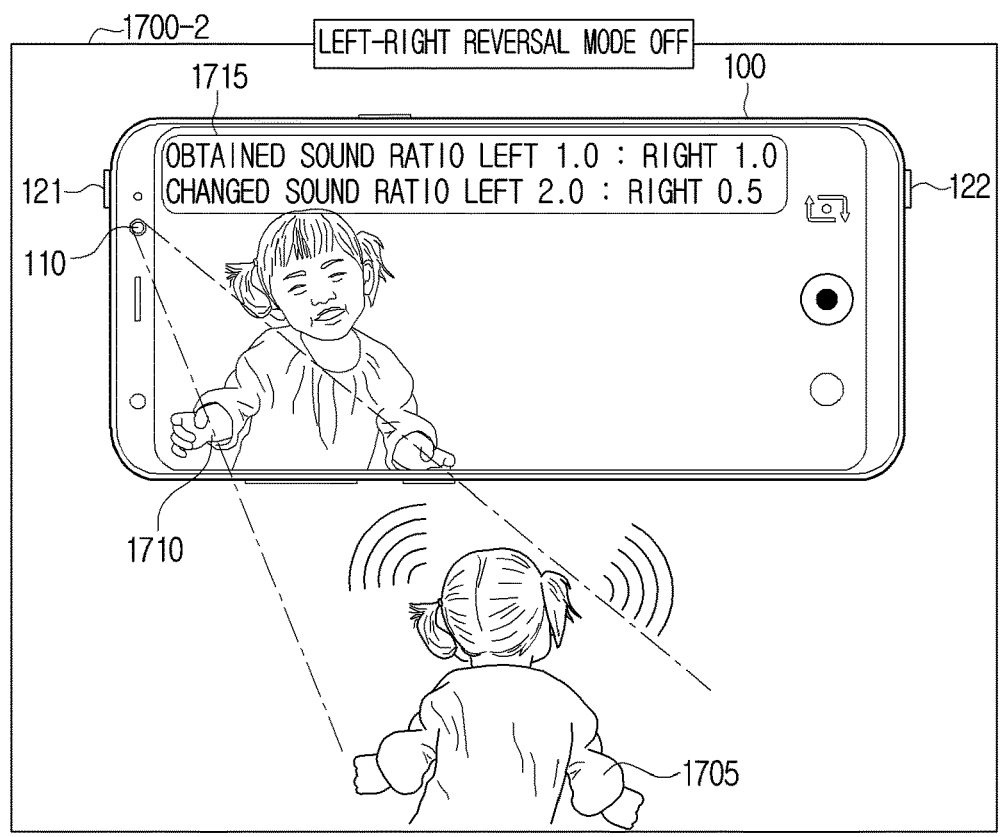

FIG. 18
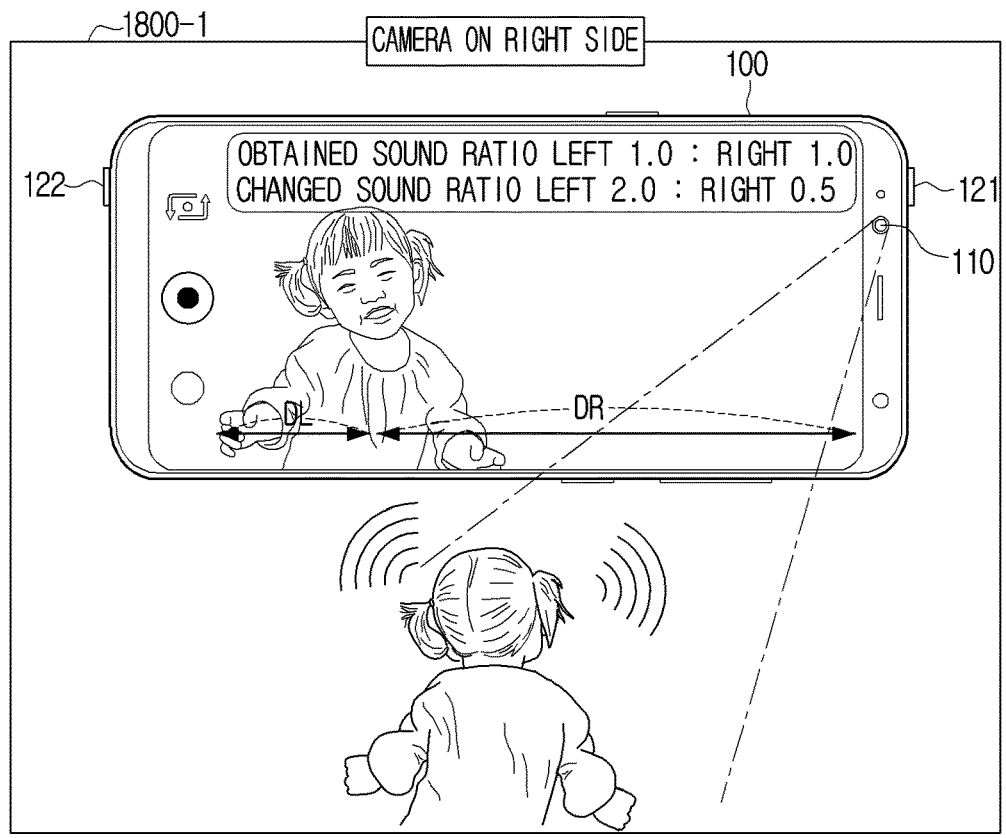
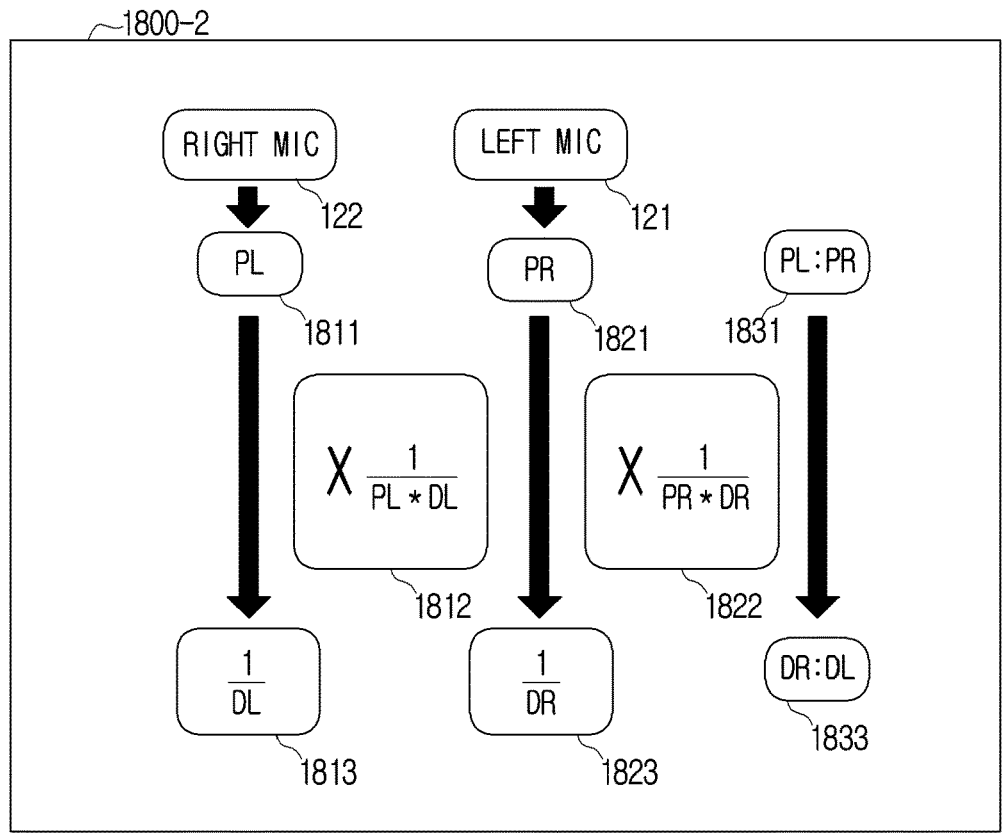

FIG. 21
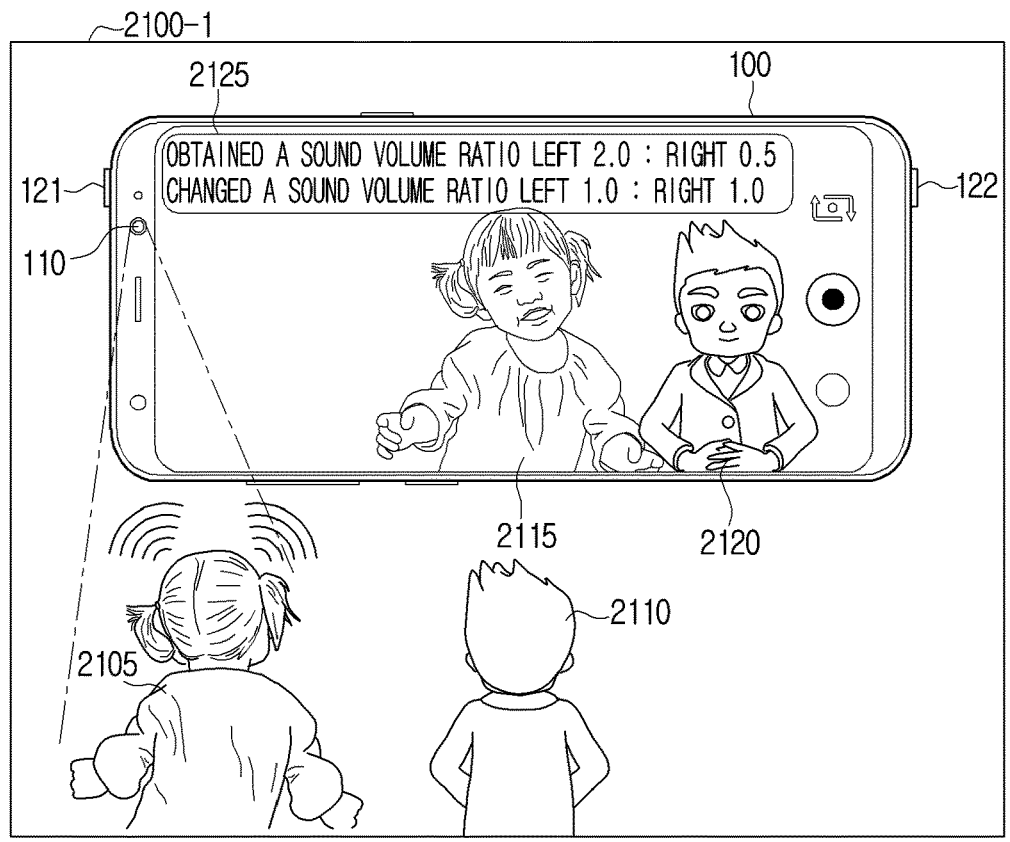
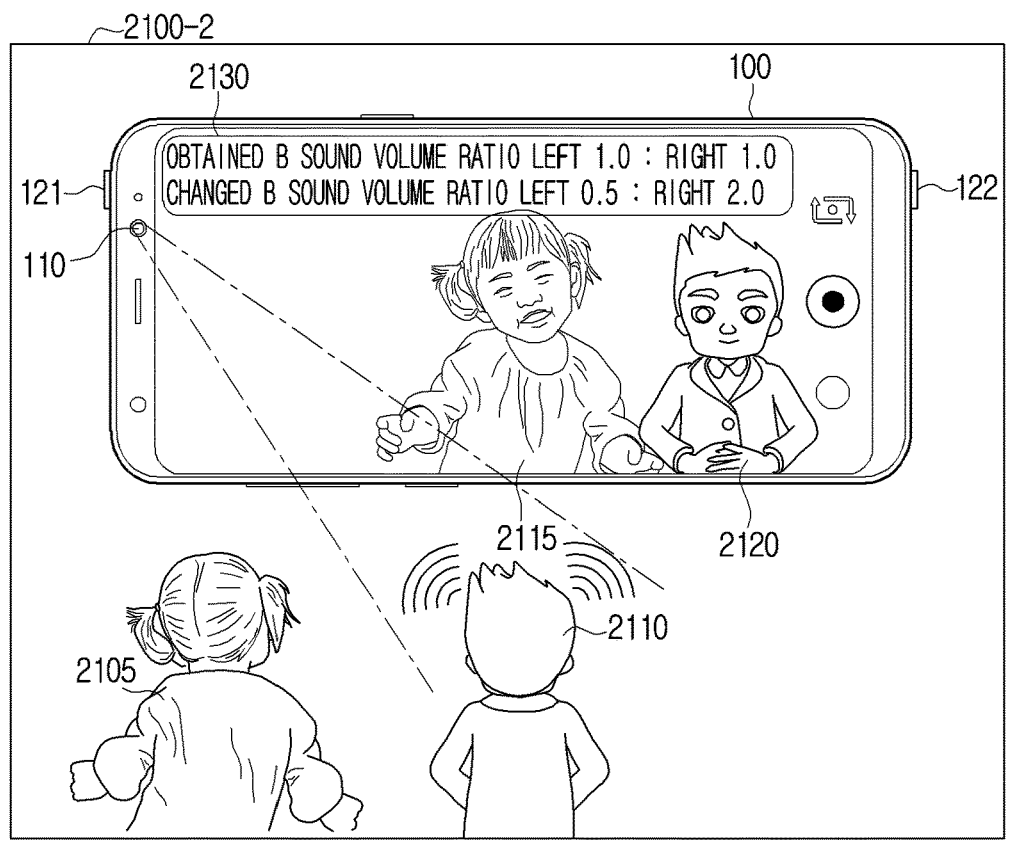

FIG. 28A
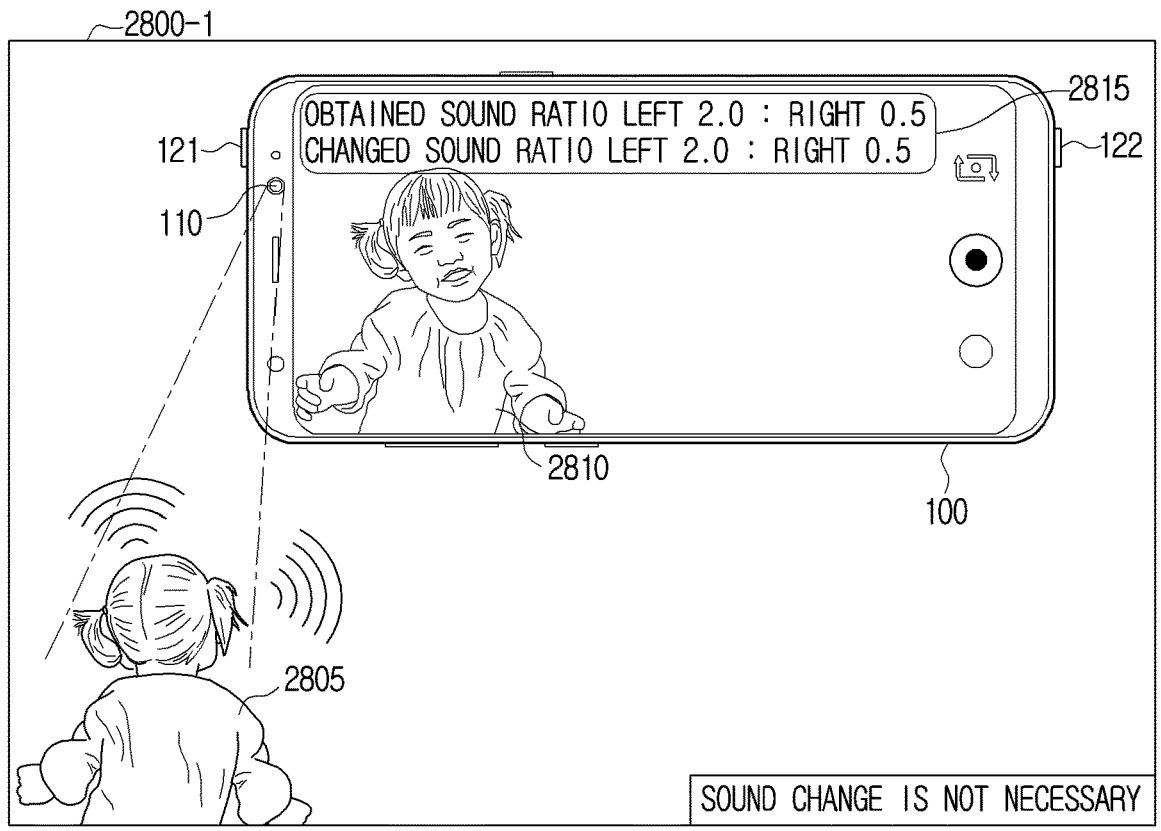
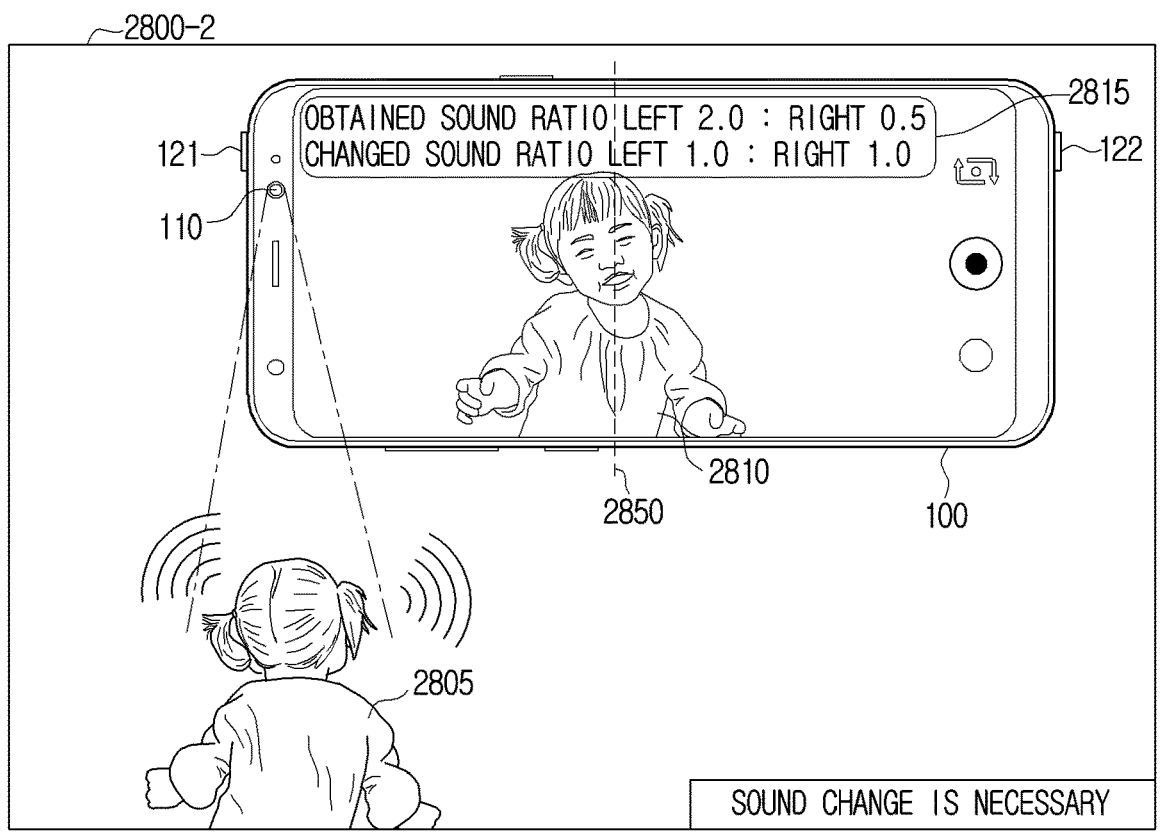

FIG. 28B
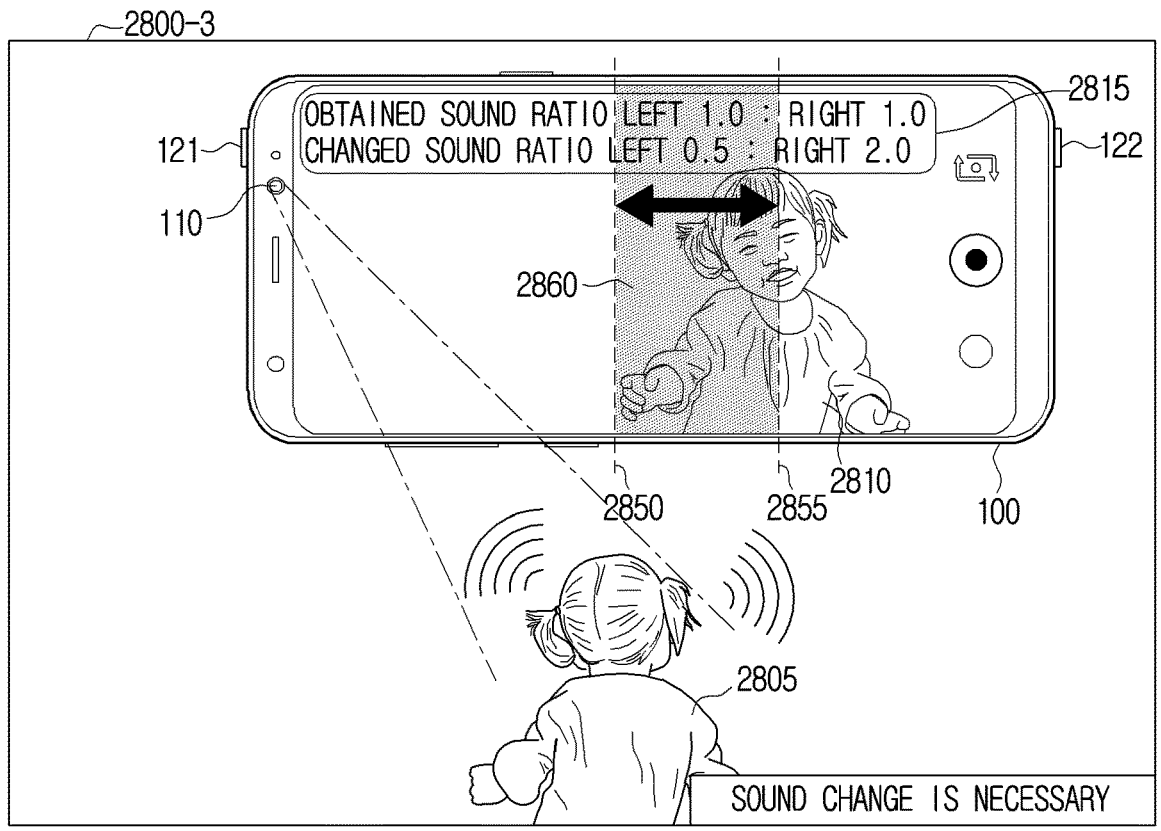
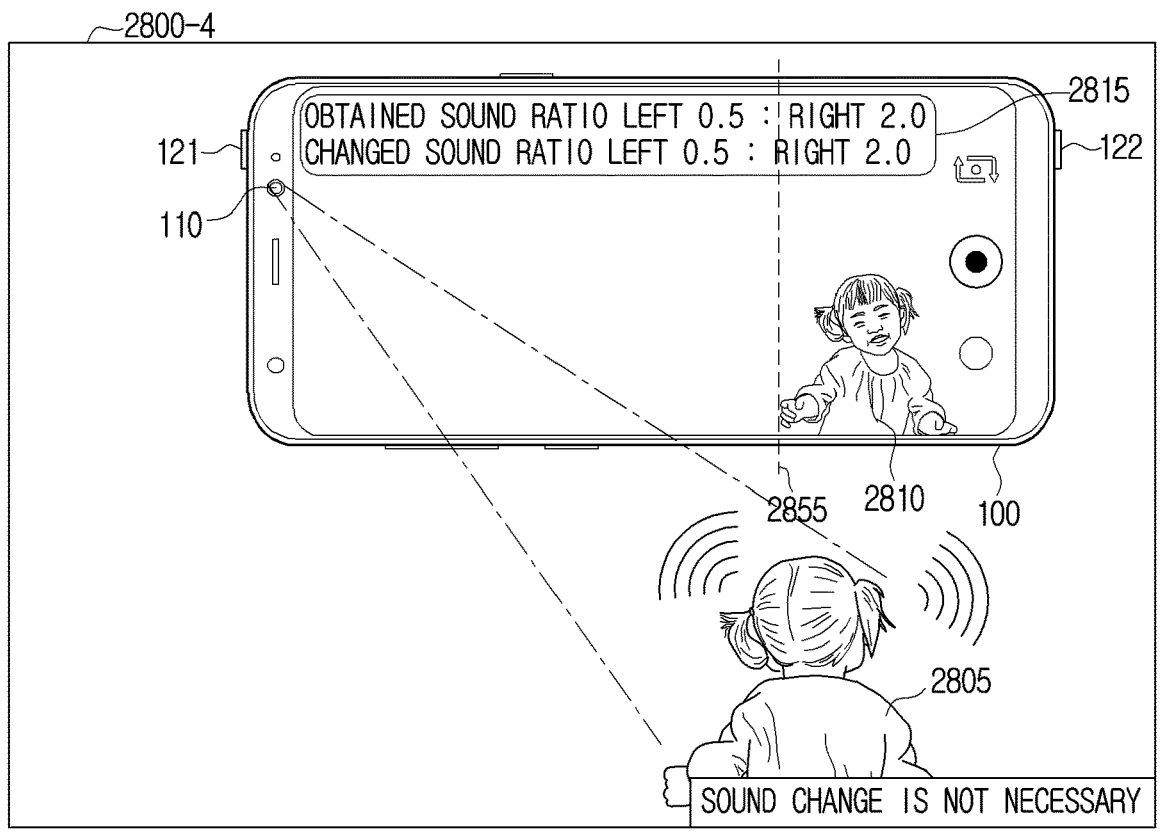

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2020-0004485, filed on Jan. 13, 2020, in the Korean Intellectual Property Office, the disclosure of which is incorporated by reference herein in its entirety.

BACKGROUND

Field

The disclosure relates to an electronic apparatus and a control method thereof, and for example, to an electronic apparatus that changes sound data based on object position information obtained from image data, and a control method thereof.

Description of Related Art

Image data and sound data may be obtained at the same time to record a video. The obtained sound data may be stereo sound data. The sound data may be obtained through at least two microphones. For convenience of explanation, a case of recording a video of a situation in which a speaker utters a voice is assumed.

A camera captures an image of the speaker, and the voice uttered by the speaker may be recorded through at least two microphones at the same time. The voice recorded in stereo and the image of the speaker may not match each other depending on positions of the camera and the at least two microphones.

For example, based on a speaker standing beside an electronic apparatus, the speaker stands in front of a camera from the viewpoint of the camera disposed beside the electronic apparatus. Because the speaker stands in front of the camera, the speaker displayed on a display may be positioned at the center of a screen. However, because the speaker does not stand in front of the electronic apparatus, volumes of a voice recorded through at least two microphones disposed, for example, on the left and right sides of the electronic apparatus, respectively may be different.

From the viewpoint of a person who watches the video, the speaker is displayed on the center of the screen, but the voice recorded in stereo may be unbalanced left and right sides. As a distance between the electronic apparatus and the speaker is increased, a relative ratio of a distance between one of the at least two microphones and the speaker to a distance between the other one and the speaker is increased. Therefore, the problem that the recorded voice is unbalanced left and right sides may become severe.

Particularly, the problem that a recorded sound is unbalanced left and right sides may be more prominent in a case of recording a sound at close range like autonomous sensory meridian response (ASMR).

SUMMARY

Embodiments of the disclosure address the above disadvantages and other disadvantages not described above.

Embodiments of the disclosure provide an electronic apparatus that changes volume information of stereo voice data in consideration of object position information obtained from image data, and a control method thereof.

According to an example embodiment of the disclosure, an electronic apparatus includes: a camera; a first microphone; a second microphone; and a processor configured to: control the electronic apparatus to obtain first sound data through the first microphone, control the electronic apparatus to obtain second sound data through the second microphone, identify an object corresponding to the first sound data and the second sound data in image data obtained through the camera, obtain position information of the identified object from the image data, and change volume information of at least one of the first sound data or the second sound data based on the obtained position information.

The first microphone and the second microphone may be spaced apart from each other, and a first distance between a position of the camera and a position of the first microphone, and a second distance between the position of the camera and a position of the second microphone may be different from each other.

The processor may be configured to identify, as the object corresponding to the first sound data and the second sound data, a subject who utters the first sound data and the second sound data in the image data.

The processor may be configured to obtain sound ratio information between the volume information of the first sound data and the volume information of the second sound data, and change the volume information of at least one of the first sound data or the second sound data based on the sound ratio information and the position information of the identified object.

The processor may be configured to obtain weighted value information for changing the volume information of at least one of the first sound data or the second sound data based on the sound ratio information and the position information of the identified object, and change the volume information of at least one of the first sound data or the second sound data based on the obtained weighted value information.

The processor may be configured to obtain the weighted value information for changing the volume information of at least one of the first sound data or the second sound data based on the sound ratio information, and distance ratio information between a first distance from one side of the image data to the identified object, and a second distance from the other side of the image data to the identified object, and the other side of the image data may be opposite to the one side of the image data.

The processor may be configured to obtain the weighted value information by multiplying the distance ratio information and the sound ratio information, and change the volume information of the first sound data or the second sound data by multiplying the volume information of the first sound data or the second sound data by the weighted value information.

The processor may change the volume information by multiplying the volume of one of the first sound data or the second sound data by the weighted value information, the one of the first sound data or the second sound data having a higher volume.

The electronic apparatus may further include a display, wherein the processor may be configured to control the display to display a user interface (UI) including the changed volume information of the first sound data or the second sound data.

The processor may be configured to obtain distance information between the identified object and the electronic apparatus based on the image data, and change the volume information of at least one of the first sound data or the second sound data based on the obtained position information based on the obtained distance information being less than a threshold distance.

The processor may be configured to obtain, based on first and second objects being identified in the image data, first position information of the identified first object and second position information of the identified second object from the image data, change volume information of at least one of first sound data or second sound data corresponding to the first object based on the first position information, and change volume information of at least one of third sound data or fourth sound data corresponding to the second object based on the second position information.

A method of controlling an electronic apparatus according to an example embodiment includes: obtaining image data through a camera; obtaining first sound data through a first microphone and obtaining second sound data through a second microphone; identifying an object corresponding to the first sound data and the second sound data in the obtained image data; obtaining position information of the identified object from the image data; and changing volume information of at least one of the first sound data or the second sound data based on the obtained position information.

The first microphone and the second microphone may be spaced apart from each other, and a first distance between a position of the camera and a position of the first microphone, and a second distance between the position of the camera and a position of the second microphone may be different from each other.

In the identifying of the object, a subject who utters the first sound data and the second sound data may be identified as the object corresponding to the first sound data and the second sound data in the image data.

The method may include obtaining sound ratio information between the volume information of the first sound data and the volume information of the second sound data, wherein in the changing of the volume information, the volume information of at least one of the first sound data or the second sound data may be changed based on the sound ratio information and the position information of the identified object.

The method may further include obtaining weighted value information for changing the volume information of at least one of the first sound data or the second sound data based on the sound ratio information and the position information of the identified object, wherein in the changing of the volume information, the volume information of at least one of the first sound data or the second sound data may be changed based on the obtained weighted value information.

In the obtaining of the weighted value information, the weighted value information for changing the volume information of at least one of the first sound data or the second sound data may be obtained based on the sound ratio information, and distance ratio information between a first distance from one side of the image data to the identified object, and a second distance from the other side of the image data to the identified object, and the other side of the image data may be opposite to the one side of the image data.

In the changing of the volume information, the weighted value information may be obtained by multiplying the distance ratio information and the sound ratio information, and the volume information of the first sound data or the second sound data may be changed by multiplying the volume information of the first sound data or the second sound data by the weighted value information.

In the changing of the volume information, the volume information may be changed by multiplying the volume of one of the first sound data or the second sound data by the weighted value information, the one of the first sound data or the second sound data having a higher volume.

The method may further include displaying a UI including the changed volume information of the first sound data or the second sound data.

In the changing of the volume information, distance information between a user corresponding to the identified object and the electronic apparatus may be obtained based on the image data, and the volume information of at least one of the first sound data or the second sound data may be changed based on the obtained position information based on the obtained distance information being less than a threshold distance.

The method may further include obtaining, based on first and second objects being identified in the image data, first position information of the identified first object and second position information of the identified second object from the image data, wherein in the changing of the volume information, volume information of at least one of first sound data or second sound data corresponding to the first object may be changed based on the first position information, and volume information of at least one of third sound data or fourth sound data corresponding to the second object may be changed based on the second position information.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example operation of obtaining object position information according to an embodiment;

FIG. 7 is a diagram illustrating an example of a change of sound data according to an embodiment;

FIG. 9 is a diagram illustrating an example of a change of sound data according to an embodiment;

FIG. 17 is a diagram illustrating an example operation of converting sound data according to a left-right reversal mode according to an embodiment;

FIG. 18 is a diagram illustrating an example operation of converting sound data according to a position of a camera according to an embodiment;

FIG. 21 is a diagram illustrating an example operation of recording a plurality of objects according to an embodiment;

FIG. 28A is a diagram illustrating example image data applied with a left-right reversal function according to an embodiment;

FIG. 28B is a diagram illustrating example image data applied with the left-right reversal function according to an embodiment.

DETAILED DESCRIPTION

Figure 1:
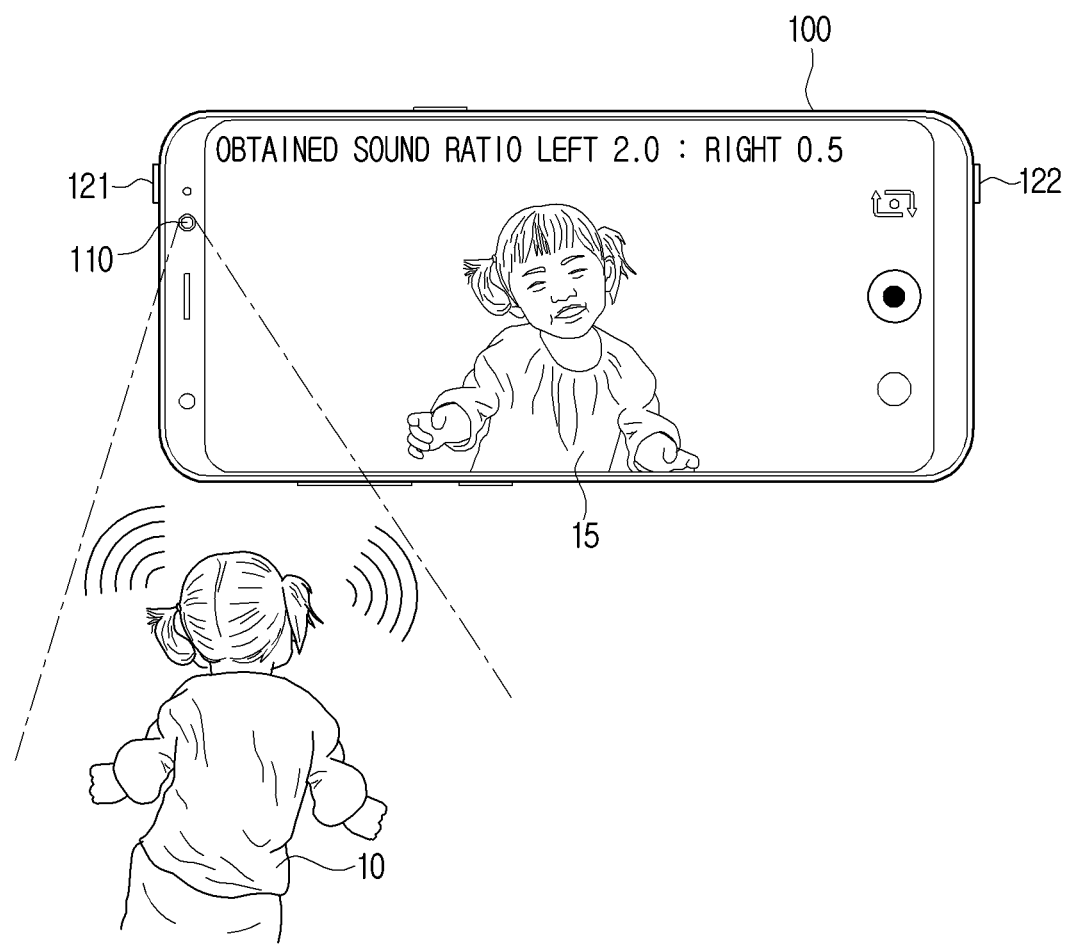
FIG. 1 is a diagram illustrating an example video recording operation according to an embodiment.

Hereinafter, the disclosure will be described in greater detail with reference to the accompanying drawings.

General terms that are currently widely used may be used in describing the various example embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. In this case, the meaning of such terms will be based on a corresponding description portion of the disclosure. Therefore, the terms used in embodiments of the disclosure should be defined based on the meaning of the terms and the contents throughout the disclosure rather than simple names of the terms.

In the disclosure, an expression "have", "may have", "include", "may include", or the like, indicates existence of a corresponding feature (for example, a numerical value, a function, an operation, or a component such as a part), and does not exclude existence of an additional feature.

An expression "at least one of A or/and B" should be understood as indicating "A or B", or "A and B".

Expressions "first", "second", or the like, used in the disclosure may indicate various components regardless of a sequence and/or importance of the components, may be used simply to distinguish one component from the other components, and do not limit the corresponding components.

When it is mentioned that any component (for example, a first component) is (operatively or communicatively) coupled with/to or is connected to another component (for example, a second component), it is to be understood that any component may be directly coupled to another component or may be coupled to another component through the other component (for example, a third component).

Singular forms used herein are intended to include plural forms unless context explicitly indicates otherwise. It will be further understood that terms "include" or "formed of" used in the disclosure specify the presence of features, numerals, steps, operations, components, parts, or combinations thereof mentioned in the disclosure, but do not preclude the presence or addition of one or more other features, numerals, steps, operations, components, parts, or combinations thereof.

In the disclosure, a "module'" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or a "-er/or" that needs to be implemented by specific hardware.

In the disclosure, a term "user" may be a person that uses an electronic apparatus or an apparatus (for example, artificial intelligence (AI) electronic apparatus) that uses an electronic apparatus.

Hereinafter, example embodiments of the disclosure will be described in greater detail with reference to the accompanying drawings.

FIG. 1 is a diagram illustrating an example video recording operation according to an embodiment.

Referring to FIG. 1, an electronic apparatus 100 including a camera 110, a first microphone 121, and a second microphone 122 may perform a video recording operation.

The camera 110 may refer, for example, to a front camera. The electronic apparatus 100 may capture an image of a speaker 10 using the camera 110. It is assumed that a speaker is positioned in front of a camera. The electronic apparatus 100 may display image data obtained through the camera 110 on a display of the electronic apparatus 100. An object 15 corresponding to the speaker 10 may be included in the image data and displayed on the display. The speaker 10 is positioned in front of the camera 110, and thus the object 15 corresponding to the speaker 10 displayed on the display may be positioned at the center of the display. Although FIG. 1 illustrates a case of capturing the image of the speaker 10 using the front camera, the description of FIG. 1 may be applied in a similar manner to a case of capturing an image of the speaker 10 using a rear camera.

A voice uttered by the speaker 10 may be recorded simultaneously through the first microphone 121 and the second microphone 122. It is assumed that the first microphone 121 is disposed at a position close to the camera 110, and the second microphone 122 is disposed at a position at a distance apart from the camera 110. Because the speaker 10 utters a voice near the first microphone 121, the volume of sound data recorded through the first microphone 121 may, for example, be higher than that of sound data recorded through the second microphone 122.

The sound data obtained through the first microphone 121 may be used as left stereo sound data, and the sound data obtained through the second microphone 122 may be used as right stereo sound data.

FIG. 1 illustrates a case in which the first microphone 121 and the second microphone 122 protrude toward the outside of the electronic apparatus 100. The protruding of the first and second microphones 121, 122 is illustrative and used to describe positions where the first microphone 121 and the second microphone 122 are disposed. In actual implementation, however, the first microphone 121 and the second microphone 122 may not protrude toward the outside of the electronic apparatus 100. For example, a small hole may be formed in an outer portion of the electronic apparatus 100, and a microphone may be disposed in the hole.

When viewing a video recorded by the electronic apparatus 100 it may be difficult to determine at which position the speaker 10 actually stands, and may determine the position of the speaker 10 based only on an image displayed on the display. The object 15 corresponding to the speaker 10 in the video is displayed on the center of the display, but the volume of the sound data obtained through the first microphone 121 may be higher than the volume of the sound data obtained through the second microphone 122. The person who watches the video may expect that the stereo sound data is balanced left and right sides, considering the object 15 corresponding to the speaker 10 displayed on the center. However, the left-side volume of the stereo sound data is different from the right-side volume of the stereo sound data, the person who watches the recorded video may determine that the stereo sound data is unbalanced.

Figure 2:
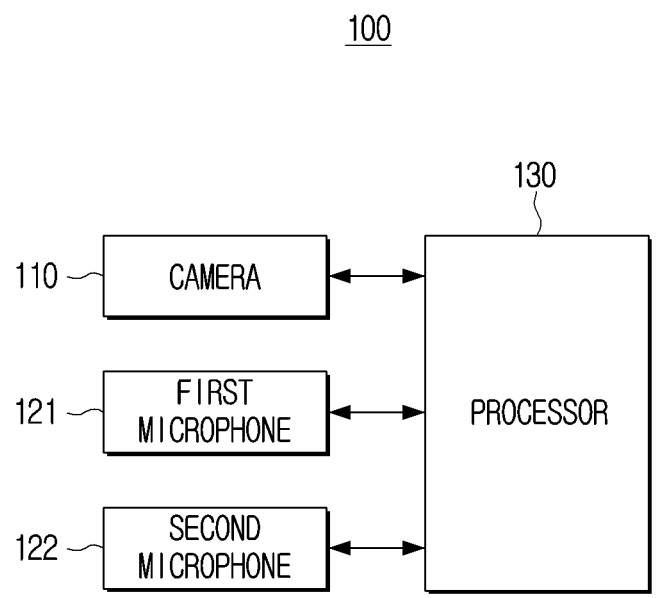
FIG. 2 is a block diagram illustrating an example electronic apparatus according to an embodiment.

FIG. 2 is a block diagram illustrating an example electronic apparatus according to an embodiment.

Referring to FIG. 2, the electronic apparatus 100 may include the camera 110, the first microphone 121, the second microphone 122, and a processor (e.g., including processing circuitry) 130.

The electronic apparatus 100 according to various embodiments may include at least one of, for example, a smartphone, a tablet personal computer (PC), a mobile phone, a desktop PC, a laptop PC, a personal digital assistant (PDA), a portable multimedia player (PMP), an MP3 player, or the like, but is not limited thereto. In some embodiments, the electronic apparatus 100 may include at least one of, for example, a television, a digital versatile disc (DVD) player, a media box (for example, Samsung HomeSync™, Apple TV™, or Google TV™), or the like, but is not limited thereto.

Further, the electronic apparatus 100 may be any of various electronic devices that include a camera and a microphone and may record a video.

The camera 110 may refer, for example, to a component for generating a captured image obtained by capturing an image of a subject. The captured image may include both a video and a still image.

The camera 110 may obtain an image of at least one external device, and may be implemented by a camera, a lens, an infrared sensor, or the like.

The camera 110 may include a lens and an image sensor. Examples of the lens include, for example, and without limitation, a general-purpose lens, a wide-angle lens, and a zoom lens, and the type of lens may be determined depending on the type, characteristic, use environment of the electronic apparatus 100. As the image sensor, a complementary metal oxide semiconductor (CMOS) image sensor, a charge coupled device (CCD) image sensor, or the like, may be used.

The camera 110 may output incident light as an image signal. For example, the camera 110 may include a lens, a pixel, and an analog-to-digital (AD) converter. The lens may collect light of a subject to form an optical image on an image capturing region, and the pixel may output light entering through the lens as an analog image signal. Further, the AD converter may convert the analog image signal into a digital image signal, and output the digital image signal. For example, the camera 110 may be disposed to capture an image of an area in front of the electronic apparatus 100, and generate a captured image by capturing an image of a user present in front of the electronic apparatus 100.

Although a case that the electronic apparatus 100 according to the embodiment of the disclosure includes one camera 110 has been described, a plurality of image capturers may be arranged in actual implementation. The electronic apparatus 100 may include a plurality of image capturers, and may identify a posture of the head of the user by combining images received through the plurality of image capturers. Using a plurality of cameras may be more effective in identifying a distance between a subject and the electronic apparatus or a posture of the head of the user, because it is possible to more precisely analyze a three-dimensional motion in a case of using a plurality of cameras, as compared with a case of using one camera.

The electronic apparatus 100 may further include the microphones 121 and 122. The microphone may include, for example, a component for receiving a user's voice or other sounds and converting the user's voice or other sounds into audio data.

The microphones 121 and 122 may receive a user's voice in an activated mode. For example, the microphone may be formed integrally with the electronic apparatus 100 at an upper side, a front surface, a side surface, or the like, of the electronic apparatus 100. The microphone may include various components such as a microphone collecting a user's voice in an analog form, an amplifier circuit amplifying the collected user's voice, an A/D conversion circuit sampling the amplified user's voice and converting the user's voice into a digital signal, and a filter circuit removing a noise component from the digital signal obtained by the conversion.

The microphone may include the first microphone 122 and the second microphone 112. The first microphone 121 and the second microphone 122 have been described above with reference to FIG. 1, and thus an overlapping description thereof may not be repeated here.

The first microphone 121 and the second microphone 122 may be spaced apart from each other, and a first distance between a position of the camera 110 and a position of the first microphone 121, and a second distance between the position of the camera 110 and a position of the second microphone 122 may be different from each other.

For example, the first microphone 121 and the second microphone 122 may be separately arranged in a left region and a right region, respectively, as illustrated in FIG. 1. For example, the first microphone 121 may be positioned in a first region, and the second microphone 122 may be positioned in a second region. The camera 110 may be positioned in any one of the first region or the second region. Therefore, a distance between the camera 110 and the first microphone 121 may be different from that between the camera 110 and the second microphone 122.

The processor 130 may include various processing circuitry and may perform an overall control operation of the electronic apparatus. The processor 130 functions to control an overall operation of the electronic apparatus.

The processor 130 may be implemented, for example, and without limitation, by a digital signal processor (DSP) processing a digital signal, a microprocessor, a time controller (TCON), or the like. However, the disclosure is not limited thereto, and the processor 130 may include, for example, and without limitation, one or more of a central processing unit (CPU), a dedicated processor, a micro controller unit (MCU), a micro processing unit (MPU), a controller, an application processor (AP), a graphics-processing unit (GPU), a communication processor (CP), an ARM processor, or the like, or may be defined by these terms. In addition, the processor 130 may be implemented by a system-on-chip (SoC) or large scale integration (LSI) in which a processing algorithm is embedded, or may be implemented in a field programmable gate array (FPGA) form. The processor 130 may perform various functions by executing computer executable instructions stored in a memory.

The processor 130 may perform a control (e.g., control the electronic apparatus 10) to obtain first sound data through the first microphone 121. The processor 130 may obtain second sound data through the second microphone 122. Further, the processor 130 may obtain image data through the camera 110. The first sound data and the second sound data may be sound data recorded at the same time. The sound data may refer, for example, to audio data, and may include voice data and non-voice data. The first sound data may be used as left stereo sound data, and the second sound data may be used as right stereo sound data. The first sound data may be used as right stereo sound data, and the second sound data may be used as left stereo sound data. In other words, the electronic apparatus 100 may generate stereo sound data using the first sound data and the second sound data, and may obtain one video content by combining the obtained image data and the generated stereo sound data.

The processor 130 may identify an object corresponding to the first sound data and the second sound data in the image data obtained through the camera 110, obtain position information of the identified object from the image data, and change volume information of at least one of the first sound data or the second sound data based on the obtained position information.

The object corresponding to the first sound data and the second sound data may refer, for example, to an object corresponding to a subject that generates a sound source of the first sound data and the second sound data. For example, it is assumed that a speaker utters a voice, and the voice of the speaker is recorded through the first microphone 121 and the second microphone 122 at the same time. The first sound data may be sound data recorded through the first microphone 121, and the second sound data may be sound data recorded through the second microphone 122. Further, the object corresponding to the first sound data and the second sound data may refer, for example, to an object corresponding to the speaker. The object corresponding to the speaker may refer, for example, to an image of the speaker in the image data obtained through the camera 110. The processor 130 may use an object recognition artificial intelligence module to identify the object. The object recognition artificial intelligence module may be directly stored in the electronic apparatus 100, or may be stored in a separate external server in some implementation examples. A relationship between the speaker and the object may, for example, be described with the speaker 10 and the object 15 corresponding to the speaker 10 in FIG. 1.

The position information of the identified object in the image data may refer, for example, to coordinate information of the object. The coordinate information may refer, for example, to information indicating a position where the object is to be displayed based on a specific reference point. The image data may be configured with a pixel and a pixel value. The object may refer, for example, to a region having a plurality of pixels and a plurality of pixel values, and the position information of the object may refer, for example, to at least one representative coordinate value. Further, the position information may include information on coordinates at which the object is positioned in the image data. For example, the position information may include left-side distance information and right-side distance information. The left-side distance information may refer, for example, to a distance from a point where the object is positioned in the image data to a left axis, and the left axis may refer, for example, to a vertical axis corresponding to the leftmost side of the image data. The right-side distance information may refer, for example, to a distance from a point where the object is positioned in the image data to a right axis, and the right axis may refer, for example, to a vertical axis corresponding to the rightmost side of the image data. The vertical axes corresponding to the leftmost side and the rightmost side of the image data, respectively, may be replaced with vertical axes corresponding to the leftmost side and the rightmost side of the screen of the electronic apparatus. The left-side distance information (first distance information) and the right-side distance information (second distance information) will be described in greater detail below with reference to FIG. 6.

The processor 130 may identify, as the object corresponding to the first sound data and the second sound data, a user (or subject) who utters the first sound data and the second sound data in the image data.

The image data may include an object that makes a sound. The object that makes a sound may be a person or a thing. For example, the person object that makes a sound may be a speaker who utters a voice. Further, the thing object that makes a sound may refer, for example, to various objects such as a stream that makes a murmuring sound and a food that makes a frying sound.

The processor 130 may identify a plurality of objects in the image data, and may selectively identify only an object that makes a sound among the plurality of objects. Further, the processor 130 may identify a person object that utters a voice. For example, based on the first sound data and the second sound data being voice data, the processor 130 may identify, as the object corresponding to the first sound data and the second sound data, a person object (or user object) that utters voice data.

The processor 130 may identify a mouth shape object, and determine whether the identified mouth shape object is changed in real time to thereby identify a user who utters a voice. Based on the mouth shape object being changed in real time, the processor 130 may determine that a person object including the mouth shape object is the object that makes a sound.

The processor 130 may obtain sound ratio information between the volume information of the first sound data and the volume information of the second sound data, and change the volume information of at least one of the first sound data or the second sound data based on the sound ratio information and the position information of the identified object.

The processor 130 may obtain the sound ratio information based on the object position information being within a predetermined range. The predetermined range may refer, for example, to the center of the image data or displayed screen. The processor 130 may guide the object to make a sound at the center of the displayed screen to change the sound data.

Positioning the object corresponding to the speaker at the center of the displayed screen may refer, for example, to the speaker who makes a sound standing in front of the camera 110. In this case, the sound made by the speaker may be obtained through the first microphone 121 and the second microphone 122, and each obtained sound data may be used as reference. A description thereof will be provided in greater detail below with reference to FIG. 15.

Changing the volume information of the sound data may refer, for example, to the processor 130 changing the volume of the sound data and generating a video based on the changed volume. Although a case that the electronic apparatus 100 according to the disclosure changes the volume of the sound data has been described, sound pressure, amplitude, frequency, phase offset, etc., may be changed, in addition to the volume of the sound data.

Volume information of sound data may refer, for example, to information corresponding to the volume of a sound.

Sound ratio information may refer, for example, to a volume ratio between the first sound data and the second sound data. For example, based on the volume of the first sound data being PL, and the volume of the second sound data is PR, the sound ratio information may refer, for example, to PL:PR. Further, the sound ratio information may include PR/PL or PL/PR. Although a case that the sound ratio information includes a value indicating a relationship between the volume of the first sound data and the volume of the second sound data, the sound ratio information may include "1/PL" and "1/PR" in some implementation examples. The sound ratio information may refer, for example, to "1/PL" and "1/PR" of FIGS. 7 and 8, or may refer, for example, to "PR/PL" or "PL/PR" of FIG. 9.

Changing output volume of the sound data based on the object position information may refer, for example, to the output volume of the sound data being changed based on a position where the object is positioned in the image data.

For example, the processor 130 may obtain weighted value information for changing the volume information of at least one of the first sound data or the second sound data based on the sound ratio information and the position information of the identified object, and change the volume information of at least one of the first sound data or the second sound data based on the obtained weighted value information.

The weighted value information may refer, for example, to a value by which the volume of the sound data is multiplied. The sound data may be classified into pre-change sound data and post-change sound data, and the processor 130 may obtain the post-change sound data by multiplying the volume of the pre-change sound data by a weighted value.

According to an embodiment, the processor 130 may apply the weighted value to both the first sound data and the second sound data. For example, the processor 130 may apply the weighted value to both the stereo sound data, and first weighted value information applied to the first sound data and second weighted value information applied to the second sound data may be different from each other. An embodiment in which the weighted value is applied to both the first sound data and the second sound data will be described in greater detail below with reference to FIGS. 7 and 8.

According to an embodiment, the processor 130 may apply the weighted value to only one of the first sound data or the second sound data. First weighted value information applied to the first sound data and second weighted value information applied to the second sound data may be different from each other. A description of this embodiment will be provided in greater detail below with reference to FIGS. 9 and 10.

The processor 130 may obtain weighted value information for changing the volume information of at least one of the first sound data or the second sound data based on the sound ratio information, and distance ratio information between a first distance from one side of the image data to the identified object, and a second distance from the other side of the image data to the identified object, and the other side of the image data may be opposite to the one side of the image data.

The one side of the image data may refer, for example, to a left vertical axis corresponding to the leftmost side of the image data, and may refer, for example, to a vertical axis 610 in FIG. 6.

The first distance from the one side of the image data to the identified object may refer, for example, to a distance from the left vertical axis corresponding to the leftmost side of the image data to a vertical axis on which the object is positioned, and may refer, for example, to first distance information 601 in FIG. 6.

The other side of the image data may refer, for example, to a right vertical axis corresponding to the rightmost side of the image data, and may refer, for example, to a vertical axis 620 in FIG. 6.

The second distance from the other side of the image data to the identified object may refer, for example, to a distance from the right vertical axis corresponding to the rightmost side of the image data to the vertical axis on which the object is positioned, and may refer, for example, to second distance information 602 in FIG. 6.

The distance ratio information may refer, for example, to a ratio between the first distance and the second distance. For example, it is assumed by way of non-limiting example that the first distance is DL and the second distance is DR. The distance ratio information may refer, for example, to a reciprocal relationship of actual distances. For example, a ratio between the first distance and the second distance may be DR:DL.

The distance ratio information may include DR/DL or DL/DR. Although a case that the distance ratio information includes a value indicating a relationship between the first distance and the second distance, the distance ratio information may include "1/DL" and "1/DR" in some implementation examples. The distance ratio information may refer, for example, to "1/DL" and "1/DR" of FIGS. 7 and 8, or may refer, for example, to "DR/DL" or "DL/DR" of FIG. 9. Although an example in which the distance ratio information simply may refer, for example, to a reciprocal of a distance has been described in the disclosure, the distance ratio information may refer, for example, to a reciprocal of the square of a distance in actual implementation. For example, the distance ratio information may refer, for example, to "$1/(DL)^2$", "$1/(DR)^2$", "$(DR/DL)^2$", or "$(DL/DR)^2$".

The processor 130 may obtain the weighted value information by multiplying the distance ratio information and the sound ratio information, and change the volume information of the first sound data or the second sound data by multiplying the volume of the first sound data or the second sound data by the weighted value information.

The weighted value information may include first weighted value information and second weighted value information. The first weighted value information may include a weighted value corresponding to the first sound data, and the second weighted value information may include a weight value corresponding to the second sound data. The first weighted value information may be different from the second weighted value information.

According to an embodiment, the sound data may be changed by applying the first weighted value information to the first sound data, and applying the second weighted value information to the second sound data. The processor 130 may change the first sound data and the second sound data at the same time, and a description thereof will be provided in greater detail below with reference to FIGS. 7 and 8.

According to an embodiment, the sound data may be changed by applying the first weighted value information to the first sound data, or applying the second weighted value information to the second sound data. The processor 130 may change only one of the first sound data or the second sound data, and a description thereof will be provided in greater detail below with reference to FIGS. 9 and 10.

The processor 130 may change the volume information by multiplying the volume of one of the first sound data or the second sound data by the weighted value information, the one sound data having a higher volume. The processor 130 may perform a sound data change operation on sound data having a higher volume. The reason why only the sound data having a higher volume is changed is that sound quality hardly deteriorates in case of changing sound data having a higher volume to sound data having a lower volume. The sound quality may deteriorate in case of changing sound data having a lower volume to sound data having a higher volume. Therefore, the processor 130 may change sound data having a higher volume by comparing the volume of the first sound data and the volume of the second sound data. Weighted value information to be applied to the sound data may vary depending on whether to change the first sound data or the second sound data. A description will be provided in greater detail below with reference to FIG. 10.

The electronic apparatus 100 may further include a display 140 (refer to FIG. 3), and the processor 130 may control the display 140 to display the volume information of the changed sound data. The processor 130 may control the display 140 to display a user interface (UI) including the changed volume information of the first sound data or the second sound data. The processor 130 may obtain distance information between a user corresponding to the identified object and the electronic apparatus 100 based on the image data, and may change the volume information of at least one of the first sound data or the second sound data based on the obtained position information based on the obtained distance information being less than a threshold distance. Based on the obtained distance information being equal to or greater than the threshold distance, the processor 130 need not perform the sound data change operation. This is because a difference in volume between the first sound data and the second sound data is not large based on the obtained distance information being equal to or greater than the threshold distance, and thus an imbalance between the image data and the sound data may not be significant. An example operation based on the distance information between a user corresponding to the identified object and the electronic apparatus 100 will be described in greater detail below with reference to FIG. 19.

The processor 130 may obtain, based on first and second objects being identified in the image data, first position information of the identified first object and second position information of the identified second object from the image data, change volume information of at least one of first sound data (recorded through the first microphone 121) or second sound data (recorded through the second microphone 122) corresponding to the first object based on the first position information, and change volume information of at least one of third sound data (recorded through the first microphone 121) or fourth sound data (recorded through the second microphone 122) corresponding to the second object based on the second position information.

According to an embodiment, based on a plurality of objects that may make a sound being identified and one of the plurality of objects currently making a sound, the processor 130 may change sound data based on position information of the object that makes a sound among the plurality of objects. A description thereof will be provided in greater detail below with reference to FIGS. 21 and 22.

According to an embodiment, based on a plurality of objects making sounds, the processor 130 may obtain position information of each of the plurality of objects, and separate (or obtain) sound data corresponding to each of the plurality of objects from sound data. The processor 130 may change each separated sound data based on the position information of each of the plurality of objects. A description thereof will be provided in greater detail below with reference to FIGS. 23 and 24.

According to an embodiment, based on sound data including both voice data and non-voice data, the processor 130 may separate the voice data and perform the sound data change operation on only the voice data. In case an object corresponding to the non-voice data moves, the processor 130 may perform the sound data change operation on the object, similarly to a case of an object corresponding to the voice data. In case the object corresponding to the non-voice data does not move, the processor 130 need not perform the sound data change operation. An additional operation for the voice data and non-voice data will be described in greater detail below with reference to FIGS. 25 and 26.

According to an embodiment, the processor 130 may determine whether the image data is obtained through the front camera, and determine whether a left-right reversal function is applied. A description thereof will be provided in greater detail below with reference to FIGS. 27, 28A and 28B.

An embodiment in which the processor 130 considers both the sound ratio information and the object position information has been described above. However, in some implementation examples, the processor 130 may change volume information of sound data by considering only at least one of the sound ratio information or the object position information.

The sound data change operation according to the disclosure may be applied in case of performing recording at close range. Close range may refer, for example, to a distance of about 1 m. In case of performing recording within a distance of about 1 m, the volume of the first sound data may be different from the volume of the second sound data by about 6 dB to 10 dB. Further, comparing the volume of sound, the volume of the first sound data may be different from the volume of the second sound data by about two or three times.

The volume of sound may be expressed by sound intensity or sound pressure. The sound intensity may refer, for example, to acoustic energy transferred to a unit area per unit time, and the unit of the sound intensity may be w/cm². The sound pressure may be related to a change amount of pressure generated at a specific position, and the unit of the sound pressure may be dyne/cm² or pascal (Pa).

In expressing the volume of sound, in case the sound intensity is expressed using the decibel (dB), the volume of sound may be expressed as dB sound intensity level (dB SIL) or dB sound power level (dB SPL).

In expressing the volume of sound, in case the sound pressure is expressed using the decibel (dB), the volume of sound may be expressed as dB sound pressure level (dB SPL).

The decibel (dB) may, for example, be $10*\log(P1/P0)$, and log may refer, for example, to the common logarithm. The common logarithm may refer, for example, to the logarithm with base 10. P1 may refer, for example, to a measured value, and P0 may refer, for example, to a reference value. $10*\log(P1/P0)$ may, for example, be a formula used in the viewpoint of power or energy. A formula used in the viewpoint of current or voltage may, for example, be $20*\log(P1/P0)$.

Although the decibel (dB) corresponds to a relative value, the electronic apparatus 100 may generally set, as a reference point, sound pressure of 0.0002 dyn/cm² (=20 uPA, in which u may refer, for example, to $10^{-6}$) which is the lowest volume (0 dB SPL) that a person may hear, and 20 uPa may be used like an absolute value. Further, the electronic apparatus 100 may set, as a reference value (0 dB), $10^{(-12)}$ $W*m^{-2}$ in the viewpoint of sound intensity, and $10^{(-12)}$ $W*m^{-2}$ may be used like an absolute value.

The electronic apparatus 100 may measure the measured value P1 as SIL or SPL based, for example, and without limitation, on an application processor (AP), an integrated circuit (IC), a digital-to-analog converter (DAC), a codec chip, or the like, which may include, for example, a processor related to a microphone, and directly convert SIL or SPL into dB. Intensity and pressure may have a difference in a unit of absolute value. However, in the electronic apparatus 100 according to the disclosure, intensity and pressure may have a relative concept in a unit of dB, and thus whether SIL or SPL is used may not affect the operation significantly.

The first sound data and second sound data received through the first microphone 121 and the second microphone 122, respectively, may be changed by a weighted value or gain. Under the assumption that power of a sound source does not change, sound intensity may be in inverse proportion to the square of a distance between the sound source and the microphone.

The electronic apparatus 100 according to an example embodiment may change sound data based on the volume of sound data and object position information to thereby match a balance between image data and sound data. Therefore, to a person who watches a video (including image data and changed sound data) generated by the electronic apparatus 100, the image data and the sound data may feel natural.

Simple components of the electronic apparatus 100 are illustrated and described hereinabove, but various components may be further included in the electronic apparatus 100 in an example implementation. This will be described in greater detail below with reference to FIG. 3.

Figure 3:
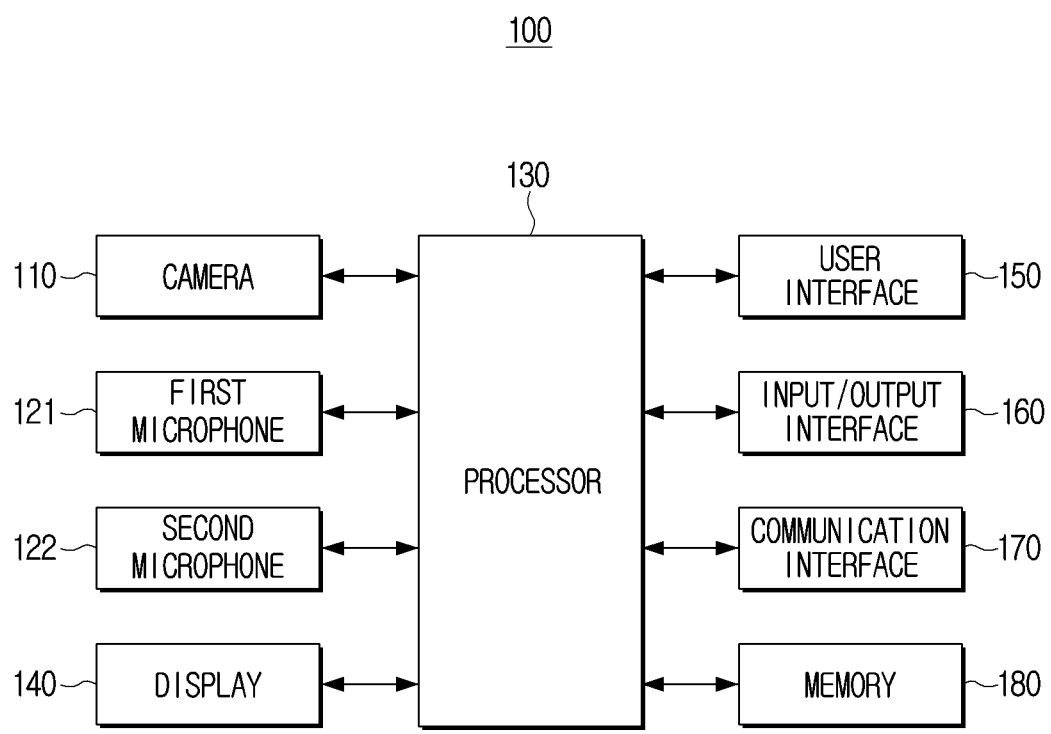
FIG. 3 is a block diagram illustrating an example configuration of the electronic apparatus of FIG. 2 according to an embodiment.

FIG. 3 is a block diagram illustrating an example configuration of the electronic apparatus of FIG. 2.

Referring to FIG. 3, the electronic apparatus 100 may include the camera 110, the first microphone 121, the second microphone 122, the processor (e.g., including processing circuitry) 130, the display 140, a user interface (e.g., including user interface circuitry) 150, an input/output interface (e.g., including input/output circuitry) 160, a communication interface (e.g., including communication circuitry) 170, and a memory 180.

An\ overlapping description of the same operations of the camera 110, the first microphone 121, the second microphone 122, and the processor 130 as those described above may not be repeated here.

The display 140 may be implemented by various types of displays such as, for example, and without limitation, a liquid crystal display (LCD), an organic light emitting diode (OLED) display, a plasma display panel (PDP), or the like. A driving circuit, a backlight unit, and the like, that may be implemented in a form such as a-si thin film transistor (TFT), a low temperature poly silicon (LTPS) TFT, or an organic TFT (OTFT) may be included in the display 140. The display 140 may be implemented by a touch screen combined with a touch sensor, a flexible display, a three-dimensional (3D) display, or the like.

In addition, the display 140 according to an embodiment of the disclosure may include a display panel that outputs an image, and a bezel that houses the display panel. For example, the bezel according to an embodiment of the disclosure may include a touch sensor (not illustrated) for detecting a user interaction.

The user interface 150 may include various user interface circuitry, and may, for example, be implemented by a device such as a button, a touch pad, a mouse, or a keyboard, or may be implemented by a touch screen that may perform the above-described display function and an operation input function. The button may be various types of buttons such as a mechanical button, a touch pad, and a wheel formed in any region such as a front surface portion, a side surface portion, or a rear surface portion of a body appearance of the electronic apparatus 100.

The input/output interface 160 may include various input/output circuitry, and may include, for example, one or more of high definition multimedia interface (HDMI), mobile high-definition link (MHL), universal serial bus (USB), DisplayPort (DP), a thunderbolt, a video graphics array (VGA) port, an RGB port, a D-subminiature (D-SUB), or a digital visual interface (DVI).

The input/output interface 160 may input and output at least one of an audio signal or a video signal.

In some examples, the input/output interface 160 may include, as separate ports, a port for inputting and outputting only an audio signal and a port for inputting and outputting only a video signal, or may be implemented as one port for inputting and outputting both an audio signal and a video signal.

The communication interface 170 may include various communication circuitry and may perform communication with various types of external devices in various types of communication manners. The communication interface 170 may include various communication modules, each including various communication circuitry, such as, for example, and without limitation, a Wi-Fi module, a Bluetooth module, an infrared communication module, a wireless communication module, and the like. Each communication module may, for example, be implemented in a form of at least one hardware chip.

The Wi-Fi module and the Bluetooth module may perform communication in a Wi-Fi manner and a Bluetooth manner, respectively. In case of using the Wi-Fi module or Bluetooth module, various connection information such as a service set identifier (SSID) and a session key is first transmitted and received, communication is connected using the connection information, and various information may then be transmitted and received.

The infrared communication module may perform communication according to an infrared data association (IrDA) technology using infrared light which lies between visible light and millimeter waves for short-distance wireless data transmission.

The wireless communication module may include, for example, and without limitation, at least one communication chip performing communication according to various wireless communication protocols such as Zigbee, $3^{rd}$ generation (3G), $3^{rd}$ generation partnership project (3GPP), long term evolution (LTE), LTE Advanced (LTE-A), $4^{th}$ generation (4G), and $5^{th}$ generation (5G), in addition to the communication manner described above.

In addition, the communication interface may include at least one wired communication module performing communication using a local area network (LAN) module, an Ethernet module, a pair cable, a coaxial cable, an optical fiber cable, an ultra wide-band (UWB) module, or the like.

According to an example, the communication interface 170 may use the same communication module (for example, the Wi-Fi module) to perform communication with an external device such as a remote controller, and an external server.

According to an example, the communication interface 170 may use different communication modules (for example, the Wi-Fi module) to perform communication with an external device such as a remote controller, and an external server. For example, the communication interface 170 may use at least one of the Ethernet module or the Wi-Fi module to perform communication with an external server, and may use the BT module to perform communication with an external device such as a remote controller. However, this is merely an example, and the communication interface 170 may use at least one of various communication modules in case of performing communication with a plurality of external devices or external servers.

The memory 180 may be implemented by an internal memory such as, for example, and without limitation, a read-only memory (ROM) (for example, an electrically erasable programmable read only memory (EEPROM)) or random access memory (RAM) included in the processor 130 or be implemented by a memory separate from the processor 130. The memory 180 may be implemented in a form of a memory embedded in the electronic apparatus 100 or in a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100.

The memory embedded in the electronic apparatus 100 may be implemented by, for example, and without limitation, at least one of a volatile memory (for example, a dynamic RAM (DRAM), a static RAM (SRAM), or a synchronous dynamic RAM (SDRAM)), a non-volatile memory (for example, a one time programmable ROM (OTPROM), a programmable ROM (PROM), an erasable and programmable ROM (EPROM), an EEPROM, a mask ROM, a flash ROM, a flash memory (for example, a NAND flash or a NOR flash), a hard drive, or a solid state drive (SSD), and the memory attachable to and detachable from the electronic apparatus 100 may be implemented by a memory card (for example, a compact flash (CF), a secure digital (SD), a micro secure digital (Micro-SD), a mini secure digital (Mini-SD), an extreme digital (xD), or a multi-media card (MMC)), an external memory (for example, a USB memory) connectable to a USB port, or the like.

Figure 4:
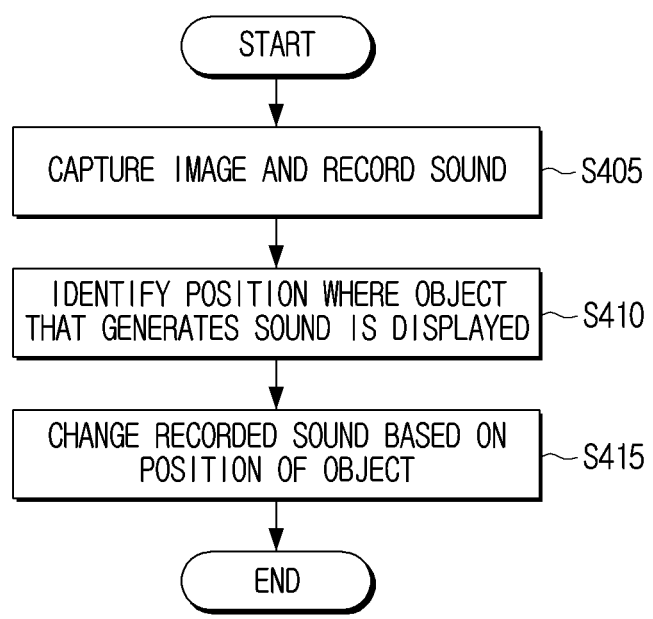
FIG. 4 is a flowchart illustrating an example video recording operation according to an embodiment.

FIG. 4 is a flowchart illustrating an example video recording operation according to an embodiment.

Referring to FIG. 4, the electronic apparatus 100 may capture an image using the camera 110. The electronic apparatus 100 may record a sound (or audio) using the first microphone 121 and the second microphone 122 (S405). Respective sound data recorded through a plurality of microphones may be used as stereo sound data.

The electronic apparatus 100 may identify a position where an object corresponding to a subject that generates a sound is displayed (S410). The object that makes (generates) a sound may refer, for example, to an object (or subject) that makes a sound. For example, the object that generates a sound may be a person who utters a voice, an animal that makes a sound, or a food that makes a boiling sound. The electronic apparatus 100 may obtain position information indicating the position where the object that generates a sound is displayed based on image data obtained through the camera 110. An operation of obtaining the position information will be described in greater detail below with reference to FIG. 6.

The electronic apparatus 100 may change the recorded sound data based on the obtained object position information (S415). The electronic apparatus 100 may record a sound using a plurality of microphones, and may generate a plurality of sound data based on the sound recorded through each of the plurality of microphones. Further, the electronic apparatus 100 may change the plurality of generated sound data based on the obtained object position information.

In FIG. 4, a case that the electronic apparatus 100 changes the recorded sound data has been illustrated. However, in an example implementation, the electronic apparatus 100 may obtain sound data by adjusting the input gain of a microphone, rather than changing the recorded sound data. For example, the input gain of a microphone is changed based on the object position information, and the electronic apparatus 100 may obtain sound data changed depending on the input gain of the microphone.

Figure 5:
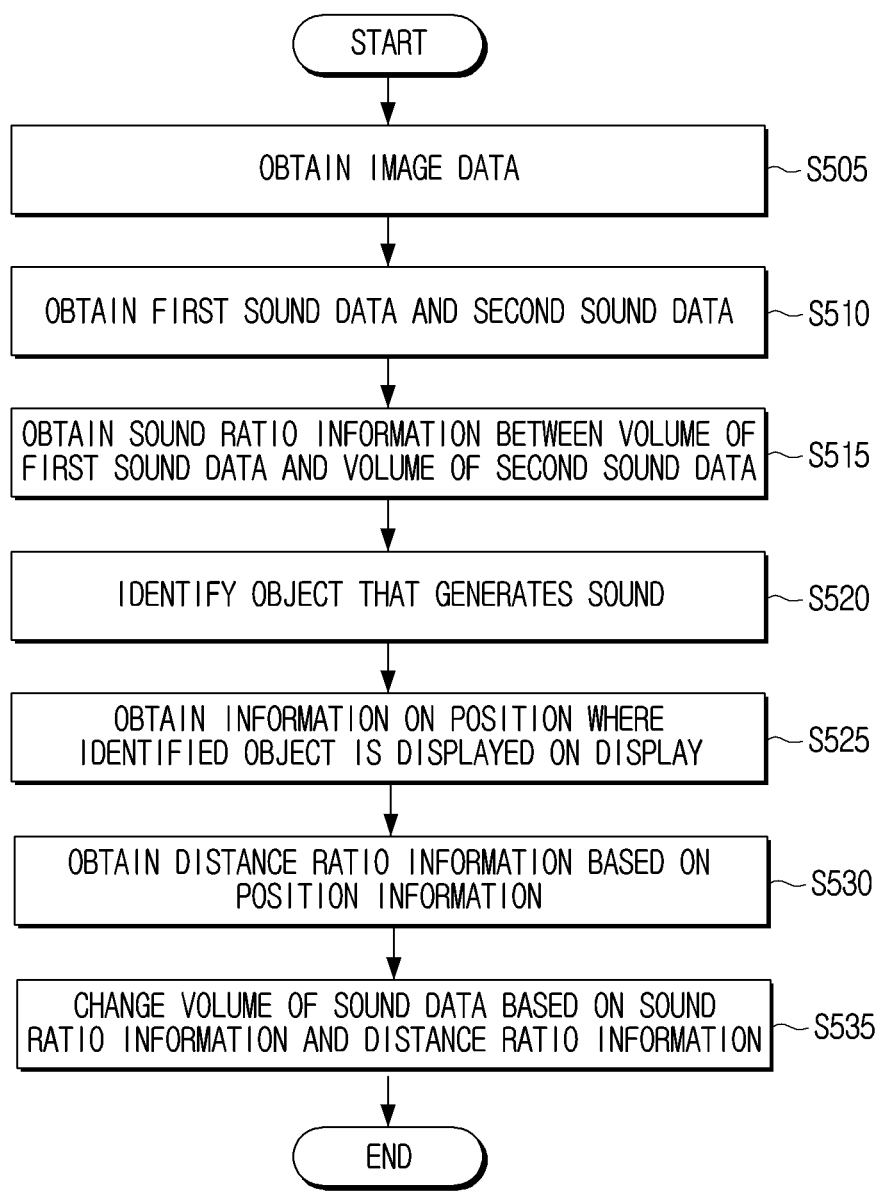
FIG. 5 is a flowchart illustrating an example recording operation of FIG. 4 according to an embodiment.

FIG. 5 is a flowchart illustrating an example recording operation of FIG. 4 according to an embodiment.

Referring to FIG. 5, the electronic apparatus 100 may obtain image data including an object (S505).

The electronic apparatus 100 may obtain first sound data and second sound data (S510). The first sound data and the second sound data may refer, for example, to stereo sound data, and may be obtained in time-synchronization (time sync) with the image data. S505 and S510 may be performed at the same time. For example, the electronic apparatus 100 may obtain the image data, the first sound data, and the second sound data at the same time.

The electronic apparatus 100 may obtain sound ratio information between the volume of the first sound data and the volume of the second sound data (S515). The sound ratio information may refer, for example, to a ratio between the volumes of sounds recorded through a plurality of microphones, respectively.

The electronic apparatus 100 may identify an object that generates a sound (S520). The object that generates a sound may refer, for example, to an object that makes a sound. The electronic apparatus 100 may identify the object that generates a sound based on the image data obtained through the camera 110. For example, the processor 100 may identify a plurality of objects in the obtained image data using an artificial intelligence module, and may identify an object that makes a sound among the plurality of objects.

The electronic apparatus 100 may identify information on a position where the identified object is displayed on the display (S525). The object identified by the electronic apparatus 100 is based on the image data, and the image data may be displayed on a device including a display. The image data may include position information corresponding to the object, and the position information may include information indicating a position where the object is to be displayed in the image. The position information may refer, for example, to coordinate information.

The electronic apparatus 100 may obtain distance ratio information based on the position information corresponding to the object (S530). The distance ratio information may refer, for example, to a ratio between a distance from the position where the object is displayed to a left axis, and a distance from the position where the object is displayed to a right axis. A description of the position information will be provided in greater detail below with reference to FIG. 6.

The electronic apparatus 100 may change volume information of the sound data based on at least one of the sound ratio information obtained in S515 or the distance ratio information obtained in S530 (S535). A calculation process of changing the sound data based on at least one of the sound ratio information or the distance ratio information will be described in greater detail below with reference to FIG. 9.

FIG. 6 is a diagram illustrating an example operation of obtaining object position information according to an embodiment.

A first example 600-1 in which an object 605 is positioned at the center of image data and a second example 600-2 in which the object 605 is positioned on the right side of the image data will be described with reference to FIG. 6.

The image data may have three reference axes. The reference axes may include a left axis 610, an object axis 615, and a right axis 620. The left axis 610 may be a y axis (or vertical axis) corresponding to the leftmost side of the image data, and may refer, for example, to a y axis with an x-coordinate value of 0 in the image data. The object axis 615 may refer, for example, to a y axis with coordinates at which the object is positioned. The right axis 620 may refer, for example, to a y axis (or vertical axis) corresponding to the rightmost side of the image data, and may refer, for example, to a y axis with a maximum x-coordinate value in the image data. In case the size of the image is uniform, the left axis 610 and the right axis 620 may be fixed, and the object axis 615 may move according to movement of the object.

The left axis 610 and the right axis 620 may be obtained based on display information of various display devices that output the image data, in addition to the image data. The object 605 may refer, for example, to an object that generates a sound. Although FIG. 6 illustrates a case that the object is a person, the object 605 may be various objects that make a sound.

Position information of the object 605 may refer, for example, to coordinate information, and the electronic apparatus 100 may obtain the first distance information 601 and the second distance information 602 based on the coordinate information of the object 605.

The first distance information 601 may include distance information between the object axis 615 of the image data and the left axis 610 of the image data (DL). Further, the first distance information 601 may refer, for example, to an x-coordinate value of the object.

The second distance information 602 may include distance information between the object axis 615 of the image data and the right axis 620 of the image data (DR). Further, the second distance information 602 may refer, for example, to a value obtained by subtracting the x-coordinate value of the object from a maximum x-coordinate value of the image data.

In the first example 600-1, the object 605 may be positioned at the center of the displayed image data. The first distance information 601 and the second distance information 602 may be the same value. For example, in case a maximum x-axis value of the image data is 10, and the x-coordinate value of the object is 5, the first distance information 601 may be 5, and the second distance information 602 may be 5.

In the second example 600-2, the object 605 may be positioned on the right side of the displayed image data. The first distance information 601 may be greater than the second distance information 602. For example, in case the maximum x-axis value of the image data is 10, and the x-coordinate value of the object is 8, the first distance information 601 may be 8, and the second distance information 602 may be 2.

The electronic apparatus 100 may obtain distance ratio information based on the first distance information 601 and the second distance information 602. The distance ratio information may include at least one of a value obtained by dividing the first distance information 601 by the second distance information 602, or a value obtained by dividing the second distance information 602 by the first distance information 601.

FIG. 7 is a diagram illustrating an example of a change of sound data according to an embodiment.

Referring to FIG. 7, it may be assumed by way of non-limiting example that the first microphone 121 is a left-side microphone and the second microphone 122 is a right-side microphone. Such left-right division is under the assumption that the camera 110 and the first microphone 121 are positioned on the left side and the second microphone 122 is positioned on the right side as in the electronic apparatus 100 illustrated in FIG. 1.

However, the camera 110 and the first microphone 121 may be positioned on the right side. A description thereof will be provided in greater detail below with reference to FIG. 18.

Referring to FIG. 7, the electronic apparatus 100 may generate stereo sound data using first sound data obtained through the first microphone 121, and second sound data obtained through the second microphone 122.

The electronic apparatus 100 may obtain first weighted value information 712 corresponding to the first sound data and second weighted value information 722 corresponding to the second sound data.

According to a first example 700-1, the electronic apparatus 100 may obtain predetermined weighted value information.

The first weighted value information 712 may be a value obtained by multiplying a predetermined constant (K) and a reciprocal (1/PL) of the volume 711 of the first sound data. The second weighted value information 722 may be a value obtained by multiplying the predetermined constant (K) and a reciprocal (1/PR) of the volume 721 of the second sound data. The predetermined constant (K) may be a value predetermined to prevent and/or reduce the volume of the sound from being decreased or increased at the time of changing the volume of the sound, or to provide an optimal volume of sound. According to a second example 700-2, the electronic apparatus 100 may obtain weighted value information based on distance information.

The first weighted value information 712 may be a value obtained by multiplying a value (K1) determined based on first distance information, and the reciprocal (1/PL) of the volume 711 of the first sound data.

The second weighted value information 722 may be a value obtained by multiplying a value (K2) determined based on second distance information, and the reciprocal (1/PR) of the volume 721 of the second sound data.

The electronic apparatus 100 may obtain the volume (PL) 711 of the first sound data obtained through the first microphone 121. Here, the electronic apparatus 100 may obtain the first weighted value information (k1/PL) 712 corresponding to the first sound data. "K1" may be a value determined based on object position information. The electronic apparatus 100 may change the first sound data by multiplying the volume 711 of the first sound data by the first weighted value information 712. The changed first sound data may include "K1". For example, the electronic apparatus 100 may obtain the volume (K1) 713 of the first sound data changed based on the volume 711 of the first sound data and the first weighted value information 712 corresponding to the first sound data.

The electronic apparatus 100 may obtain the volume (PR) 721 of the second sound data obtained through the second microphone 122. Here, the electronic apparatus 100 may obtain the second weighted value information (K2/PR) 722 corresponding to the second sound data. "K2" may be a value determined based on object position information. Here, the electronic apparatus 100 may change the second sound data by multiplying the volume 721 of the second sound data by the second weighted value information 722. The changed second sound data may include "K2". For example, the electronic apparatus 100 may obtain the volume (K2) 723 of the second sound data changed based on the volume 721 of the second sound data and the second weighted value information 722 corresponding to the second sound data.

The electronic apparatus 100 may obtain "PL:PR" as initial sound ratio information 731, and obtain "K1:K2" as post-change sound ratio information 733.

Figure 8:
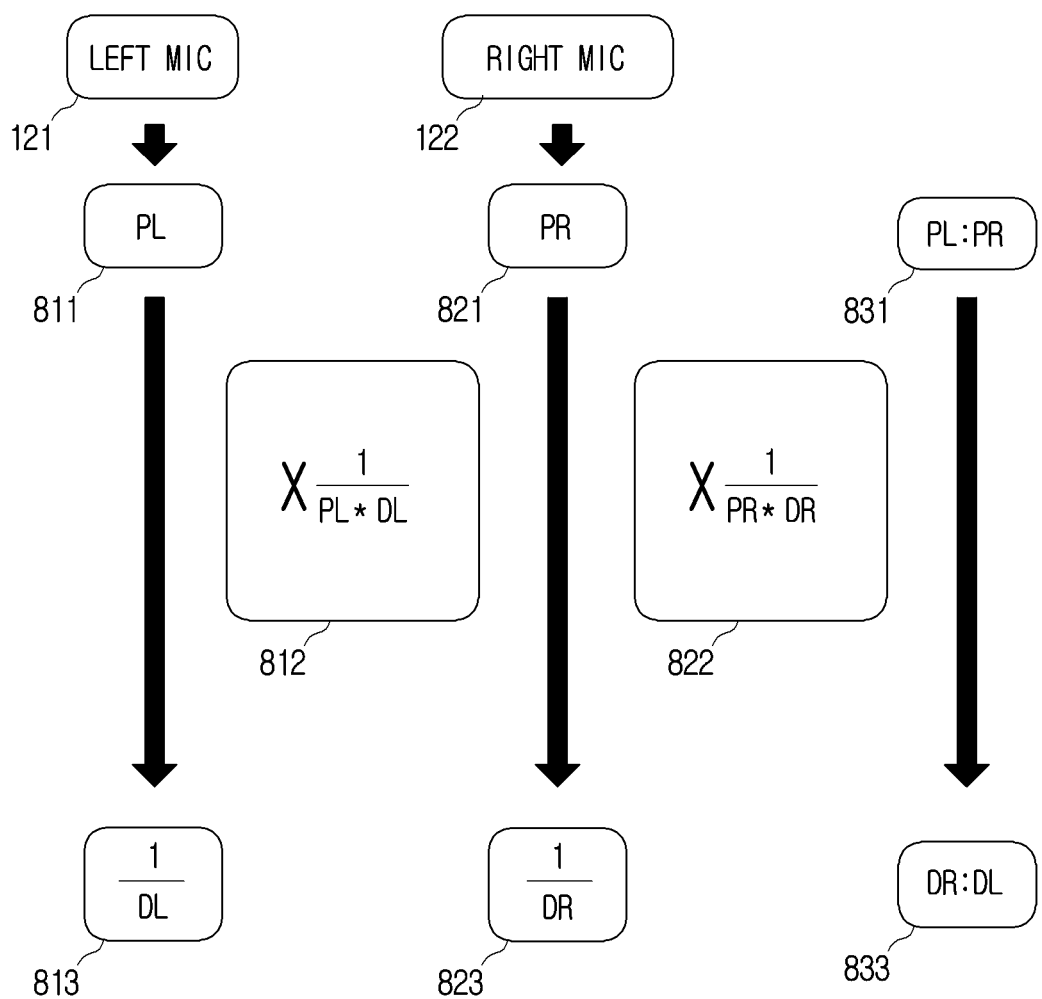
FIG. 8 is a diagram illustrating an example of a change of sound data according to an embodiment.

FIG. 8 is a diagram illustrating an example of a change of sound data according to an embodiment.

Referring to FIG. 8, it may be assumed by way of non-limiting example that the first microphone 121 is a left-side microphone and the second microphone 122 is a right-side microphone. Other overlapping descriptions provided with reference to FIG. 7 may not be repeated here.

The electronic apparatus 100 may obtain first weighted value information 812 corresponding to the first sound data and second weighted value information 822 corresponding to the second sound data.

The first weighted value information 812 may be a value obtained by multiplying a reciprocal (1/DL) of first distance information DL, and a reciprocal (1/PL) of the volume 811 of the first sound data. "K1" of FIG. 7 may refer, for example, to "1/DL".

The second weighted value information 822 may be a value obtained by multiplying a reciprocal (1/DR) of second distance information DR, and a reciprocal (1/PR) of the volume 821 of the second sound data. "K2" of FIG. 7 may refer, for example, to "1/DR".

The electronic apparatus 100 may obtain the volume (PL) 811 of the first sound data obtained through the first microphone 121. The electronic apparatus 100 may obtain the first weighted value information (1/(PL*DL)) 812 corresponding to the first sound data. "1/(PL*DL)" may be a value determined based on object position information. The electronic apparatus 100 may change the first sound data by multiplying the volume 811 of the first sound data by the first weighted value information 812. The changed first sound data may include "1/(PL*DL)". For example, the electronic apparatus 100 may obtain the volume (1/DL) 813 of the first sound data changed based on the volume 811 of the first sound data and the first weighted value information 812 corresponding to the first sound data.

The electronic apparatus 100 may obtain the volume (PR) 821 of the second sound data obtained through the second microphone 122. The electronic apparatus 100 may obtain the second weighted value information (1/(PR*DR)) 822 corresponding to the second sound data. "1/(PR*DR)" may be a value determined based on object position information. The electronic apparatus 100 may change the second sound data by multiplying the volume 821 of the second sound data by the second weighted value information 822. The changed second sound data may include "1/(PR*DR)". For example, the electronic apparatus 100 may obtain the volume (1/DR) 823 of the second sound data changed based on the volume 821 of the second sound data and the second weighted value information 822 corresponding to the second sound data.

The electronic apparatus 100 may obtain "PL:PR" as initial sound ratio information 831, and obtain "DR:DL" as post-change sound ratio information 833.

Although FIGS. 7 and 8 illustrate the operation of changing both the volume of the first sound data and the volume of the second sound data, only one of the volume of the first sound data or the volume of the second sound data may be changed in some implementation examples. A description thereof will be provided in greater detail below with reference to FIG. 9.

FIG. 9 is a diagram illustrating an example of a change of sound data according to an embodiment.

A first example 900-1 in which only the volume 911 of the first sound data is changed, and a second example 900-2 in which only the volume 921 of the second sound data is changed will be described with reference to FIG. 9.

The electronic apparatus 100 may obtain first weighted value information 912 corresponding to the first sound data and second weighted value information 922 corresponding to the second sound data.

The first weighted value information 912 may be a value obtained by multiplying first distance ratio information (DR/DL) corresponding to the first sound data, and first sound ratio information (PR/PL) corresponding to the first sound data. In case the first distance ratio information is DL/DR, the first sound ratio information corresponding to the first sound data may be PL/PR.

The second weighted value information 922 may be a value obtained by multiplying second distance ratio information (DL/DR) corresponding to the second sound data, and second sound ratio information (PL/PR) corresponding to the second sound data. In case the second distance ratio information is DR/DL, the second sound ratio information corresponding to the second sound data may be PR/PL.

According to the first example 900-1, the electronic apparatus 100 may change only the volume 911 of the first sound data without changing the volume 921 of the second sound data. Therefore, the volume (PR) 921 of the second sound data is maintained as same value (PR) 923.

The electronic apparatus 100 may obtain the volume (PL) 911 of the first sound data obtained through the first microphone 121. Here, the electronic apparatus 100 may obtain the first weighted value information ((DR/DL)*(PR/PL))

912 corresponding to the first sound data. "(DR/DL)*(PR/PL)" may be a value obtained based on the distance ratio information corresponding to the first sound data and the sound ratio information corresponding to the first sound data. The electronic apparatus 100 may change the first sound data by multiplying the volume 911 of the first sound data by the first weighted value information 912. The changed first sound data may include "(DR/DL)*PR". For example, the electronic apparatus 100 may obtain the volume ((DR/DL)*PR) 913 of the first sound data changed based on the volume 911 of the first sound data and the first weighted value information 912 corresponding to the first sound data.

The electronic apparatus 100 may obtain "PL:PR" as initial sound ratio information 931, and obtain "DR:DL" as post-change sound ratio information 933.

According to the second example 900-2, the electronic apparatus 100 may change only the volume 921 of the second sound data without changing the volume 911 of the first sound data. Therefore, the volume (PR) 911 of the first sound data is maintained as same value (PR) 913.

The electronic apparatus 100 may obtain the volume (PR) 921 of the second sound data obtained through the second microphone 122. Here, the electronic apparatus 100 may obtain the second weighted value information ((DL/DR)*(PL/PR)) 922 corresponding to the second sound data. Here, "(DL/DR)*(PL/PR)" may be a value obtained based on the distance ratio information corresponding to the second sound data and the sound ratio information corresponding to the second sound data. The electronic apparatus 100 may change the second sound data by multiplying the volume 921 of the second sound data by the second weighted value information 922. The changed second sound data may include "(DL/DR)*PL". That is, the electronic apparatus 100 may obtain the volume ((DL/DR)*PL) 923 of the second sound data changed based on the volume 921 of the second sound data and the second weighted value information 922 corresponding to the second sound data.

The electronic apparatus 100 may obtain "PL:PR" as initial sound ratio information 931, and obtain "DR:DL" as post-change sound ratio information 933.

Meanwhile, FIGS. 7, 8 and 9 illustrate various examples in which obtained volume information of sound data is multiplied by weighted value information. However, in some examples, the electronic apparatus 100 may change volume information of sound data using various methods.

As an example, the electronic apparatus 100 may subtract a first value (a dB) from the volume of the first sound data and subtract a second value (b dB) from the volume of the second sound data based on a predefined decibel formula. The electronic apparatus 100 may amplify the respective obtained values by a third value (k dB).

As another example, in the electronic apparatus 100, different weighted value information, correction algorithm (sound volume information change algorithm), or the like may be applied depending on a difference of a stereo microphone element, a processing method of a terminal device, or the like. For example, a reciprocal, the square of a reciprocal, a distance square ratio, or the like may be applied to the correction algorithm.

The algorithm of changing volume information of sound data in the control operation of the electronic apparatus 100 according to the disclosure is not limited to any specific algorithm, and various algorithms may be applied according to user setting or situation.

Figure 10:
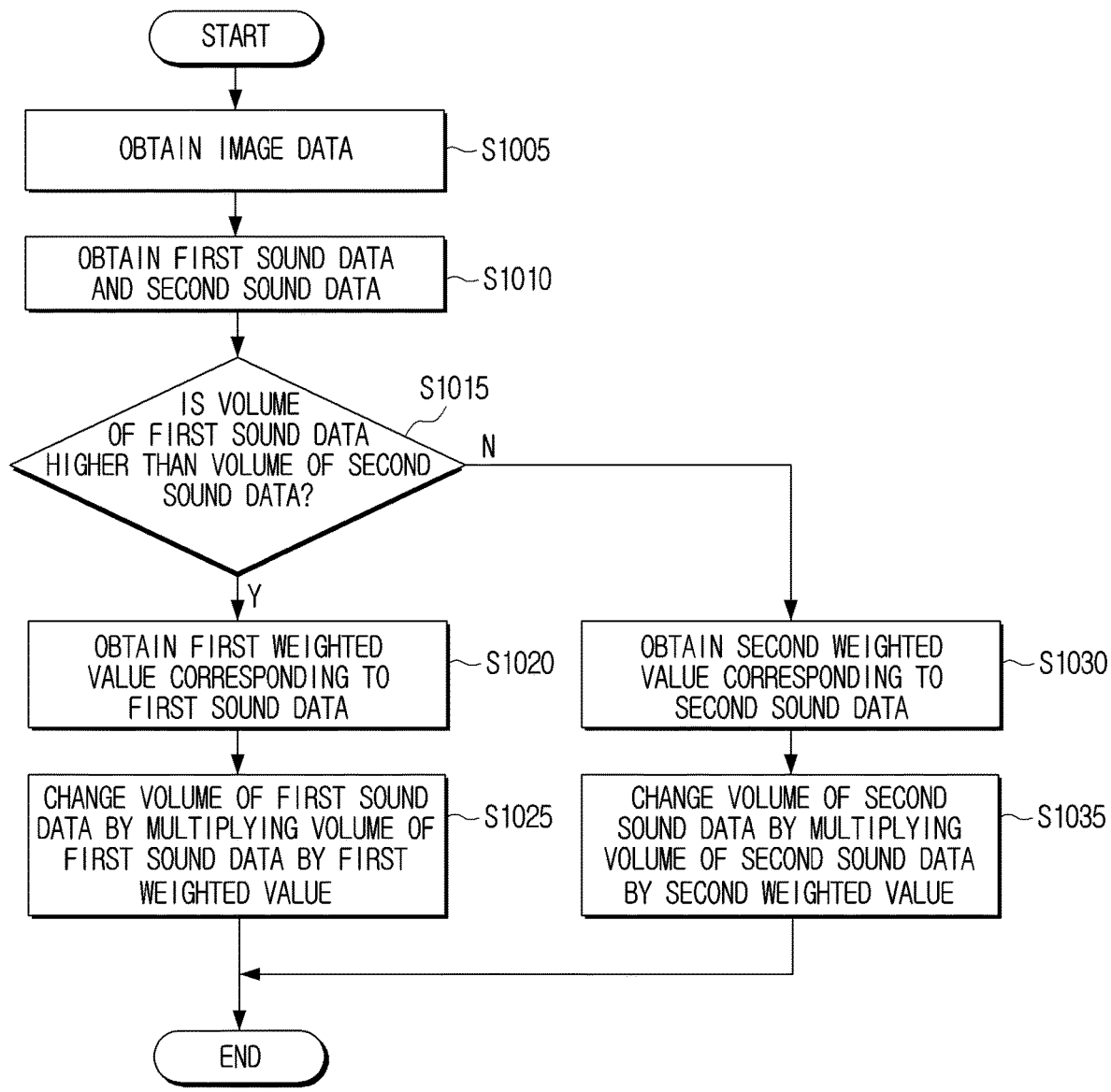
FIG. 10 is a flowchart an example operation of the electronic apparatus according to an embodiment.

FIG. 10 is a flowchart illustrating an example operation of the electronic apparatus illustrated in FIG. 9 according to an embodiment.

Referring to FIG. 10, the electronic apparatus 100 may obtain image data (S1005). The electronic apparatus 100 may obtain first sound data and second sound data (S1010). The first sound data and the second sound data may refer, for example, to stereo sound data. For example, the first sound data may refer, for example, to left stereo sound data, and the second sound data may refer, for example, to right stereo sound data.

The electronic apparatus 100 may determine whether the volume of the first sound data is higher than the volume of the second sound data (S1015). A reason for obtaining the volume of sound data may, for example, be to change only one of the first sound data or the second sound data. In general, sound quality may deteriorate as the volume of sound data is increased. However, the deterioration in sound quality may be less severe in case of decreasing the volume of sound data. Therefore, the electronic apparatus 100 may perform an operation of decreasing the volume of sound data having a higher volume among the first sound data and the second sound data.

In case the volume of the first sound data is higher than the volume of the second sound data ("Y" in operation S1015), the electronic apparatus 100 may obtain a first weighted value corresponding to the first sound data (S1020). The electronic apparatus 100 may change the volume of the first sound data by multiplying the volume of the first sound data by the first weighted value (S1025).

In case the volume of the first sound data is lower than the volume of the second sound data ("N" in operation S1015), the electronic apparatus 100 may obtain a second weighted value corresponding to the second sound data (S1030). The electronic apparatus 100 may change the volume of the second sound data by multiplying the volume of the second sound data by the second weighted value (S1035).

Figure 11:
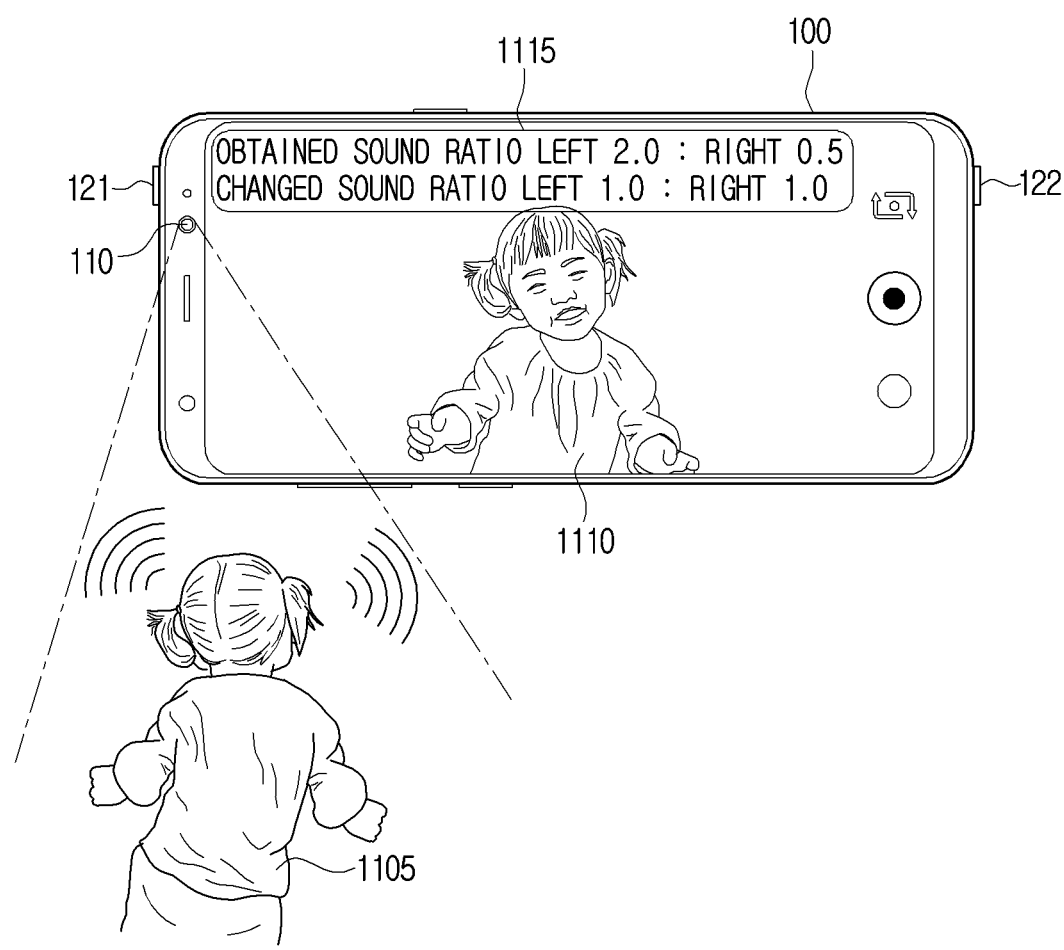
FIG. 11 is a diagram illustrating an example recording operation according to an embodiment.

FIG. 11 is a diagram illustrating an example recording operation according to an embodiment.

Referring to FIG. 11, the electronic apparatus 100 may record a video. For example, the electronic apparatus 100 may capture an image using the camera 110. The camera 110 may refer, for example, to a front camera, and it is assumed by way of non-limiting example that a speaker 1105 stands in front of the camera 110. The speaker 1105 stands in front of the camera 110, but does not stand in front of the center of the electronic apparatus 100.

Further, in case the speaker 1105 generates a sound, the first microphone 121 and the second microphone 122 may record the sound generated by the speaker 1105. A distance between the speaker 1105 and the first microphone 121 may be different from that between the speaker 1105 and the second microphone 122. Therefore, the volume of first sound data recorded through the first microphone 121 and the volume of second sound data recorded through the second microphone 122 may be different from each other.

Although an object 1110 corresponding to the speaker 1105 is positioned at the center of the image, the volume of the first sound data and the volume of the second sound data may be different from each other. In such a situation, a person who watches the video may misunderstand that the sound data has a problem. Therefore, the electronic apparatus 100 may perform an operation of changing the volume of sound data to solve such an imbalance problem.

For example, it is assumed by way of non-limiting example that a ratio between the volume of the first sound data and the volume of the second sound data is 2:0.5.

Because the object 1110 corresponding to the speaker 1105 is positioned at the center of the image data, the electronic apparatus 100 may change the sound data to make the volume of the first sound data and the volume of the second sound data have a ratio of 1:1. The specific sound data conversion (change) process has been described with reference to FIGS. 7, 8 and 9, and thus an overlapping description may not be repeated here.

The electronic apparatus 100 may generate information on pre-conversion sound data and information on post-conversion sound data (or post-changed sound data), and include, in the image data, the generated information. The information on sound data may refer, for example, to volume information or volume ratio information. The electronic apparatus 100 may display, on the display, at least one of the pre-conversion sound data volume ratio (2:0.5) or the post-conversion sound data volume ratio (1:1).

The electronic apparatus 100 may display volume information as it is with a value of the volume of sound data, a dB value, or the like (not illustrated as a UI).

The electronic apparatus 100 may display, as a UI 1115, the information on pre-conversion sound data and the information on post-conversion sound data. "Obtained" may refer, for example, to an actual volume or volume ratio of an obtained sound (raw signal), and "changed" may refer, for example, to a corrected volume or volume ratio of a changed and recorded sound. Further, the recorded sound may be obtained by recording and changing a sound based on the algorithm according to the disclosure, and may be obtained by adjusting the gain at the time of obtaining a sound and recording data based on the adjustment.

Figure 12:
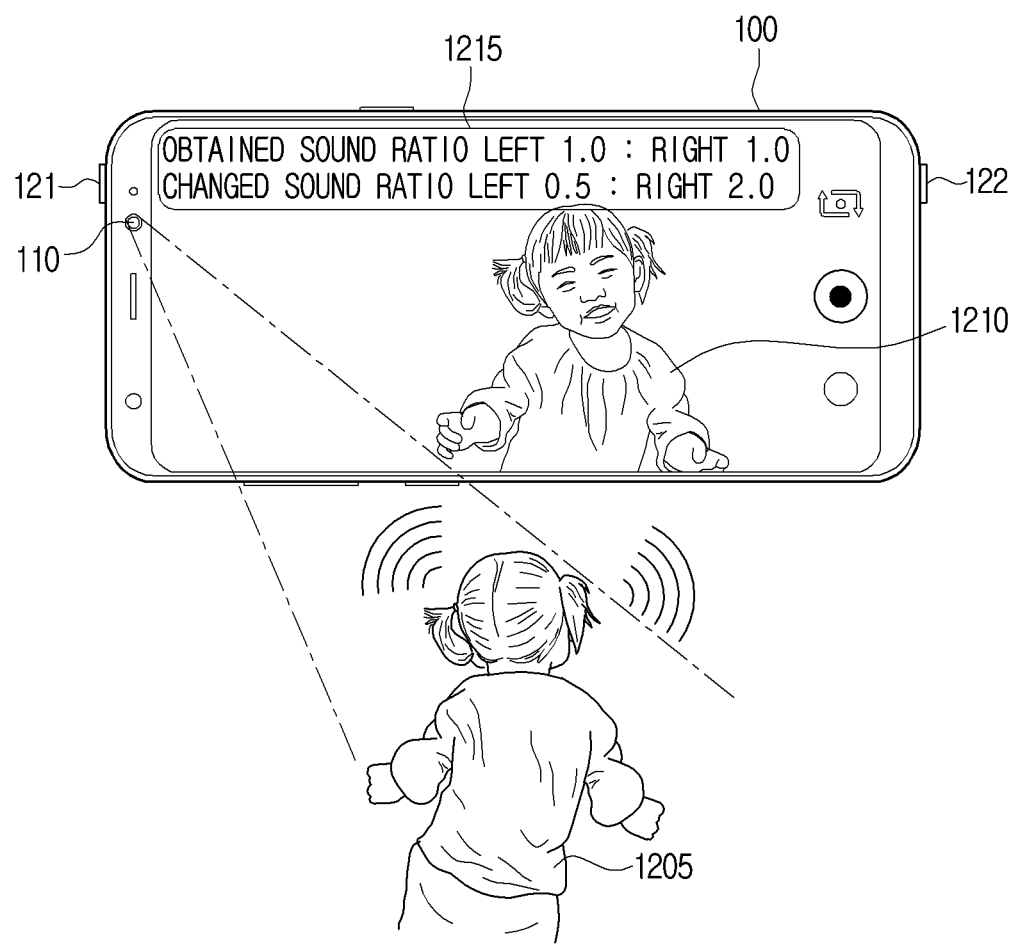
FIG. 12 is a diagram illustrating an example recording operation according to an embodiment.

FIG. 12 is a diagram illustrating an example recording operation according to an embodiment.

Referring to FIG. 12, the electronic apparatus 100 may record a video in a situation in which a speaker 1205 stands in front of the center of a front surface portion of the electronic apparatus 100.

In case the speaker 1205 stands in front of the center of the front surface portion of the electronic apparatus 100, an object 1210 corresponding to the speaker 1205 may not necessarily be positioned at the center of image data captured by the camera 110. This is because the speaker 1205 is on the left of the camera 110. In case the left-right reversal function is automatically performed in the camera 110, the image data in which the object 1210 corresponding to the speaker 1205 is positioned on the right side may be generated.

The volume of sound data recorded through the first microphone 121 and the volume of sound data recorded through the second microphone 122 may be the same as each other (under the assumption that the first microphone 121 and the second microphone 122 have the same performance). This is because a distance between the speaker 1205 and the first microphone 121 is the same as that between the speaker 1205 and the second microphone 122. In case the first microphone 121 and the second microphone 122 have different performances, a compensation based on the performance difference may be added.

Although the object 1210 corresponding to the speaker 1205 is positioned on the right side, a person who watches the video may feel that the volume of first sound data and the volume of second sound data are the same as each other. Therefore, the person who watches the video may feel that the stereo sound data and the image data do not match each other.

Therefore, the electronic apparatus 100 may change sound data. For example, the electronic apparatus 100 may perform an operation of changing the volume of sound data based on position information of the object 1210 corresponding to the speaker 1205.

For example, it is assumed by way of non-limiting example that a ratio between the volume of the first sound data and the volume of the second sound data is 1:1. Because the object 1210 corresponding to the speaker 1205 is positioned at a position corresponding to a ratio of 2 (left):0.5 (right) in the image data, the electronic apparatus 100 may change the sound data to make the volume of the first sound data and the volume of the second sound data have a ratio of 0.5:2. The specific sound data conversion (change) process has been described with reference to FIGS. 7, 8 and 9, and thus an overlapping description may not be repeated here.

The electronic apparatus 100 may display, on the display, at least one of the pre-conversion sound data volume ratio (1:1) or the post-conversion sound data volume ratio (0.5:2). The electronic apparatus 100 may display, as a UI 1215, the information on pre-conversion sound data and the information on post-conversion sound data. The UI has been described with reference to FIG. 11, and thus an overlapping description may not be repeated here.

Figure 13:
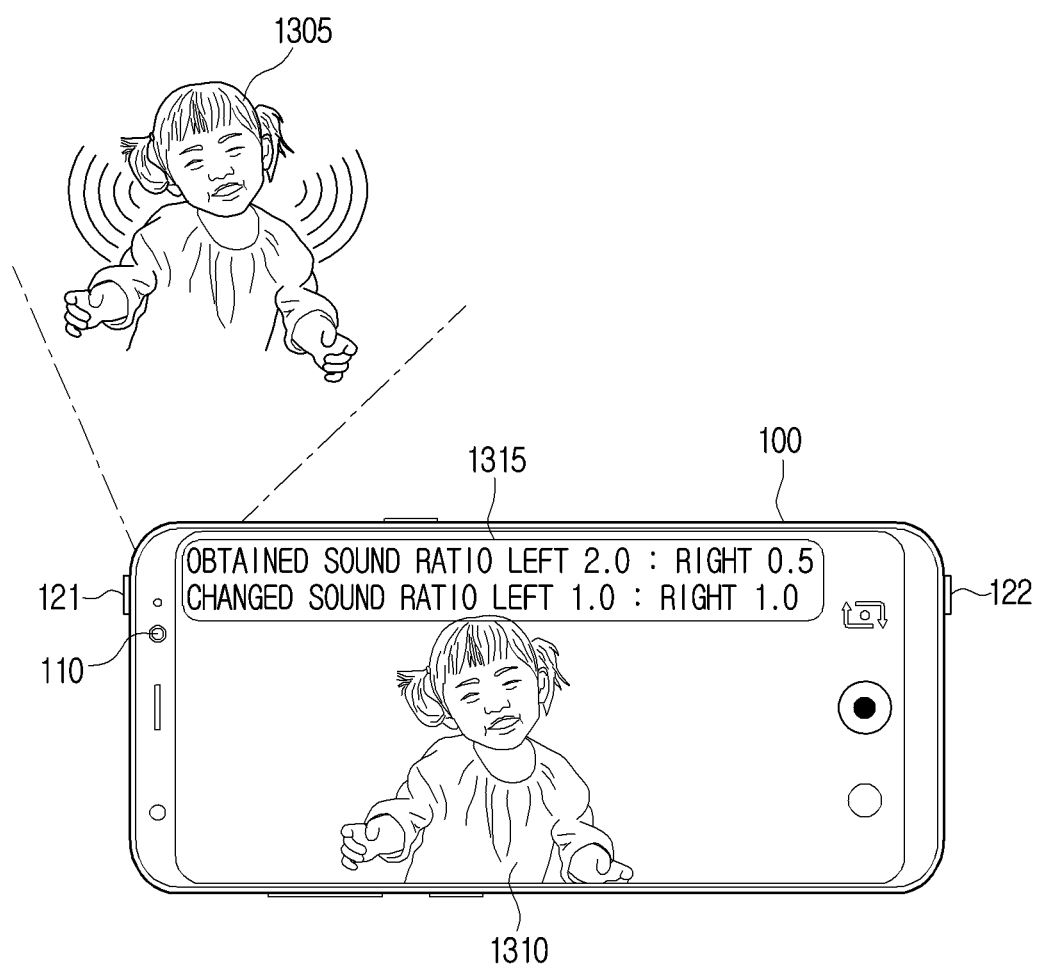
FIG. 13 is a diagram illustrating an example recording operation according to an embodiment.

FIG. 13 is a diagram illustrating an example recording operation according to an embodiment.

Referring to FIG. 13, it is assumed by way of non-limiting example that a speaker 1305 stands in front of a rear camera (not illustrated). Unlike FIG. 11 in which it is assumed by way of non-limiting example that the speaker 1105 stands in front of the front camera 110 (or selfie camera), a situation in which the speaker 1305 stands in front of the rear camera (not illustrated) is assumed by way of non-limiting example in FIG. 13.

The speaker 1305 does not stand in front of the electronic apparatus 100, volume information of first sound data and volume information of second sound data may be different from each other. Therefore, the electronic apparatus 100 may perform an operation of changing at least one of the volume of the first sound data or the volume of the second sound data.

For example, it is assumed for convenience of illustration that a ratio between the volume of the first sound data and the volume of the second sound data is 2:0.5. Because an object 1310 corresponding to the speaker 1305 is positioned at the center of image data, the electronic apparatus 100 may change the sound data to make the volume of the first sound data and the volume of the second sound data have a ratio of 1:1. The specific sound data conversion (change) process has been described with reference to FIGS. 7, 8 and 9, and thus an overlapping description may not be repeated here.

The electronic apparatus 100 may display, on the display, at least one of the pre-conversion sound data volume ratio (2:0.5) or the post-conversion sound data volume ratio (1:1). The electronic apparatus 100 may display, as a UI 1315, the information on pre-conversion sound data and the information on post-conversion sound data.

Figure 14:
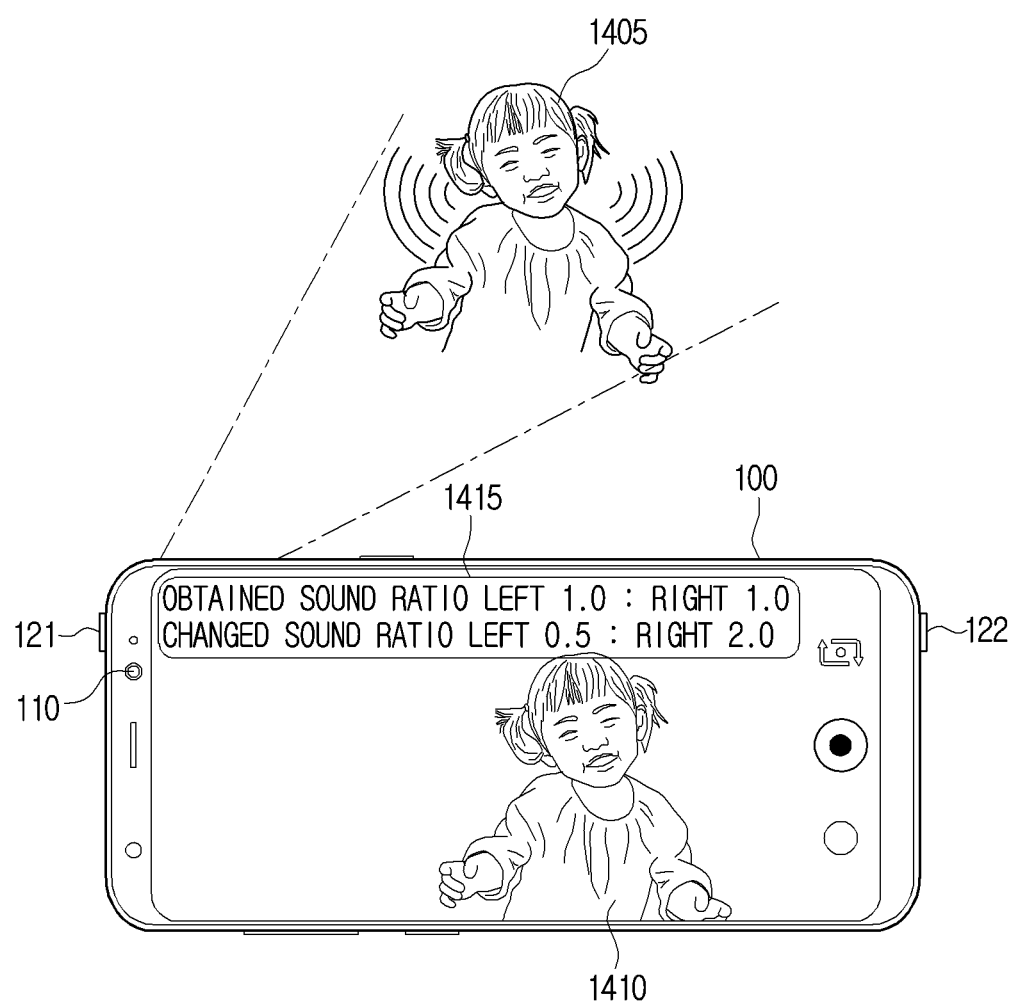
FIG. 14 is a diagram illustrating an example recording operation according to an embodiment.

FIG. 14 is a diagram illustrating an example recording operation according to an embodiment of the disclosure.

Referring to FIG. 14, the electronic apparatus 100 may record a video in a situation in which a speaker 1405 stands in front of the center of a rear surface portion of the electronic apparatus 100.

The electronic apparatus 100 may obtain image data using the rear camera (not illustrated), and the image data in which an object 1410 corresponding to the speaker 1405 is displayed on the right side of the entire image may be generated. The volume of first sound data and the volume of second sound data may be the same as each other.

The electronic apparatus 100 may perform an operation of changing at least one of the volume of the first sound data or the volume of the second sound data.

For example, it is assumed for convenience of illustration that a ratio between the volume of the first sound data and the volume of the second sound data is 1:1. Because the object 1410 corresponding to the speaker 1405 is positioned at a position corresponding to a ratio of 2 (left):0.5 (right) in the image data, the electronic apparatus 100 may change the sound data to make the volume of the first sound data and the volume of the second sound data have a ratio of 0.5:2. The specific sound data conversion (change) process has been described with reference to FIGS. 7, 8 and 9, and thus an overlapping description may not be repeated here.

The electronic apparatus 100 may display, on the display, at least one of the pre-conversion sound data volume ratio (1:1) or the post-conversion sound data volume ratio (0.5:2). The electronic apparatus 100 may display, as a UI 1415, the information on pre-conversion sound data and the information on post-conversion sound data.

Figure 15:
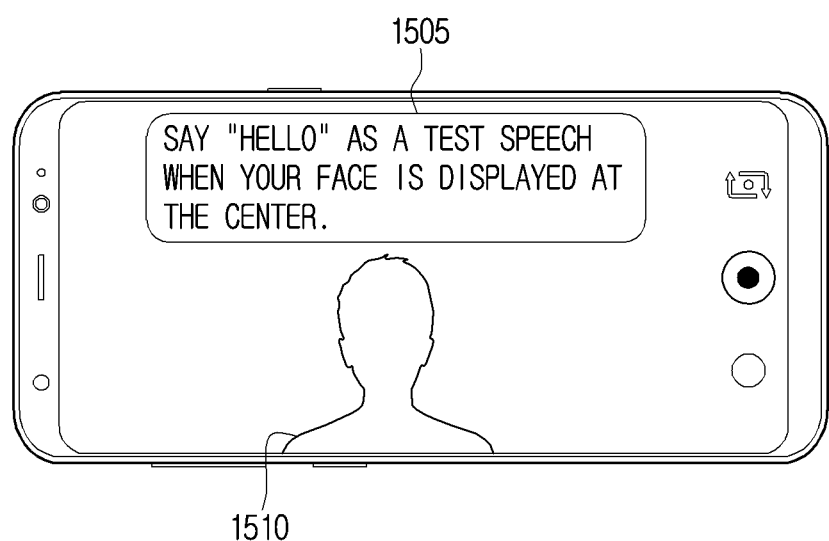
FIG. 15 is a diagram illustrating an example user interface (UI) used for a control operation of the electronic apparatus according to an embodiment.

FIG. 15 is a diagram illustrating an example UI used for a control operation of the electronic apparatus according to an embodiment.

Referring to FIG. 15, the electronic apparatus 100 may display UIs 1505 and 1510 that guide a speaker to be positioned at the center of a camera and make a sound.

The electronic apparatus 100 may display a real-time image captured by a camera. Further, the electronic apparatus 100 may guide a speaker to be positioned at the center of the real-time image and make a sound. Positioning the speaker at the center of the real-time image may refer, for example to the speaker standing in front of the camera. Further, the electronic apparatus 100 may guide the speaker to make a sound. The reason to guide the speaker to make sound is to compare sound data recorded through the first microphone 121 and the second microphone 122, respectively. In general, the camera is positioned close to only one of the first microphone 121 or the second microphone 122, and thus the electronic apparatus 100 may guide the speaker to make a sound in front of the center of the camera to analyze the difference.

For such a guide, the electronic apparatus 100 may provide the UI 1505 that displays text information, and the image UI 1510 that guides the speaker to be positioned at the center of the real-time image.

A specific example operation therefor will be described in greater detail below with reference to FIG. 27.

The UI 1510 of FIG. 15 may be used to obtain a reference (reference point) for volume information of sound data actually received through the first microphone 121 and the second microphone 122 in a situation in which the sound data should be output at a left-right ratio of 1:1 (for example, FIG. 11). The UI 1510 may be used to obtain the reference at the beginning of recording a video by the user. The UI 1510 may be a setting item of options of video recording.

Figure 16:
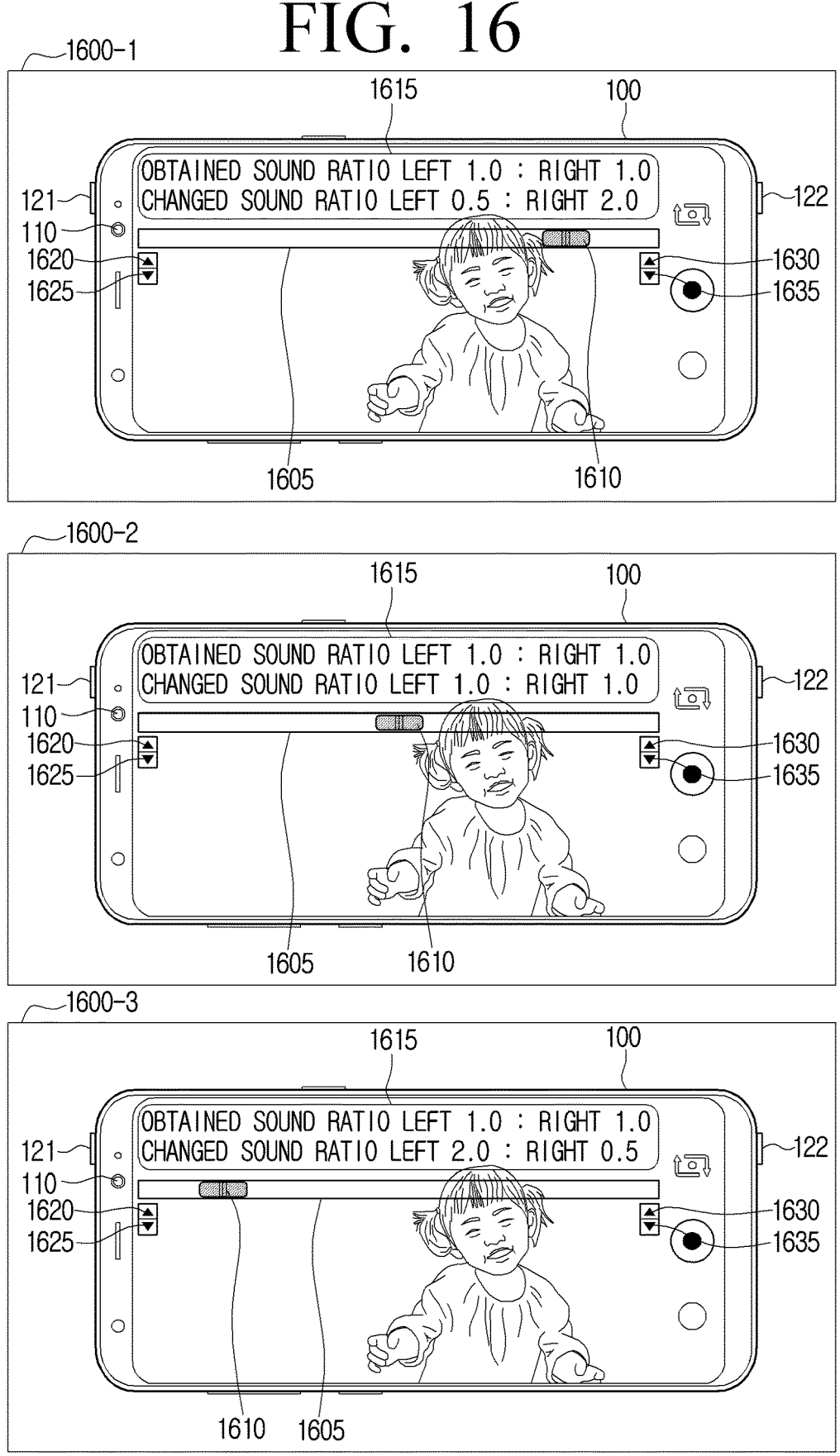
FIG. 16 is a diagram illustrating an example UI used for an operation of converting sound data according to an embodiment.

FIG. 16 is a diagram illustrating an example UI that may be used for an operation of converting sound data according to an embodiment.

Referring to FIG. 16, the electronic apparatus 100 may provide a UI 1605 for manually changing a volume ratio of sound data. The electronic apparatus 100 may provide a UI 1610 for controlling adjustment of the volume ratio. In addition, the electronic apparatus 100 may provide a UI 1615 that provides information on pre-change sound data and information on post-change sound data.

In a first example 1600-1, a second example 1600-2, and a third example 1600-3, it is assumed by way of non-limiting example that an object corresponding to a speaker is positioned on the right side of image data, and first sound data and second sound data are obtained at a volume ratio of 1:1.

The operation of changing sound data may be automatically performed. However, in FIG. 16, an embodiment in which the automatic change operation is performed first, and an operation of manually changing sound data is additionally performed is described.

The electronic apparatus 100 may receive a user input. A user may change a ratio of sound data through the UI 1610.

According to the first example 1600-1, the electronic apparatus 100 may provide changed ratio information of sound data based, for example, on position information of an object corresponding to a speaker, and the electronic apparatus 100 may perform a control to make the UI 1610 be positioned based on the provided changed ratio information. In case the position information of the object corresponding to the speaker indicates that a left-right distance information ratio is 2:0.5, the electronic apparatus 100 may determine post-change sound ratio information as 0.5:2. The electronic apparatus 100 may provide the post-change sound ratio information (0.5:2) through the UI 1615. Further, the electronic apparatus 100 may determine a position where the UI 1610 is displayed to correspond to the post-change sound ratio information (0.5:2) in the UI 1605. For example, the electronic apparatus 100 may perform a control to make the UI 1610 correspond to the post-change sound ratio information (0.5:2) in the UI 1605.

The electronic apparatus 100 may additionally display UIs 1620, 1625, 1630, and 1635 for changing the volume of sound data. The electronic apparatus 100 may additionally display the UI 1620 for increasing the volume of the first sound data, the UI 1625 for decreasing the volume of the first sound data, the UI 1630 for increasing the volume of the second sound data, and the UI 1635 for decreasing the volume of the second sound data.

In case an input indicating that the UI 1620 is touched is received, the electronic apparatus 100 may increase the volume of the first sound data. Further, the electronic apparatus 100 may change the position of the UI 1610 based on the increased volume of the first sound data and display the UI 1610 at the changed position. According to the first embodiment 1600-1, in case an input indicating that the UI 1620 is touched is received, the electronic apparatus 100 may move the UI 1610 to the left.

According to the second example 1600-2, the electronic apparatus 100 may receive a user input of adjusting the UI 1610. It is assumed by way of non-limiting example that the electronic apparatus 100 receives a user input of adjusting the UI 1610 to be positioned at the center of the UI 1605. The electronic apparatus 100 may analyze the user input. For example, the electronic apparatus 100 may compare left-side distance information and right-side distance information of the position of the UI 1610 in the UI 1605. According to the second example 1600-2, distance ratio information of the left-side distance information and the right-side distance information of the UI 1610 may be 1:1. The electronic apparatus 100 may determine the post-change sound ratio information based on the distance ratio information of the UI 1610. For example, the electronic apparatus 100 may determine the post-change sound ratio information as 1:1 to correspond to the distance ratio information (1:1) of the UI 1610, and may change the sound data based on the determined post-change sound ratio information (1:1). The electronic apparatus 100 may provide the post-change sound ratio information (1:1) through the UI 1615. The UIs 1620 to 1635 have been described in the first example 1600-1, and thus an overlapping description thereof may not be repeated here.

According to the third example 1600-3, it is assumed by way of non-limiting example that the electronic apparatus 100 receives a user input of adjusting the UI 1610 to be positioned on the left side of the UI 1605. According to the third example 1600-3, distance ratio information of the left-side distance information and the right-side distance information of the UI 1610 may be 2:0.5. The electronic apparatus 100 may determine the post-change sound ratio information as 2:0.5 to correspond to the distance ratio information (2.0.5) of the UI 1610, and may change the sound data based on the determined post-change sound ratio information (2.0.5). The electronic apparatus 100 may provide the post-change sound ratio information (2.0.5) through the UI 1615. The UIs 1620 to 1635 have been described in the first example 1600-1, and thus an overlapping description thereof may not be repeated here.

Note that various UIs illustrated in FIG. 16 may be simultaneously displayed, or any one of the UIs may be displayed. For example, the electronic apparatus 100 may display at least one of the UIs 1605 and 1610 for changing the volume of sound data or the UIs 1620 to 1635 for changing the volume of sound data.

FIG. 17 is a diagram illustrating an example operation of converting sound data using a left-right reversal mode according to an embodiment.

A first example 1700-1 in which the left-right reversal mode is activated and a second example 1700-2 in which the left-right reversal mode is not activated will be described with reference to FIG. 17.

The left-right reversal mode may include a function of reversing the left and right of an image in case the front camera captures the image.

In the first example 1700-1, the electronic apparatus 100 may display a real-time captured image on the display. The electronic device 100 may provide a left-right reversed image. An image of a speaker 1705 may be captured on the left of the camera 110. In case the left-right reversal mode is activated, the electronic apparatus 100 may display image data in which an object 1710 corresponding to the speaker 1705 is positioned on the right side of the image. Further, the electronic apparatus 100 may change sound data based on a position of the object 1710. The electronic apparatus 100 may provide post-change sound ratio information through an UI 1715.

In the second example 1700-2, the electronic apparatus 100 may provide image data without activating the left-right reversal mode. For example, in case the left-right reversal mode is not activated, the electronic apparatus 100 may display image data in which the object 1710 corresponding to the speaker 1705 is positioned on the left side of the image. Further, the electronic apparatus 100 may change sound data based on a position of the object 1710. The electronic apparatus 100 may provide post-change sound ratio information through the UI 1715.

The electronic apparatus 100 may provide different sound ratio information based on whether the left-right reversal mode is activated. Further, a different sound volume change algorithm may be reflected based on whether the left-right reversal mode is activated.

In the left-right reversal mode according to the disclosure, in case an image of the speaker 1705 is captured on the left of the camera, the image of the speaker 1705 is displayed on the right side of the image data. For example, with the left-right reversal function, the object 1710 corresponding to the speaker 1705 may be displayed on the left side or right side of the image data. The present disclosure describes that the object 1710 corresponding to the speaker 1705 is displayed in a right region in case the left-right reversal mode is ON. However, in some examples, the object 1710 corresponding to the speaker 1705 may be displayed in a left region even in case the left-right reversal mode is ON. This is because left and right may be reversed depending on whether the left-right reversal is made with respect to the camera or the user.

FIG. 18 is a diagram illustrating an example operation of converting sound data according to a position of a camera according to an embodiment.

Referring to a first diagram 1800-1 of FIG. 18, a position of the camera 110 included in the electronic apparatus 100 may be different. The lengths of the electronic apparatus 100 in a vertical direction and a horizontal direction may be different, and in case the electronic apparatus 100 is in a horizontal position, a position where the camera is disposed may be different. The camera 110 may be positioned on the left side or the right side under the assumption that the electronic apparatus 100 is in a horizontal position. This is because the electronic apparatus 100 may be upside down. For example, FIG. 11 illustrates the embodiment in which video recording is performed in a state in which the electronic apparatus 100 is in a horizontal position, and the camera 110 is positioned on the left side. On the other hand, FIG. 18 illustrates an embodiment in which video recording is performed in a state in which the electronic apparatus 100 is in a horizontal position, and the camera 110 is positioned on the right side.

FIG. 11 and FIG. 18 are different in regard to a method of using sound data. For example, in FIG. 11, the first sound data obtained through the first microphone 121 is used as the left stereo sound data, and the second sound data obtained through the second microphone 122 is used as the right stereo sound data. However, in FIG. 18, first sound data obtained through the first microphone 121 is used as the right stereo sound data, and second sound data obtained through the second microphone 122 is used as the left stereo sound data.

This is because left and right positions of the microphones 121 and 122 of FIG. 18 are changed, unlike the microphones 121 and 122 of FIG. 11. The electronic apparatus 100 may consider such a difference in using sound data included in a video.

For example, the first microphone 121 may be a right-side microphone and the second microphone 122 may be a left-side microphone. This may be reflected in the sound data change operation.

Referring to a second diagram 1800-2 of FIG. 18, the electronic apparatus 100 may obtain the volume (PL) 1811 of the second sound data obtained through the second microphone 122. The electronic apparatus 100 may obtain second weighted value information (1/(PL*DL)) 1812 corresponding to the second sound data. Here, "1/(PL*DL)" may be a value determined based on object position information. The electronic apparatus 100 may change the second sound data by multiplying the volume 1811 of the second sound data by the second weighted value information 1812. The changed second sound data may include "1/(PL*DL)". For example, the electronic apparatus 100 may obtain the volume (1/DL) 1813 of the second sound data changed based on the volume 1811 of the second sound data and the second weighted value information 1812 corresponding to the second sound data. Further, the electronic apparatus 100 may generate the left stereo sound data using the volume (1/DL) 1813 of the changed second sound data.

The electronic apparatus 100 may obtain the volume (PR) 1821 of the first sound data obtained through the first microphone 121. Here, the electronic apparatus 100 may obtain first weighted value information (1/(PR*DR)) 1822 corresponding to the first sound data. "1/(PR*DR)" may be a value determined based on object position information. The electronic apparatus 100 may change the first sound data by multiplying the volume 1821 of the first sound data by the first weighted value information 1822. The changed first sound data may include "1/(PR*DR)". For example, the electronic apparatus 100 may obtain the volume (1/DR) 1823 of the first sound data changed based on the volume 1821 of the first sound data and the first weighted value information 1822 corresponding to the first sound data. Further, the electronic apparatus 100 may generate the right stereo sound data using the volume (1/DR) 1823 of the changed first sound data.

The electronic apparatus 100 may obtain "PL:PR" as initial sound ratio information 1831, and obtain "DR:DL" as post-change sound ratio information 1833.

Figure 19:
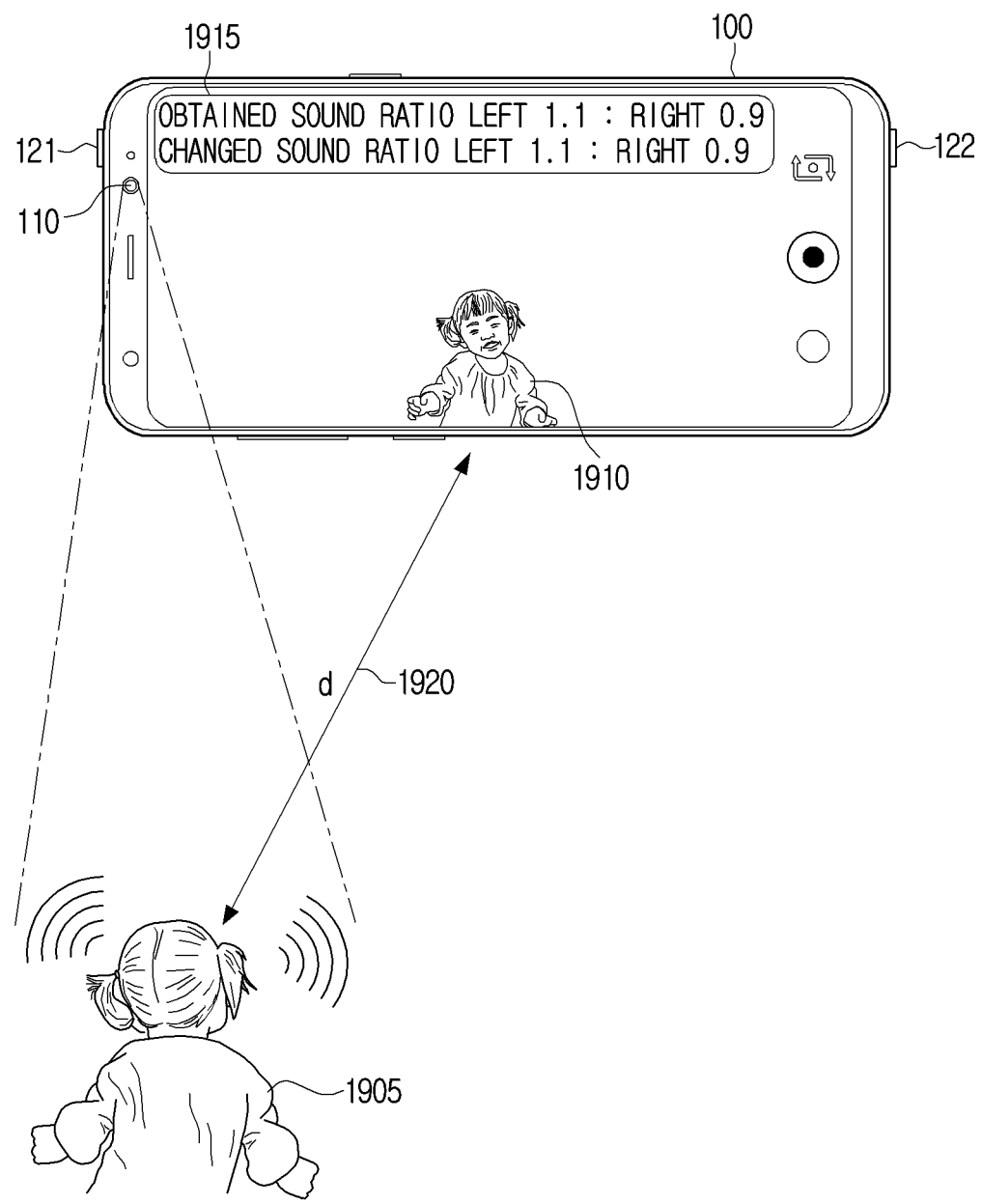
FIG. 19 is a diagram illustrating an example operation of converting sound data based on distance information between the electronic apparatus and an object according to an embodiment.

FIG. 19 is a diagram illustrating an example operation of converting sound data based on distance information between the electronic apparatus and an object according to an embodiment.

Referring to FIG. 19, the electronic apparatus 100 may provide change sound data in consideration of a distance between a speaker 1905 and the electronic apparatus 100. For example, the electronic apparatus 100 may identify distance (d) information 1920 between the speaker 1905 and the electronic apparatus 100 based on an object 1910 captured through the camera. As an example, the electronic apparatus 100 may identify the distance information 1920 based on a reference image. As illustrated in FIG. 15, the electronic apparatus 100 may obtain the reference image at the beginning of recording a video, and may determine that the distance between the speaker 1905 and the electronic apparatus 100 is increased in case the object 1910 becomes less than the reference image. As another example, the electronic apparatus 100 may obtain the distance information 1920 using a time of flight (TOF) sensor module. As still another example, the electronic apparatus 100 may obtain the distance information 1920 using multiple camera lenses. However, the disclosure is not necessarily limited to the above-described examples, and the distance information 1920 may be obtained using various existing technologies.

The electronic apparatus 100 may change sound data based on the identified distance information 1920. The electronic apparatus 100 may provide post-change sound ratio information through an UI 1915.

According to an embodiment, the electronic apparatus 100 may perform a control to decrease the volume of sound data as the distance information 1920 between the speaker 1905 and the electronic apparatus 100 is increased. A calculation process will be described in greater detail below with reference to FIG. 20.

According to an embodiment, the electronic apparatus 100 does not have to perform the sound data change operation in case the distance between the speaker 1905 and the electronic apparatus 100 is equal to or greater than a threshold distance. In case the distance information 1920 is equal to or greater than the threshold distance, there may be no substantial difference in balance between image data and sound data. Since the sound data change operation is not performed in the entire video recording process, the electronic apparatus 100 may increase a memory processing speed and efficiently manage power.

Figure 20:
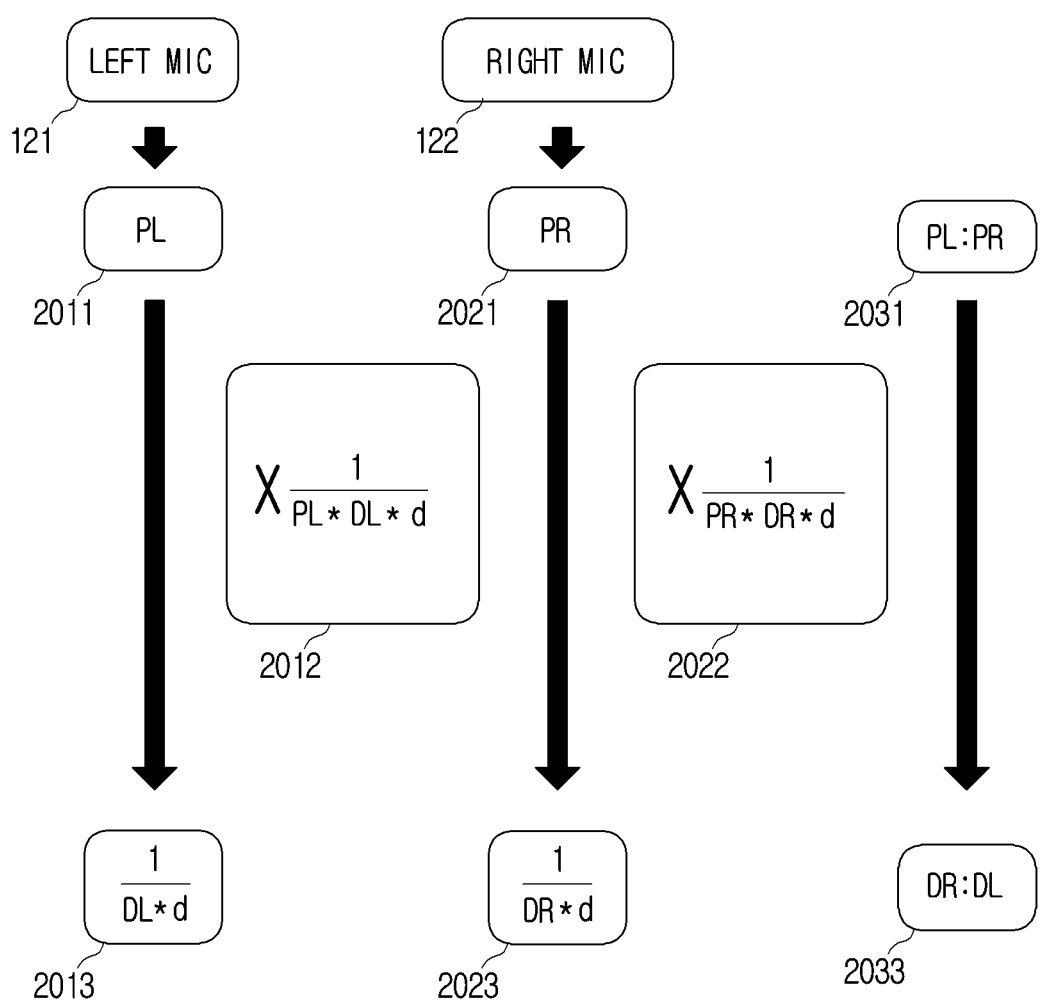
FIG. 20 is a diagram illustrating an example sound data change operation of FIG. 19 according an embodiment.

FIG. 20 is a diagram illustrating example sound data change operation of FIG. 19 according to an embodiment.

Referring to FIG. 20, the electronic apparatus 100 may obtain the volume (PL) 2011 of the first sound data obtained through the first microphone 121. The electronic apparatus 100 may obtain first weighted value information (1/(PL*DL*d)) 2012 corresponding to first sound data. "1/(PL*DL*d)" may be a value determined based on object position information. The electronic apparatus 100 may change the first sound data by multiplying the volume 2011 of the first sound data by the first weighted value information 2012. The changed first sound data may include "1/(PL*DL*d)". For example, the electronic apparatus 100 may obtain the volume (1/DL*d) 2013 of the first sound data changed based on the volume 2011 of the first sound data and the first weighted value information 2012 corresponding to the first sound data.

The electronic apparatus 100 may obtain the volume (PR) 2021 of second sound data obtained through the second microphone 122. The electronic apparatus 100 may obtain second weighted value information (1/(PR*DR*d)) 2022 corresponding to the second sound data. "1/(PR*DR*d)" may be a value determined based on object position information. The electronic apparatus 100 may change the second sound data by multiplying the volume 2021 of the second sound data by the second weighted value information 2022. The changed second sound data may include "1/(PR*DR*d)". For example, the electronic apparatus 100 may obtain the volume (1/DR*d) 2023 of the second sound data changed based on the volume 2021 of the second sound data and the second weighted value information 2022 corresponding to the second sound data.

The electronic apparatus 100 may obtain "PL:PR" as initial sound ratio information 2031, and obtain "DR:DL" as post-change sound ratio information 2033.

Although FIG. 20 illustrates an example in which 1/d is applied to weighted value information, $1/(d)^2$ may be applied in some implementation examples. A value (1/d or $1/(d)^2$) to be applied may be defined based on a predetermined user setting.

The distance information 1920 may be reflected in the first example 700-1 of FIG. 7. The electronic apparatus 100 may change volume information of sound data using k/d (or $k/(d)^2$), instead of k.

FIG. 21 is a diagram illustrating an example operation of recording a plurality of objects according to an embodiment.

A first example 2100-1 in which a first speaker 2105 of a plurality of speakers utters a voice and a second example 2100-2 in which a second speaker 2110 of the plurality of speakers utters a voice will be described with reference to FIG. 21.

It is assumed by way of non-limiting example that video recording is performed in a situation in which one of a plurality of speakers utters a voice. The plurality of speakers may include the first speaker 2105 and the second speaker 2110. It is assumed that the first speaker 2105 stands in front of the camera 110, and the second speaker 2110 stands in front of the center of the front surface portion of the electronic apparatus 100. An object 2115 corresponding to the first speaker 2105 may be positioned at the center of image data, and an object 2120 corresponding to the second speaker 2110 may be positioned on the right side of the image data.

In case the plurality of objects 2115 and 2120 corresponding to the plurality of speakers 2105 and 2110, respectively, are identified in the image data, the electronic apparatus 100 may change sound data in consideration of position information of each of the plurality of objects 2115 and 2120.

In FIG. 21, it is assumed that only one of the plurality of speakers 2105 and 2110 utters a voice. The electronic apparatus 100 may identify a speaker who utters a voice among the plurality of speakers 2105 and 2110, and change sound data based on position information of the identified speaker. The electronic apparatus 100 may identify a mouth shape object among various objects included in the image data, and may determine movement of the mouth shape object as an uttering motion. The electronic apparatus 100 may use an object recognition artificial intelligence module to identify the mouth shape object. The object recognition artificial intelligence module may be directly stored in the electronic apparatus 100, or may be stored in a separate external server in some implementation examples.

According to the first example 2100-1, in a case where it is identified that the first speaker 2105 utters a voice, the electronic apparatus 100 may determine sound ratio information (1:1) based on position information (1:1) of the object 2115 corresponding to the first speaker 2105. Further, the electronic apparatus 100 may change sound data based on the sound ratio information (1:1), and display the changed sound ratio information (1:1) in a UI 2125.

According to the second example 2100-2, in a case where it is identified that the second speaker 2110 utters a voice, the electronic apparatus 100 may determine sound ratio information (0.5:2) based on position information (2.0.5) of the object 2120 corresponding to the second speaker 2110. Further, the electronic apparatus 100 may change sound data based on the sound ratio information (0.5:2), and display the changed sound ratio information (0.5:2) in a UI 2130.

Figure 22:
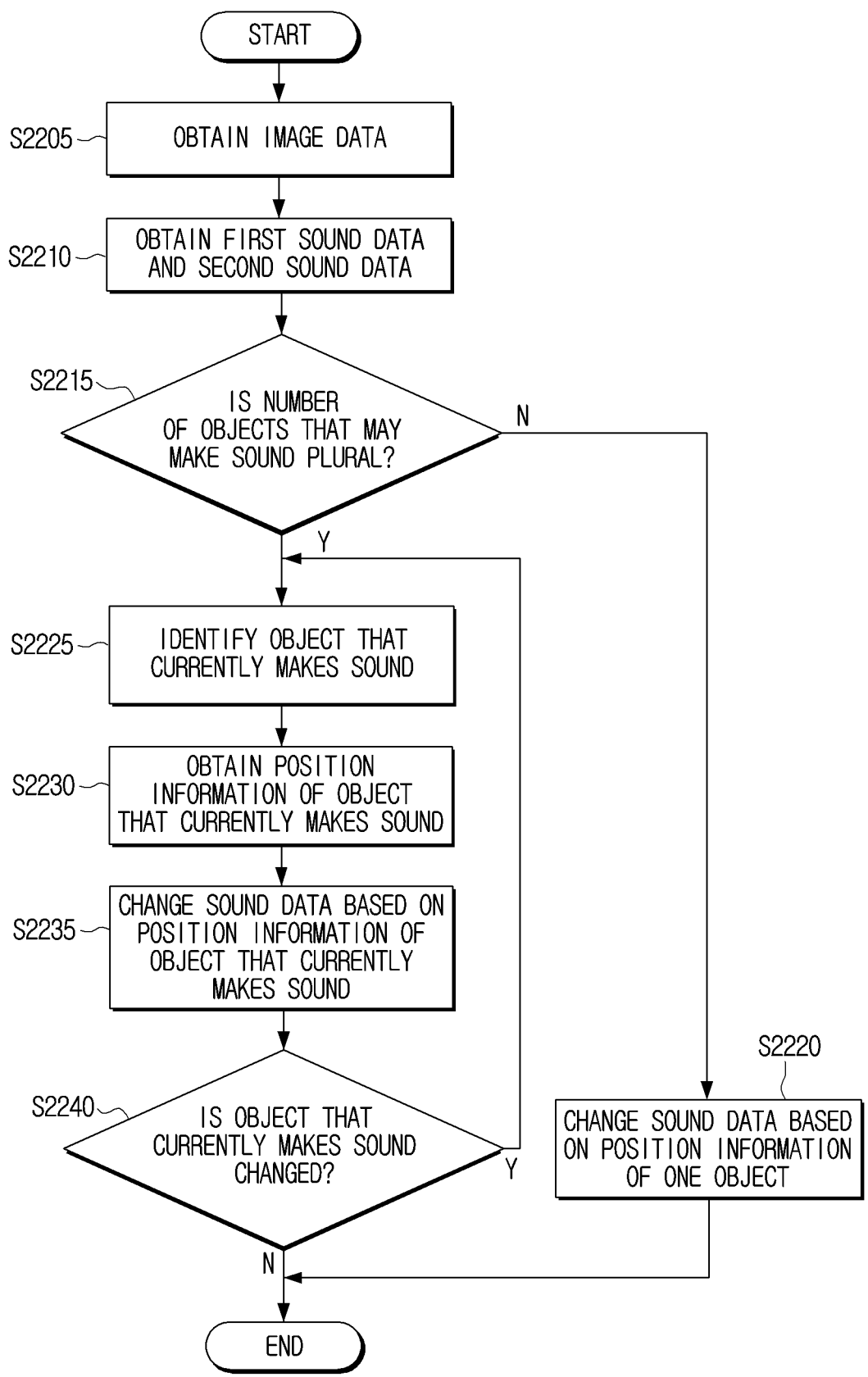
FIG. 22 is a flowchart illustrating an example operation of recording a plurality of objects according to an embodiment.

FIG. 22 is a flowchart illustrating an example operation illustrated in FIG. 21 according to an embodiment.

Referring to FIG. 22, the electronic apparatus 100 may obtain image data (S2205). The electronic apparatus 100 may obtain first sound data (left stereo sound data) and second sound data (right stereo sound data) (S2210). The electronic apparatus 100 may determine whether the number of objects that may make a sound in the image data is plural (S2215). The objects that may make a sound may include a person, an animal, and other various objects. In S2215, not an object that currently makes a sound, but an object that is able to make a sound may be identified. For example, in case it is identified that the number of person objects is two, the electronic apparatus 100 may determine that the number of objects that may make a sound is plural.

In case the electronic apparatus 100 determines that the number of objects that may make a sound is not plural ("N" in operation S2215), the electronic apparatus 100 may change sound data based on position information of one identified object (S2220). The one object may refer, for example, to an object that is determined as currently making a sound. The one object does not necessarily refer to an object that does not currently make a sound or is not able to make a sound, and sound data is not changed for such an object.

In case the electronic apparatus 100 determines that the number of objects that may make a sound is plural ("Y" in operation S2215), the electronic apparatus 100 may identify an object that currently makes a sound (S2225). The electronic apparatus 100 may obtain position information of the object that currently makes a sound (S2230). The electronic apparatus 100 may change sound data based on the position information of the object that currently makes a sound (S2235).

The electronic apparatus 100 may determine whether the object that currently makes a sound is changed (S2240). In case the object that makes a sound is not changed ("N" in operation S2240), the electronic apparatus 100 may proceed to the sound data change operation. However, in case the object that makes a sound is changed ("Y") in operation S2240), the electronic apparatus 100 may repeat S2225, S2230, and S2235 to newly obtain position information of the changed object.

Figure 23:
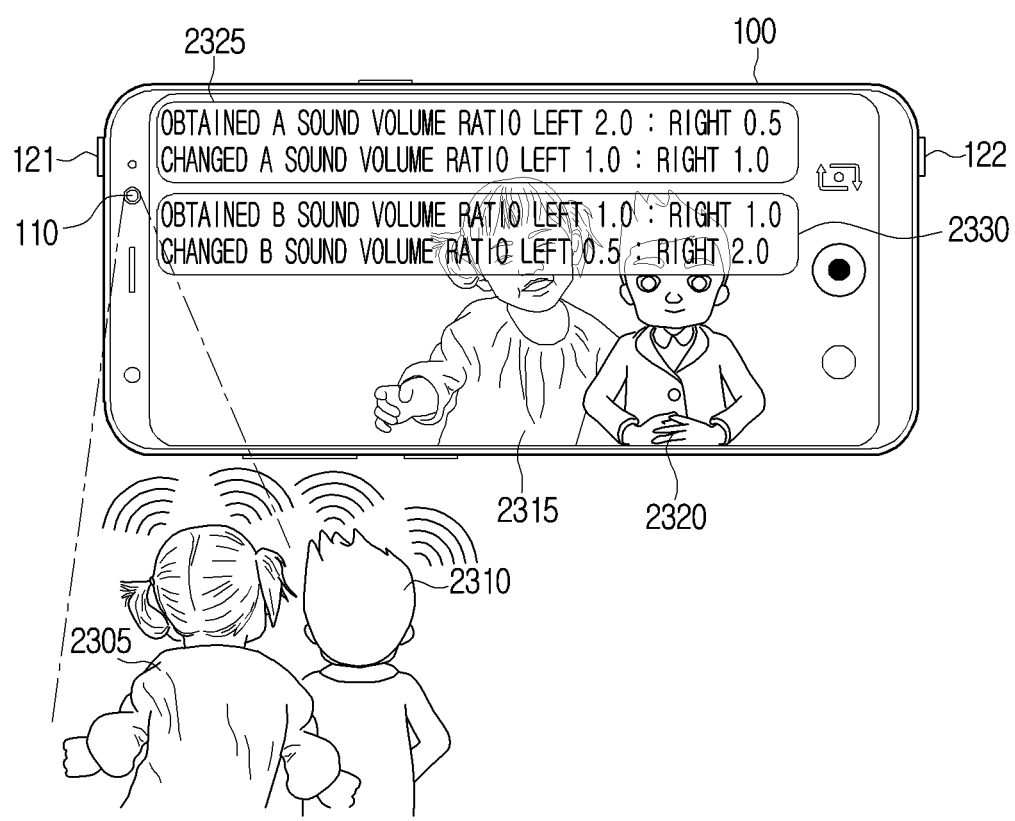
FIG. 23 is a diagram illustrating an example operation of recording a plurality of objects according to an embodiment.

FIG. 23 is a diagram illustrating an example operation of recording a plurality of objects according an embodiment.

Referring to FIG. 23, the electronic apparatus 100 may perform video recording in a situation in which a first speaker 2305 and a second speaker 2310 utter a voice at the same time.

The electronic apparatus 100 may obtain first position information of a first object 2315 corresponding to the first speaker 2305 and second position information of a second object 2320 corresponding to the second speaker 2310. The electronic apparatus 100 may change sound data corresponding to the first object 2315 based on the first position information, and change sound data corresponding to the second object 2320 based on the second position information.

The electronic apparatus 100 may sort out sound data corresponding to each object from sound data to obtain the sound data corresponding to each object. For example, the sound data may include both the voice of the first speaker 2305 and the voice of the second speaker 2310. The electronic apparatus 100 may extract the voice of the first speaker 2305 from the sound data, and may change the extracted voice of the first speaker 2305 based on the first position information. Similarly, the electronic apparatus 100 may extract the voice of the second speaker 2310 from the sound data, and may change the extracted voice of the second speaker 2310 based on the second position information.

In addition, sound ratio information of each changed sound data may be displayed through a UI. Specifically, the sound ratio information (1:1) corresponding to the first speaker 2305 may be provided through a UI 2325, and the sound ratio information (0.5:2) corresponding to the second speaker 2310 may be provided through a UI 2330.

Figure 24:
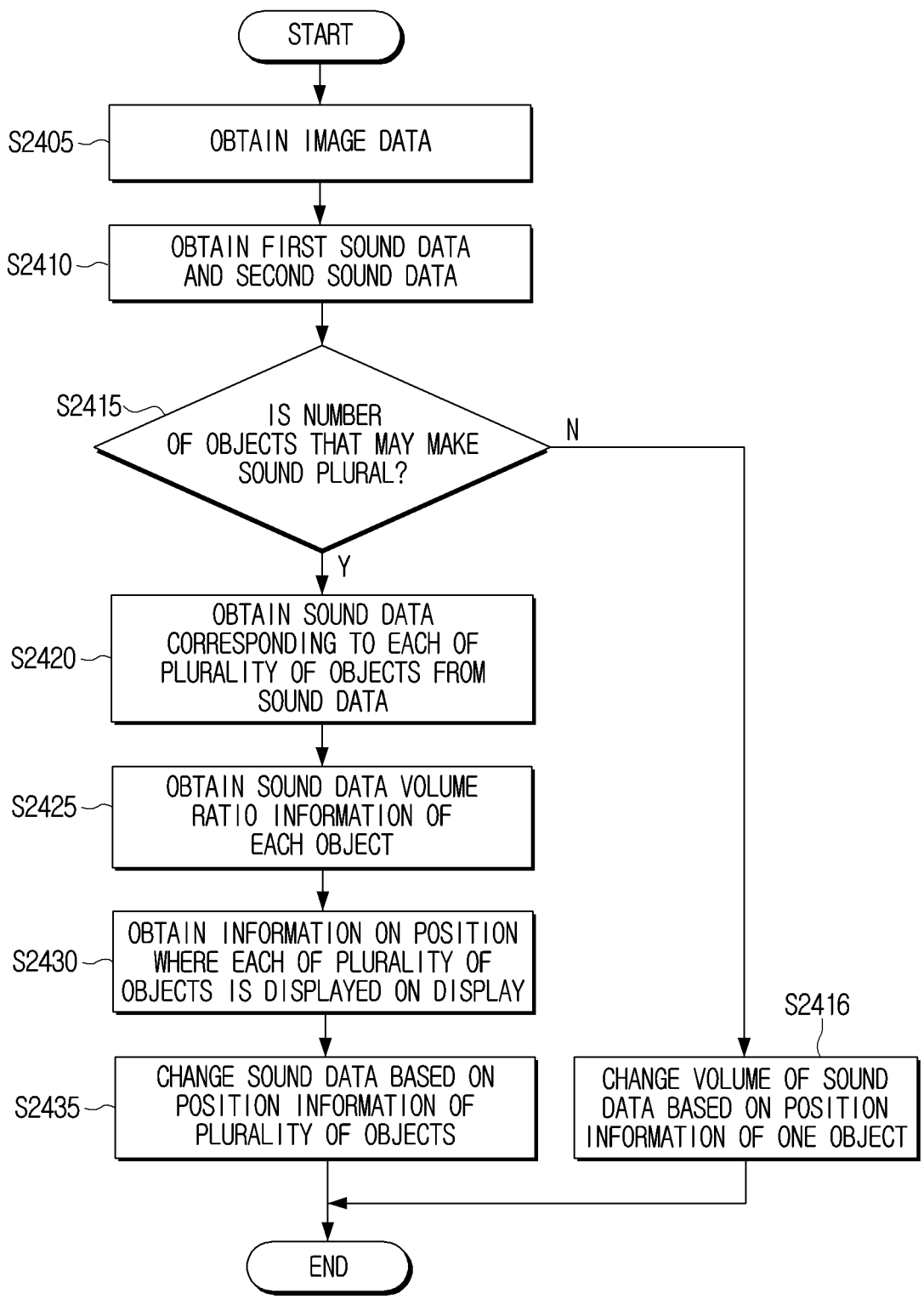
FIG. 24 is a flowchart illustrating an example operation of recording a plurality of objects according to an embodiment.

FIG. 24 is a flowchart illustrating an example operation of the electronic apparatus illustrated in FIG. 23 according to an embodiment.

Referring to FIG. 24, the electronic apparatus 100 may obtain image data (S2405). The electronic apparatus 100 may obtain first sound data (left stereo sound data) and second sound data (right stereo sound data) (S2410). S2405 and S2410 may be performed at the same time. For example, the electronic apparatus 100 may obtain the image data, the first sound data, and the second sound data at the same time.

The electronic apparatus 100 may determine whether the number of objects that make a sound is plural (S2415). In case the number of objects that make a sound is not plural ("N" in operation S2415), the electronic apparatus 100 may change sound data based on position information of one object (S2416).

In case the number of objects that make a sound is plural ("Y" in operation S2415), the electronic apparatus 100 may obtain sound data corresponding to each of the plurality of objects from the sound data (S2420). The process of obtaining the sound data corresponding to each object may refer, for example, to a process of extracting sound data of a specific object.

The electronic apparatus 100 may obtain ratio information of the sound data corresponding to each of the plurality of objects (S2425). The electronic apparatus 100 may obtain information on a position where each of the plurality of objects is displayed on the display (S2430). The electronic apparatus 100 may change each sound data based on the position information of each of the plurality of objects (S2435). The example embodiment has been described with reference to FIG. 23, and thus an overlapping description may not be repeated here. The electronic apparatus 100 may display each changed ratio information on the display through a UI.

Figure 25:
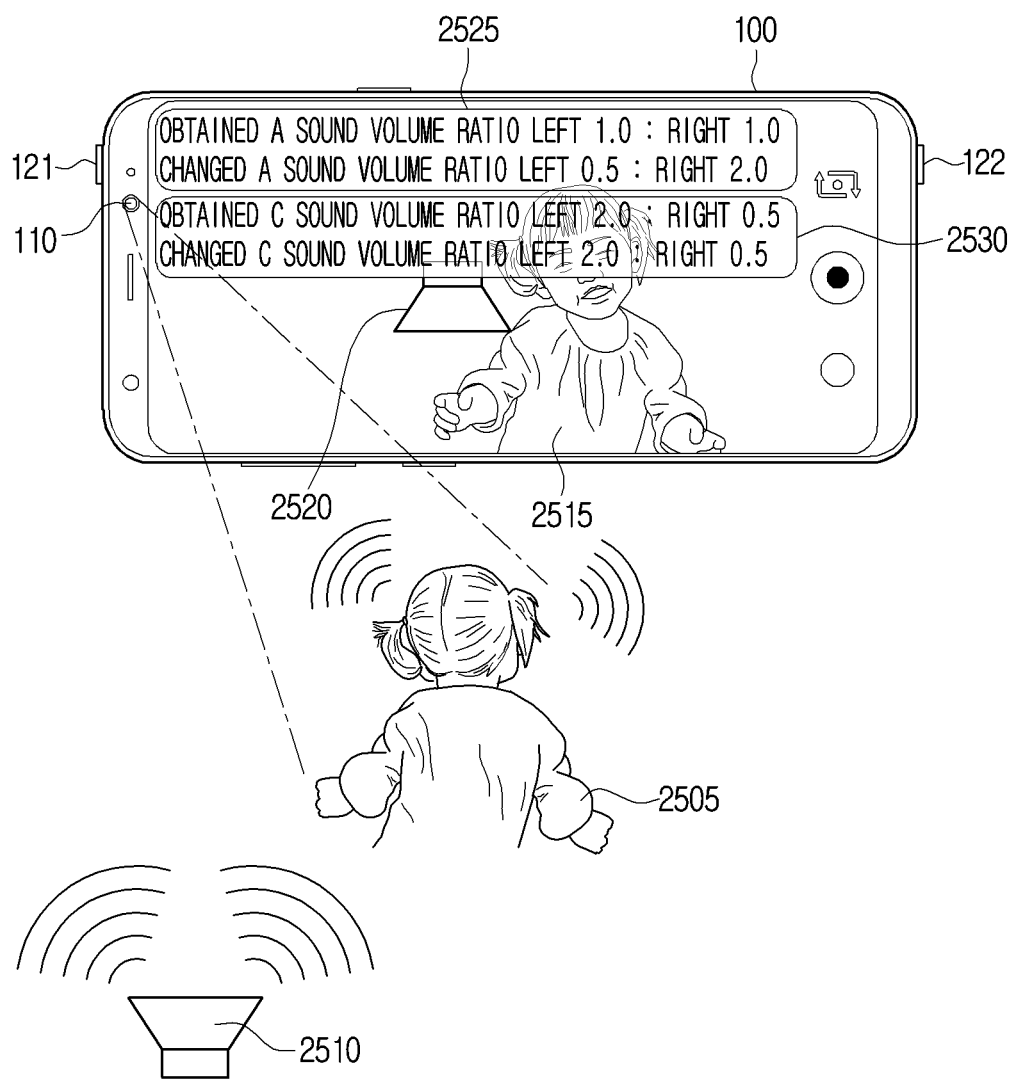
FIG. 25 is a diagram illustrating an example operation of recording a plurality of objects according to an embodiment.

FIG. 25 is a diagram illustrating an example operation of recording a plurality of objects according to an embodiment.

Referring to FIG. 25, a situation in which a speaker 2505 and a sound output device 2510 make a sound at the same time is assumed. A sound made by the speaker 2505 is described as voice data, and a sound made by the sound output device 2510 is described as non-voice data.

The electronic apparatus 100 may sort out the voice data and the non-voice data from sound data. Further, the electronic apparatus 100 may perform a sound data change operation on only the voice data without performing the sound data change operation on the non-voice data. In other words, the electronic apparatus 100 may extract only the voice data from the sound data. For example, the electronic apparatus 100 may obtain the voice data by filtering out only a voice frequency from the sound data. The electronic apparatus 100 may store a voice frequency range in advance to filter out only the voice frequency, and may separate only the voice data from the sound data by identifying only the voice frequency range.

Performing the sound data change operation on only the voice data may be related to sound quality. A conversion operation for the non-voice data and a conversion operation for the voice data may be different in regard to sound quality conversion, and the electronic apparatus 100 may perform the change operation on only the voice data to output a high-quality sound data. The electronic apparatus 100 may change sound data based on position information of an object 2515 corresponding to the speaker 2505. In case a setting is made not to change the non-voice data, the electronic apparatus 100 does not have to consider position information of an object 2520 corresponding to the sound output device 2510.

The electronic apparatus 100 may provide sound ratio information of the voice data through a UI 2525. Further, the electronic apparatus 100 may provide sound ratio information of the non-voice data through a UI 2530.

Whether to change only the voice data may be determined depending on user setting. That is, whether to change both the voice data and the non-voice data or change only the voice data may be determined depending on user setting.

Figure 26:
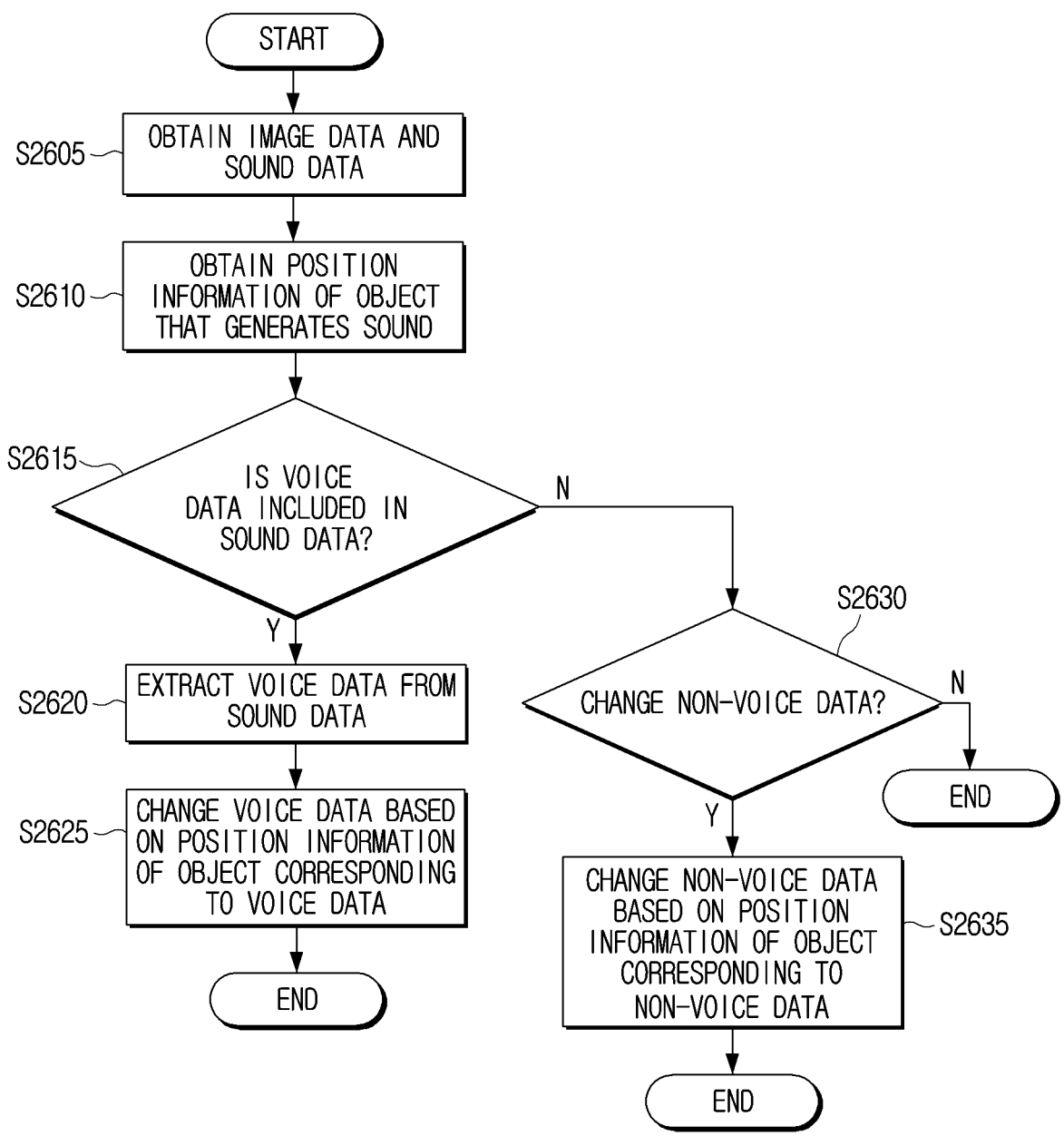
FIG. 26 is a flowchart illustrating an example operation of recording a plurality of objects according to an embodiment.

FIG. 26 is a flowchart illustrating an example operation of the electronic apparatus illustrated in FIG. 25 according to an embodiment.

Referring to FIG. 26, the electronic apparatus 100 may obtain image data and sound data (S2605). The electronic apparatus 100 may obtain position information of an object that generates a sound (S2610).

The electronic apparatus 100 may determine whether voice data is included in the sound data (S2615). In case voice data is included in the sound data ("Y" in operation S2615), the electronic apparatus 100 may separate and obtain only the voice data from the sound data (S2620). The electronic apparatus 100 may change the voice data based on position information of an object corresponding to the obtained voice data (S2625).

In case voice data is not included in the sound data ("N" in operation S2615), the electronic apparatus 100 may determine whether to change non-voice data (S2630). In case a setting for the electronic apparatus 100 is made to not change the non-voice data ("N" in operation S2630), the electronic apparatus 100 need not perform the change operation for the non-voice data. In case a setting for the electronic apparatus 100 is made to change the non-voice data ("Y" in operation S2630), the electronic apparatus 100 may perform the change operation for the non-voice data based on position information of an object corresponding to the non-voice data (S2635).

Figure 27:
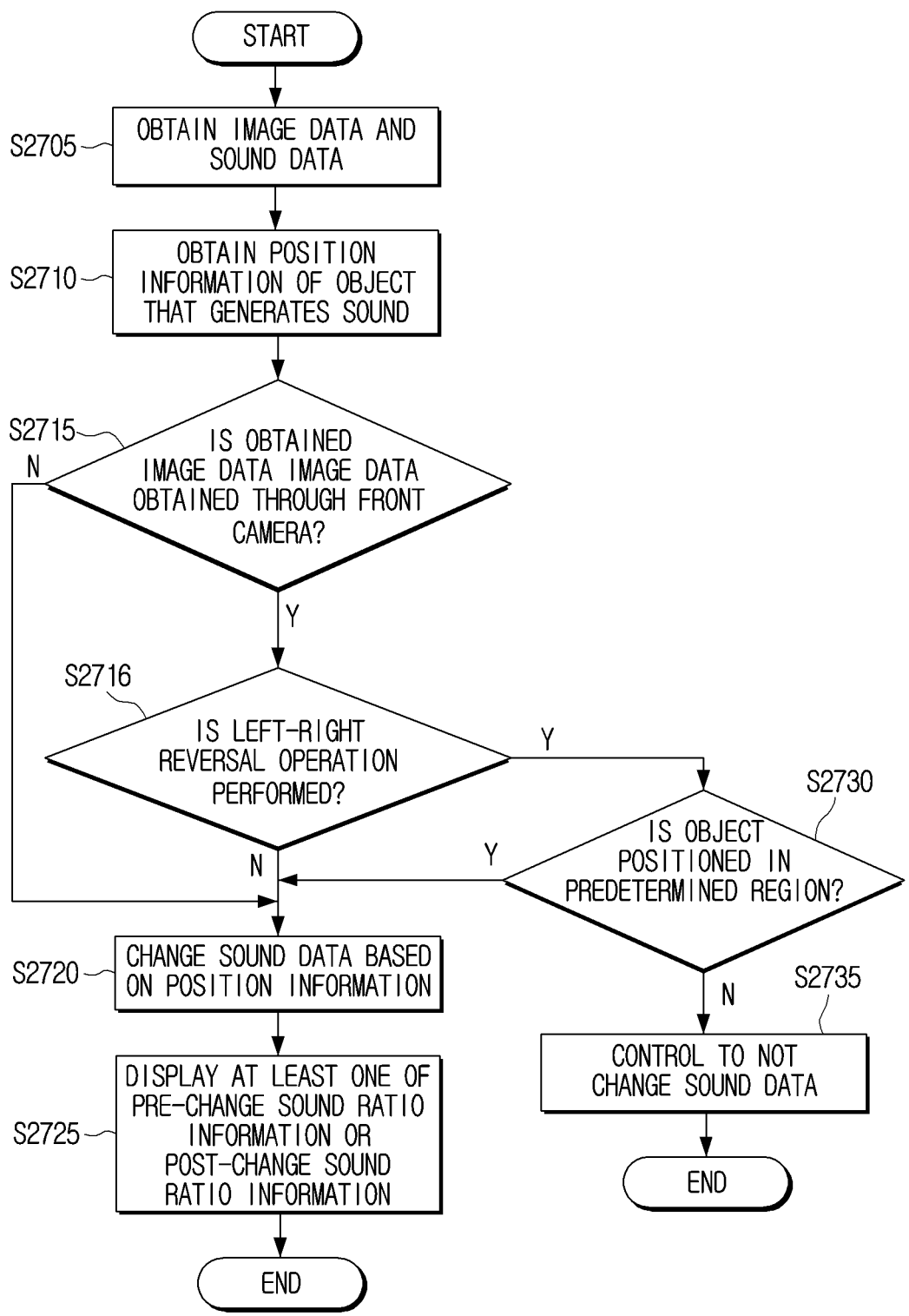
FIG. 27 is a flowchart illustrating an example operation considering the left-right reversal mode according to an embodiment.

FIG. 27 is a flowchart illustrating an example operation in which an object is guided to be positioned at the center according to an embodiment.

Referring to FIG. 27, the electronic apparatus 100 may obtain image data and sound data (S2705). The electronic apparatus 100 may obtain position information of an object that generates a sound (S2710).

The electronic apparatus 100 may determine whether the image data is an image obtained through the front camera (S2715).

In case the image data is not an image obtained through the front camera ("N" in operation S2715), the electronic apparatus 100 may change the sound data based on the position information of the object (S2720). The electronic apparatus 100 may display, on the display, at least one of pre-change sound ratio information or post-change sound ratio information through a UI (S2725).

In case the image data is an image obtained through the front camera ("Y" in operation S2715), the electronic apparatus 100 may determine whether a left-right reversal operation is performed on the image data (S2716). For example, the electronic apparatus 100 may determine whether the left-right reversal function is applied to the obtained image data. In case the left-right reversal function is not applied to the image data ("N" in operation S2716), the electronic apparatus 100 may perform the sound data conversion operation (S2720) and the UI providing operation (S2725).

In case the left-right reversal function is applied to the image data ("Y" in operation S2716), the electronic apparatus 100 may selectively perform the change operation. For example, for the image data applied with the left-right reversal function, the electronic apparatus 100 may determine whether the object is positioned in a predetermined region in the image data based on the position information of the object that generates a sound (S2730). In case the object is positioned in the predetermined region ("Y" in operation S2730), the electronic apparatus 100 may perform the sound data conversion operation (S2720) and the UI providing operation (S2725).

The predetermined region may refer, for example, to a region from a central point of the image data to a point where the object is positioned in case sound data having the same volume are obtained through the first microphone 121 and the second microphone 122. For example, the predetermined region may refer, for example, to a region from a central vertical axis 2850 to a vertical axis 2855 in FIG. 28B. A description thereof will be provided in greater detail below with reference to FIGS. 28A and 28B.

In case the object is not positioned in the predetermined region ("N" in operation S2730), the electronic apparatus 100 may not change the sound data (S2735). A reason therefor will be described in greater detail below with reference to FIGS. 28A and 28B.

FIGS. 28A and 28B are diagrams illustrating example image data applied with the left-right reversal function.

Various examples 2800-1, 2800-2, 2800-3 and 2800-4 in which the left-right reversal function is applied will be described with reference to FIGS. 28A and 28B.

FIGS. 28A and 28B commonly illustrate a speaker 2805, an object 2810 corresponding to the speaker 2805, and a UI 2815 that displays sound ratio information.

According to the first example 2800-1, it is assumed that the speaker 2805 faces the camera 110 on the right side. The image data applied with the left-right reversal function to display the object 2810 corresponding to the speaker 2805 in a left region may be generated. Because the speaker 2805 utters a voice near the first microphone 121, the volume of first sound data obtained through the first microphone 121 may be higher than that of second sound data obtained through the second microphone 122. A person who watches a video may feel that the image data and the sound data are balanced. Therefore, the electronic apparatus 100 may determine that the sound data change operation is not necessary in such a situation.

However, according to the second example 2800-2, in case the speaker 2805 is positioned in front of the camera 110, the electronic apparatus 100 may determine that the sound data change operation is necessary. In case the speaker 2805 is positioned in front of the camera 110, the object 2810 corresponding to the speaker 2805 may be positioned at the center of the image data. The image data may have the central vertical axis 2850. The electronic apparatus 100 may determine that the sound data change is not necessary in case the object 2810 is positioned on the left of the central vertical axis 2850 in the image data. Further, the electronic apparatus 100 may determine that the sound data change is necessary in case the object 2810 is positioned on the central vertical axis 2850 in the image data displayed on the electronic apparatus 100.

According to the third example 2800-3, in case the speaker 2805 is positioned in front of the front surface portion of the electronic apparatus 100, the object 2810 corresponding to the speaker 2805 may be positioned on the right of the central vertical axis 2850 in the image data. In a situation in which the speaker 2805 stands in front of the center of the front surface portion of the electronic apparatus 100, the volumes of sound data received through the first microphone 121 and the second microphone 122, respectively, may be the same as each other. Further, in case the volumes of sound data received through the microphones, respectively, are the same as each other, the vertical axis 2855 of a position where the object 2810 is displayed may be obtained. The electronic apparatus 100 may determine that the sound data change is necessary in case the object 2810 is positioned in a region between the central vertical axis 2850 and the vertical axis 2855 in the image data displayed on the electronic apparatus 100.

According to the fourth example 2800-4, the electronic apparatus 100 may determine that the sound data change is not necessary in case the object 2810 is positioned in a region on the right of the vertical line 2855 in the image data.

In summary, the electronic apparatus 100 may determine that the sound data change is necessary in case the object 2810 is positioned in the region between the central vertical axis 2850 and the vertical axis 2855 in the image data displayed on the electronic apparatus 100, and may determine that the sound data change is not necessary in case the object 2810 is positioned in a region other than the region between the central vertical axis 2850 and the vertical axis 2855 in the image data.

In case the object 2810 is positioned in the region between the central vertical axis 2850 and the vertical axis 2855 (e.g., region 2860), a person who watches a video may feel that the image data and the sound data do not match (unnatural) each other, and in case the object 2810 is positioned in the region other than the region between the central vertical axis 2850 and the vertical axis 2855, a person who watches a video may feel that the image data and the sound data match each other.

The embodiment illustrated in FIGS. 27, 28A and 28B describes an example operation of identifying whether the left-right reversal function is applied and identifying the region in which the object is positioned in the image data. Such an operation may decrease a processing load on a memory as compared to a case of changing sound data in all videos. Further, the electronic apparatus 100 illustrated in FIGS. 27, 28A and 28B does not perform the sound data conversion operation in a specific region, and thus it is possible to perform the control operation efficiently in terms of processing speed and power management.

Figure 29:
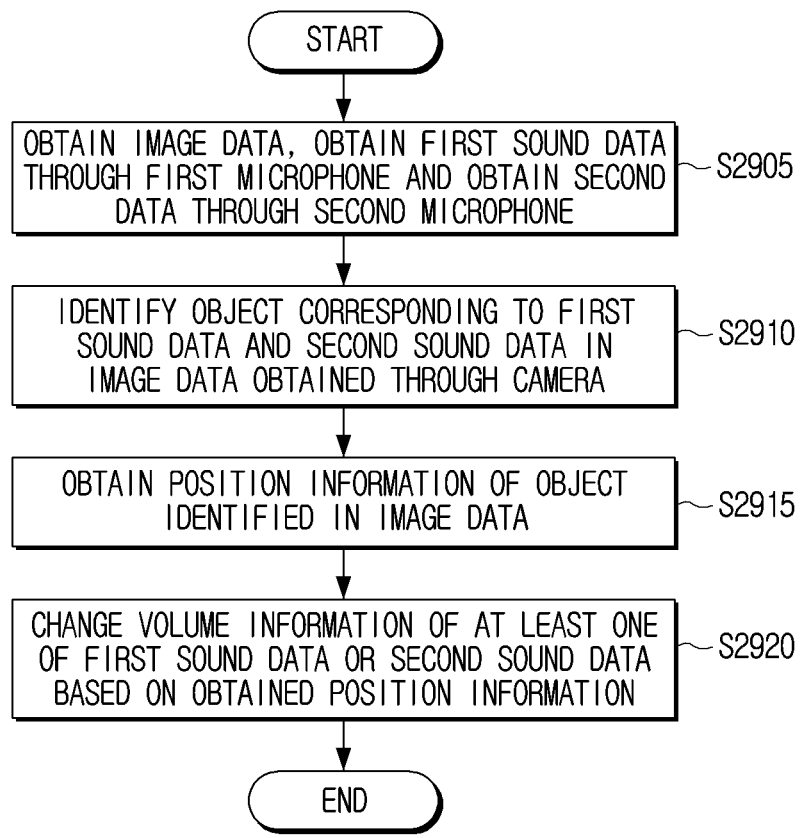
FIG. 29 is a flowchart illustrating an example method of operating an electronic apparatus according to an embodiment.

FIG. 29 is a flowchart illustrating an example method of controlling the electronic apparatus according to an embodiment.

Referring to FIG. 29, the electronic apparatus 100 according to an example embodiment may obtain image data through the camera 110, obtain first sound data through the first microphone 121, and obtain second sound data through the second microphone 122 (S2905).

The electronic apparatus 100 may identify an object corresponding to the first sound data and the second sound data in the obtained image data (S2910).

The electronic apparatus 100 may obtain position information of the identified object from the image data (S2915).

The electronic apparatus 100 may change volume information of at least one of the first sound data or the second sound data based on the obtained position information (S2920).

The first microphone 121 and the second microphone 122 are spaced apart from each other, and a first distance between a position of the camera 110 and a position of the first microphone 121, and a second distance between the position of the camera 110 and a position of the second microphone 122 may be different from each other.

In the identifying of the object (S2910), a subject or object that utters the first sound data and the second sound data may be identified as the object corresponding to the first sound data and the second sound data in the image data.

The method of controlling the electronic apparatus may further include obtaining sound ratio information between the volume information of the first sound data and the volume information of the second sound data, and in the changing of the volume information (S2920), the volume information of at least one of the first sound data or the second sound data may be changed based on the sound ratio information and the position information of the identified object.

The method may further include obtaining weighted value information for changing the volume information of at least one of the first sound data or the second sound data based on the sound ratio information and the position information of the identified object, and in the changing of the volume information (S2920), the volume information of at least one of the first sound data or the second sound data may be changed based on the obtained weighted value information.

In the obtaining of the weighted value information, the weighted value information for changing the volume information of at least one of the first sound data or the second sound data may be obtained based on the sound ratio information, and distance ratio information between a first distance from one side of the image data to the identified object, and a second distance from the other side of the image data to the identified object, and the other side of the image data may be opposite to the one side of the image data.

In the changing of the volume information (S2920), the weighted value information may be obtained by multiplying the distance ratio information and the sound ratio information, and the volume information of the first sound data or the second sound data may be changed by multiplying the volume of the first sound data or the second sound data by the weighted value information.

In the changing of the volume information (S2920), the volume information may be changed by multiplying the volume of one of the first sound data or the second sound data by the weighted value information, the one sound data having a higher volume.

The method may further include displaying a UI including the changed volume information of the first sound data or the second sound data.

In the changing of the volume information (S2920), distance information between a user corresponding to the identified object and the electronic apparatus 100 may be obtained based on the image data, and the volume information of at least one of the first sound data or the second sound data may be changed based on the obtained position information based on the obtained distance information being less than a threshold distance.

The method may further include obtaining, based on first and second objects being identified in the image data, first position information of the identified first object and second position information of the identified second object from the image data, and in the changing of the volume information (S2920), volume information of at least one of first sound data or second sound data corresponding to the first object may be changed based on the first position information, and volume information of at least one of third sound data or fourth sound data corresponding to the second object may be changed based on the second position information.

The method of the electronic apparatus as illustrated in FIG. 29 may be performed on the electronic apparatus having the configuration of FIG. 2 or 3, and may also be performed on an electronic apparatus having other configurations.

The methods according to the various example embodiments of the disclosure described above may be implemented in a form of an application that may be installed in the existing electronic apparatus.

The methods according to the various example embodiments of the disclosure described above may be implemented by performing a software upgrade or a hardware upgrade with respect to the existing electronic apparatus.

Further, the various example embodiments of the disclosure described above may be executed through an embedded server provided in the electronic apparatus, or an external server of at least one of the electronic apparatus or the display device.

According to an embodiment of the disclosure, the various example embodiments described above may be implemented by software including instructions stored in a machine-readable storage medium (for example, a computer-readable storage medium). The machine may be an apparatus that may invoke a stored instruction from a storage medium and may be operated according to the invoked instruction. The machine may include the electronic apparatus according to the disclosed embodiments. In case an instruction is executed by the processor, the processor may directly perform a function corresponding to the instruction or other components may perform the function corresponding to the instruction under a control of the processor. The instruction may a code made by a compiler or a code executable by an interpreter. The machine-readable storage medium may be provided in a form of a non-transitory storage medium. The "non-transitory" storage medium is tangible an may not include a signal, and does not distinguish whether data is semi-permanently or temporarily stored on the storage medium.

In addition, according to an embodiment of the disclosure, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a part of the computer program product may be at least temporarily stored in a storage medium such as a memory of a server of a manufacturer, a server of an application store, or a relay server or be temporarily created.

In addition, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic apparatus comprising:
a camera;
a first microphone;
a second microphone; and
a processor configured to:
control the electronic apparatus to obtain first sound data through the first microphone and obtain second sound data through the second microphone,
obtain image data through the camera,
identify an object corresponding to the first sound data and the second sound data among at least one of objects in the obtained image data, obtain position information of the identified object from the image data, and change volume information of at least one of the first sound data obtained through the first microphone or the second sound data obtained through the second microphone based on the obtained position information.

2. The electronic apparatus as claimed in claim 1, wherein the first microphone and the second microphone are spaced apart from each other, and a first distance between a position of the camera and a position of the first microphone, and a second distance between the position of the camera and a position of the second microphone are different from each other.

3. The electronic apparatus as claimed in claim 1, wherein the processor is configured to identify, as the object corresponding to the first sound data and the second sound data, a subject that utters the first sound data and the second sound data in the image data.

4. The electronic apparatus as claimed in claim 1, wherein the processor is configured to: obtain sound ratio information between the volume information of the first sound data and the volume information of the second sound data, and change the volume information of at least one of the first sound data or the second sound data based on the sound ratio information and the position information of the identified object.

5. The electronic apparatus as claimed in claim 4, wherein the processor is configured to: obtain weighted value information for changing the volume information of at least one of the first sound data or the second sound data based on the sound ratio information and the position information of the identified object, and change the volume information of at least one of the first sound data or the second sound data based on the obtained weighted value information.

6. The electronic apparatus as claimed in claim 5, wherein the processor is configured to obtain the weighted value information for changing the volume information of at least one of the first sound data or the second sound data based on the sound ratio information, and distance ratio information between a first distance from one side of the image data to the identified object, and a second distance from an other side of the image data to the identified object, and wherein the other side of the image data is opposite to the one side of the image data.

7. The electronic apparatus as claimed in claim 6, wherein the processor is configured to: obtain the weighted value information by multiplying the distance ratio information and the sound ratio information, and change the volume information of the first sound data or the second sound data by multiplying the volume information of the first sound data or the second sound data by the weighted value information.

8. The electronic apparatus as claimed in claim 1, further comprising a display, wherein the processor is configured to control the display to display a user interface (UI) including the changed volume information of the first sound data or the second sound data.

9. The electronic apparatus as claimed in claim 1, wherein the processor is configured to: obtain distance information between a subject corresponding to the identified object and the electronic apparatus based on the image data, and change the volume information of at least one of the first sound data or the second sound data based on the obtained position information based on the obtained distance information being less than a threshold distance.

10. The electronic apparatus as claimed in claim 1, wherein the processor is configured to: obtain, based on first and second objects being identified in the image data, first position information of the identified first object and second position information of the identified second object from the image data, change volume information of at least one of first sound data or second sound data corresponding to the first object based on the first position information, and change volume information of at least one of third sound data or fourth sound data corresponding to the second object based on the second position information.

11. A method of controlling an electronic apparatus, the method comprising:

obtaining image data through a camera, obtaining first sound data through a first microphone, and obtaining second sound data through a second microphone;

identifying an object corresponding to the first sound data and the second sound data among at least one of objects in the obtained image data;

obtaining position information of the identified object from the image data; and changing volume information of at least one of the first sound data obtained through the first microphone or the second sound data obtained through the second microphone based on the obtained position information.

12. The method as claimed in claim 11, wherein the first microphone and the second microphone are spaced apart from each other, and a first distance between a position of the camera and a position of the first microphone, and a second distance between the position of the camera and a position of the second microphone are different from each other.

13. The method as claimed in claim 11, wherein in the identifying of the object, a subject that utters the first sound data and the second sound data is identified as the object corresponding to the first sound data and the second sound data in the image data.

14. The method as claimed in claim 11, further comprising obtaining sound ratio information between the volume information of the first sound data and the volume information of the second sound data, wherein in the changing of the volume information, the volume information of at least one of the first sound data or the second sound data is changed based on the sound ratio information and the position information of the identified object.

15. The method as claimed in claim 14, further comprising obtaining weighted value information for changing the volume information of at least one of the first sound data or the second sound data based on the sound ratio information and the position information of the identified object, wherein in the changing of the volume information, the volume information of at least one of the first sound data or the second sound data is changed based on the obtained weighted value information.

16. The method as claimed in claim 15, wherein in the obtaining of the weighted value information, the weighted value information for changing the volume information of at least one of the first sound data or the second sound data is obtained based on the sound ratio information, and distance ratio information between a first distance from one side of the image data to the identified object, and a second distance from an other side of the image data to the identified object, and wherein the other side of the image data is opposite to the one side of the image data.

17. The method as claimed in claim 16, wherein in the changing of the volume information, the weighted value information is obtained by multiplying the distance ratio information and the sound ratio information, and the volume information of the first sound data or the second sound data is changed by multiplying the volume information of the first sound data or the second sound data by the weighted value information.

18. The method as claimed in claim 17, further comprising displaying a UI including the changed volume information of the first sound data or the second sound data.

19. The method as claimed in claim 11, wherein in the changing of the volume information, distance information between a subject corresponding to the identified object and the electronic apparatus is obtained based on the image data, and the volume information of at least one of the first sound data or the second sound data is changed based on the obtained position information based on the obtained distance information being less than a threshold distance.

20. The method as claimed in claim 11, further comprising obtaining, based on first and second objects being identified in the image data, first position information of the identified first object and second position information of the identified second object from the image data,
  wherein in the changing of the volume information, volume information of at least one of first sound data or second sound data corresponding to the first object is changed based on the first position information, and volume information of at least one of third sound data or fourth sound data corresponding to the second object is changed based on the second position information.

* * * * *